US006968091B2

(12) United States Patent
Faibish et al.

(10) Patent No.: US 6,968,091 B2
(45) Date of Patent: Nov. 22, 2005

(54) INSERTION OF NOISE FOR REDUCTION IN THE NUMBER OF BITS FOR VARIABLE-LENGTH CODING OF (RUN, LEVEL) PAIRS

(75) Inventors: Sorin Faibish, Newton, MA (US); Ugur Sezer, Shrewsbury, MA (US); Seyfullah H. Oguz, Shrewsbury, MA (US); Wayne W. Duso, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 815 days.

(21) Appl. No.: 09/955,225

(22) Filed: Sep. 18, 2001

(65) Prior Publication Data

US 2003/0147561 A1 Aug. 7, 2003

(51) Int. Cl.[7] .................................................. G06K 9/38
(52) U.S. Cl. .................................. 382/251; 375/240.03
(58) Field of Search ................................ 382/232–253; 375/240–241

(56) References Cited

U.S. PATENT DOCUMENTS

| | | | |
|---|---|---|---|
| 5,231,484 A | 7/1993 | Gonzales et al. | ............ 358/133 |
| 5,231,487 A | 7/1993 | Hurley et al. | .......... 375/240.01 |
| 5,381,144 A | 1/1995 | Wilson et al. | ................. 341/63 |
| 5,534,944 A | 7/1996 | Egawa et al. | ................ 348/584 |

(Continued)

OTHER PUBLICATIONS

Seyfullah H. Oguz, Sorin Faibish, and Wayne W. Duso, "Efficient Scaling of Nonscalable MPEG–2 Video", U.S. Appl. No. 09/608,050 filed Jun. 30, 2000 (95 pages text, 24 sheets drawings, 2 pg. declaration).

Seyfullah H. Oguz, Sorin Faibish, Daniel Gardere, Michel Noury, Wayne W. Duso, Peter Bixby, and John Forecast, "Processing of MPEG Incoded Video for Trick Mode Operation," U.S. Appl. No. 09/608,919 filed Jun. 30, 2000 (93 pages text, 24 sheets drawings, 8 pg. declarations).

(Continued)

*Primary Examiner*—Jingge Wu
(74) *Attorney, Agent, or Firm*—Richard C. Auchterlonie; Novak Druce & Quigg, LLP

(57) ABSTRACT

The (run, level) pairs in an original series are inspected to determine whether or not modification of the (run, level) pairs would produce a desirable decrease in a number of bits required for variable-length encoding of the series of (run, level) pairs, despite introduction of noise. If so, the (run, level) pairs are modified prior to variable-length encoding. For example, a (run, level) pair of (M, N) is modified by substitution of a first (run, level) pair of (M−1, 1) immediately followed by a second (run, level) pair of (0, N). A lookup table or testing of predetermined ranges of run length and level magnitude provides a fast determination of whether or not to modify a (run, level) pair. The decoder can be programmed to reduce the noise introduced by this process by recognizing and rejecting (run, level) pairs that are likely to have been inserted during the encoding process.

23 Claims, 39 Drawing Sheets

U.S. PATENT DOCUMENTS

| | | | | |
|---|---|---|---|---|
| 5,565,998 | A | | 10/1996 | Coombs et al. ............... 386/46 |
| 5,675,384 | A | | 10/1997 | Ramamurthy et al. ...... 348/405 |
| 5,691,770 | A | | 11/1997 | Keesman et al. ...... 375/240.04 |
| 5,694,170 | A | | 12/1997 | Tiwari et al. ............... 348/390 |
| 5,724,097 | A | * | 3/1998 | Hibi et al. ............. 375/240.04 |
| 5,793,897 | A | | 8/1998 | Jo et al. ...................... 382/246 |
| 5,812,788 | A | | 9/1998 | Agarwal ..................... 709/247 |
| 5,838,678 | A | | 11/1998 | Davis et al. ................ 370/389 |
| 5,859,660 | A | | 1/1999 | Perkins et al. ................. 348/9 |
| 5,880,785 | A | * | 3/1999 | Fujiwara ................ 375/240.18 |
| 5,889,561 | A | * | 3/1999 | Kwok et al. ........... 375/240.03 |
| 5,892,548 | A | | 4/1999 | Kim ..................... 375/240.04 |
| 5,892,915 | A | | 4/1999 | Duso et al. ............ 395/200.49 |
| 5,917,830 | A | | 6/1999 | Chen et al. ................. 370/487 |
| 5,959,690 | A | | 9/1999 | Toebes, VIII et al. ...... 348/578 |
| 5,969,650 | A | | 10/1999 | Wilson ......................... 341/67 |
| 6,038,000 | A | | 3/2000 | Hurst, Jr. .................... 348/845 |
| 6,052,384 | A | | 4/2000 | Huang et al. ............... 370/468 |
| 6,061,399 | A | | 5/2000 | Lyons et al. ................. 375/240 |
| 6,091,774 | A | * | 7/2000 | Hyodo et al. .......... 375/240.03 |
| 6,101,195 | A | | 8/2000 | Lyons et al. ................ 370/498 |
| 6,141,358 | A | | 10/2000 | Hurst et al. ................. 370/543 |
| 6,154,496 | A | | 11/2000 | Radha ................... 375/240.28 |
| 6,263,021 | B1 | | 7/2001 | Sethuraman et al. ... 375/240.03 |
| 6,330,286 | B1 | | 12/2001 | Lyons et al. ........... 375/240.28 |
| 6,343,098 | B1 | * | 1/2002 | Boyce ................... 375/240.03 |
| 6,414,998 | B1 | | 7/2002 | Yoshinari et al. ...... 375/240.25 |
| 6,480,547 | B1 | | 11/2002 | Chen et al. ............ 375/240.27 |
| 6,580,834 | B2 | * | 6/2003 | Li et al. ...................... 382/251 |
| 6,678,332 | B1 | | 1/2004 | Gardere et al. ......... 357/240.26 |
| 6,771,703 | B1 | * | 8/2004 | Oguz et al. ............ 375/240.03 |
| 2001/0036355 | A1 | | 11/2001 | Kelly et al. .................... 386/52 |
| 2002/0087976 | A1 | | 7/2002 | Kaplan et al. ................. 725/34 |
| 2002/0154694 | A1 | | 10/2002 | Birch .................... 375/240.05 |

OTHER PUBLICATIONS

Y. Nakajima, H. Hori, and T. Kanoh, "Rate Conversion of MPEG Coded Video by Re-quantization Process," IEEE Proc. of ICIP-95, vol. III, Sep. 1995, pp. 408-411.

A.T. Erdem and M.I. Sezan, "Multi-generation Characteristics of the MPEG Video Compression Standards," IEEE Proc. of ICIP-94, vol. II, 1994, pp. 933-937.

M. Perreira, and A. Lippman, "Re-codable video," IEEE Proc. of ICIP-94, vol. II, 1994, pp. 952-956.

M. Mohsenian, R. Rajagopalan, and C.A. Gonzales, "Single-pass constant- and variable-bit-rate MPEG-2 video compression," IBM J. Res. Develop., vol. 43, No. 4, Jul. 1999, pp. 489-509.

P.H. Westerink, R. Rajagopalan, and C.A. Gonzales, "Two-pass MPEG-2 variable-bit-rate encoding," IBM J. Res. Develop., vol. 43, No. 4, Jul. 1999, pp. 471-488.

Jill Boyce, John Henderson, and Larry Pearlstein, "An SDTV Decoder with HDTV Capability: An All-Format ATV Decoder," Hitachi America Ltd., file://C:Fatima\67.gif, pp. 67-75, published at least as early as Jan. 12, 2000.

Boon-Lock Yeo, "On fast microscopic browsing of MPEG-compressed video," IBM T.J. Watson Research Center, Jan. 1998, Multimedia Systems 7, 1999, pp. 269-281.

Robert Mokry and Dimitris Anastassiou, "Minimal Error Drift in Frequency Scalability for Motion-Compensated DCT Coding," IEEE Transactions on Circuits and Systems for Video Technology, vol. 4, No. 4, Aug. 1994, pp. 392-406.

C. Ward, C. Pecota, X. Lee, and G. Hughes, "Seamless Splicing for MPEG-2 Transport Stream Video Servers," SMPTE Journal, Dec. 1999, pp. 873-879.

Norm Hurst and Katie Cornog, "MPEG Splicing: A New Standard for Television—SMPTE 312M," SMPTE Journal, Nov. 1998, pp. 978-988.

Norm Hurst and Katie Cornog, "Splicing FAQ," http://www.mpeg.org/MPEG/splicing-FA W.html, 8 pages, published at least as early as Oct. 13, 1999.

SMPTE 312M-1999, SMPTE Standard for Television, "Splice Points for MPEG-2 Transport Streams," Approved Apr. 8, 1999, The Society of Motion Picture and Television Engineers, White Plains, NY, 20 pages.

"The Shape of MPEG," DV Magazine, vol. 4, No. 12, Dec. 1996, http://livedv.com/Mag/Dec96/Contents/mpeg/mpeg.html, 5 pages, published at least as early as Oct. 13, 1999.

"A Guide to MPEG Fundamentals and Protocol Analysis (Including DVB and ATSC)," Tektronix, Inc., Beaverton, Oregon, 1997, pp. 48 pages.

Leonardo Chiariglione, "MPEG and multimedia communications," CSELT, Torino Italy, http://www.cselt.stet.it/ufv/leonardo/paper/isce96.htm, 50 pages, published at least as early as Oct. 13, 1999.

Barry G. Haskell, Atul Puri, and Arun N. Netravali, MPEG-2 Video Coding and Compression, Chp. 8, pp. 156-182, and "Interactive Television," Chp. 13, pp. 292-306, Digital Video: An Introduction to MPEG-2, Chapman & Hall, New York, NY, 1997.

"MPEG-2: The basics of how it works," Hewlett Packard, published at least as early as Oct. 31, 1999, 17 pages.

Anil K. Jain, *Fundamentals of Digital Image Processing*, Prentice Hall, Inc., Englewood Cliffs, New Jersey, 1989, Chapter 4: Image Sampling and Quantization and Chapter 5: Image Transforms, pp. 80-188.

"Information technology—Generic coding of moving pictures and associated audio information: Systems," International Standard, ISO/IEC 13818-1:1996(E), 136 pages.

"Information technology—Generic coding of moving pictures and associated audio information: Video," International Standard, ISO/IEC 13818-2:1996(E), 211 pages.

"Information technology—Generic coding of moving pictures and associated audio information—Part 3: Audio," International Standard, ISO/IEC 13818-3:1995(E), 118 pages.

Jerry D. Gibson, Toby Berger, Tom Lookabaugh, Dave Lindbergh, and Richard L. Baker, *Digital Compression for Multimedia: Principles and Standards*, Morgan Kaufmann Publishers, Inc., San Francisco, CA, 1998, Chapter 9: JPEG Still-Image Compression Standard, pp. 291-308, and Chapter 11: MPEG Compression, pp. 363-417.

Barry G. Haskell, Atul Puri, and Arun N. Netravali, Digital Video: An Introduction to MPEG-2, Chapman & Hall, New York, NY, 1997, pp. 1-279, 292-306, 369-421.

Nilesh V. Patel and Ishwar K. Sethi, *Compressed Video Processing For Cut Detection*, Vision and Neural Networks Laboratory, Dept. of Computer Science, Wayne State University, Detroit, MI, Oct. 1997, 26 pages.

Nilesh V. Patel and Ishwar K. Sethi, *Video Shot Detection and Characterization for Video Databases*, Vision and Neural Networks Laboratory, Dept. of Computer Science, Wayne State University, Detroit, MI, Oct. 1997, 22 pages.

Bo Shen, Ishwar K. Sethi and Vasudev Bhaskaran, *DCT Convolution and Its Application In Compressed Video Editing*, Dept. of Computer Science, Wayne State University, Detroit, MI and Visual Computing Dept., Hewlett–Packard Laboratories, Palo Alto, CA, *To appear in SPIE VCDIP '97, also submitted to IEEE Trans. Cir. And Sys. For Video Tech.*, 11 pages.

B. Shen and I.K. Sethi, *Convolution–Based Edge Detection for Image/Video in Block DCT Domain*, Vision & Neural Networks Laboratory, Dept. of Computer Science, Wayne State University, Detroit, MI, *To appear in Journal of Visual Communications and Image Representation*, 19 pages.

Bo Shen and Ishwar K. Sethi, *Direct feature extraction from compressed images*, Vision and Neural Networks Laboratory, Dept. of Computer Science, Wayne State University, Detroit, MI, *SPIE vol. 2670, Storage & Retrieval for Image and Video Databases IV*, 1996, 12 pages.

Bo Shen and Ishwar K. Sethi, *Block–Based Manipulations On Transform–Compressed Images and Videos*, Vision and Neural Networks Laboratory, Dept. of Computer Science, Wayne State University, Detroit, MI, *To appear in Multimedia Systems*, 26 pages.

Bo Shen and Ishwar K. Sethi, *Inner–Block Operations On Compressed Images*, Vision and Neural Networks Laboratory, Dept. of Computer Science, Wayne State University, Detroit, MI, *ACM Multimedia '95*, San Francisco, CA, Nov. 5–9, 1995, 10 pages.

Alexandros Eleftheriadis and Dimitris Anastassiou, *Constrained and General Dynamic Rate Shaping of Compressed Digital Video*, Dept. of Electrical Engineering and Center for Telecommunications Research, Columbia University, New York, NY, *Proceedings, 2$^{nd}$ IEEE International Conference on Image Processing (ICIP–95)*, Arlington, VA, Oct. 1995, 4 pages.

Alexandros Eleftheriadis and Dimitris Anastassiou, *Optimal Data Partitioning of MPEG–2 Coded Video*, Dept. of Electrical Engineering and Center for Telecommunications Research, Columbia University, New York, NY, *Proceedings, 1$^{st}$ International Conference on Image Processing (ICIP–94)*, Austin, Texas, Nov. 1994, 5 pages.

Andrew B. Watson, Joshua A. Solomon, Albert Ahumada, and Alan Gale, *DCT Basis Function Visibility: Effects of Viewing Distance and Contrast Masking*, (1994), 11 pages, in B.E. Rogowitz (Ed.), Human Vision Visual Processing and Digital Display IV (pp. 99–108), Billington, WA SPIE.

O'Reilly Network Broadcast 2000 Brings DV Editing to Linus (Aug. 11, 2000), http://www.oreillynet.com/pub/a/network/2000/08/11/magazine/broadcase2000.html, published at least as early as Mar. 27, 2001, 3 pages; Broadcast 2000, http://heroinewarrior.com/bcast2000.php3, published at least as early as Mar. 27, 2001, 4 pages.

MPEG Wizard: MPEG Real–Time External Encoder, http://www.duplexx.com/mpgwiz.html, MPEG Wizard: MPEG Real–Time Encoder—Features and Software, http://www.duplexx.com/mpgwiz_f.html, MPEG Wizard: MPEG Real–Time Encoder—Specs & Requirements, http://ww.duplexx.com/mpgwiz_r.html, published at least as early as Mar. 19, 2001, 4 pages.

Optivision MPEG–1 Encoder, http://brahma.imag.fr/Multimedia/jeudis/jeudi2/ Optivision_mpeglenc.html, published at least as early as Mar. 19, 2001, 3 pages.

Adrienne Electronics Corporation—Home Page, http://www.adrielec.com/, 1 page; Functional Grouping of LTC/VITC, VTR Interface, and Video Products, http://www.adrielec.com/listing.htm, 2 pages; Adrienne Electronics Products and Price Listings Catalog, http://www.adrielec.com/shortfor.htm, 8 pages; AEC–BOX–Aug. 18, 1928 Standalone VITC and/or LTC Time Code Generator, http://www.adrielec.com/box28lit.htm, 4 pages; AEC–BOX–Aug. 18, 1928 Standalone LTC/VITC Time Code Reader, http://www.adrielec.com/box20lit.htm, 5 pages, published at least as early as Mar. 15, 2001.

National P/N CLC020—SMPTE 259M Digital Video Serializer with Integrated Cable Driver, http://www.national.com/pf/CL/CLC020.html, published at least as early as Mar. 14, 2001, 3 pages.

TE600 MPEG–2 DSNG Encoder, satellite uplink equipment, downlink, teleports, earth stations, amplifiers, antennas, http://www.usacanada.net.satellite/te600.htm, published at least as early as Mar. 14, 2001, 3 pages.

TDR600/RA, satellite uplink equipment, downlink, teleports, earth stations, amplifiers, antennas, http://www.usacanada.net/satellite/tdr600–ra.htm, published at least as early as Mar. 14, 2001, 2 pages.

TE300A MEPG–2 Encoder, satellite uplink equipment, downlink, teleports, earth stations, amplifiers, antennas, http://www.usacanada.net/satellite/te300a.htm, published at least as early as Mar. 14, 2001, 3 pages.

TE–300, satellite uplink equipment, downlink, teleports, earth stations, amplifiers, antennas, http://www.usacanada.net/satellite/te30.htm, published at least as early as Mar. 14, 2001, 3 pages.

\* cited by examiner

Fig. 7
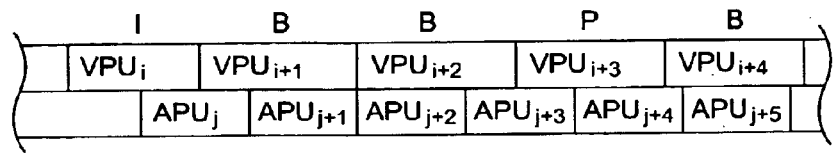
Fig. 8
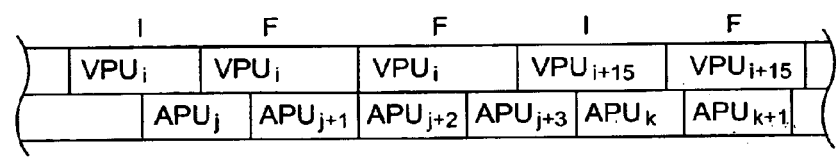
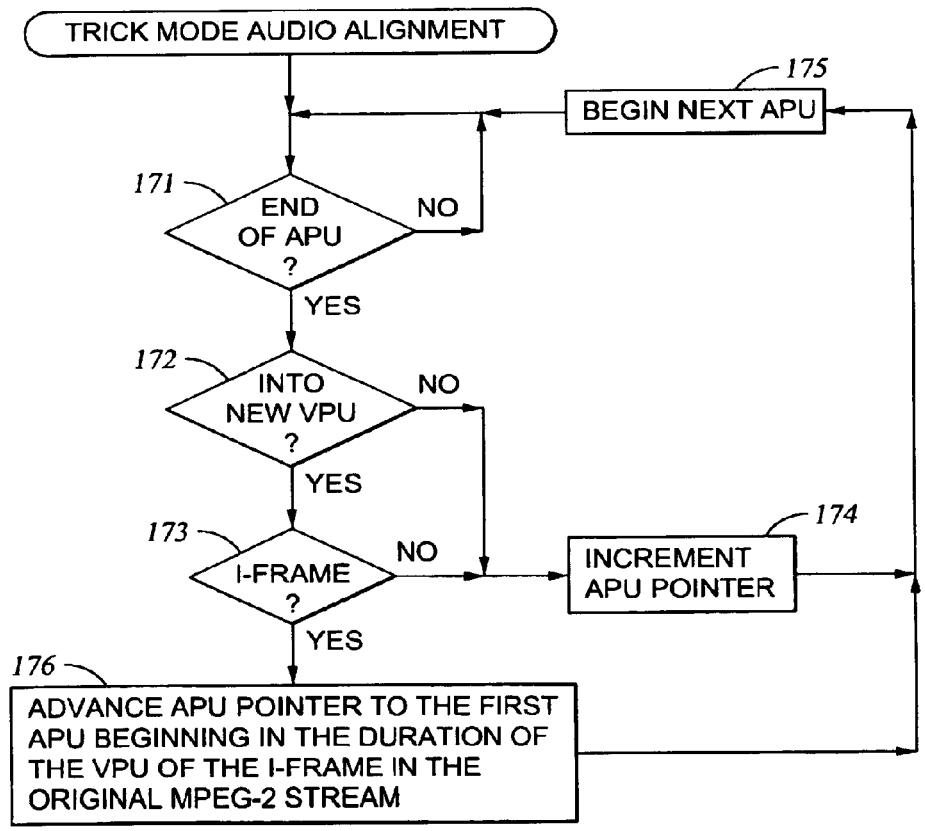
Fig. 9

1- Play from start 1 sec
2- Pause
3- Fast Forward to 29 min
4- Pause
5- Play 1 sec
6- Pause
7- Fast Reverse to 1 sec
8- Pause
9- Play Normal

|  | READ | WRITE |
|---|---|---|
| COPY OF THE ASSET WITH ALL THE DATA | EMPEG2 | EMPEG2 |
| COPY ONLY THE MAIN ASSET | RAW | MPEG2 |
| ARCHIVE | EMPEG2 | EMPEG2 |
| PLAY | MPEG2 |  |
| RECORD |  | MPEG2 |

LEVEL MAGNITUDE

INSERTION OF NOISE FOR REDUCTION IN THE NUMBER OF BITS FOR VARIABLE-LENGTH CODING OF (RUN, LEVEL) PAIRS

BACKGROUND OF THE INVENTION

1. Field of the Invention

The present invention relates to variable-length coding for data compression, and in particular the variable-length coding of (run, level) pairs.

2. Background Art

Variable-length coding (VLC) is a well-known technique of data compression. If certain data patterns occur much more often than other data patterns, then data compression occurs if the frequent data patterns are assigned shorter variable-length codes, and the infrequent data patterns are assigned longer variable-length codes. The technique has been well known since the introduction of the Morse code for telegraphy in the $19^{th}$ century. The Morse code, for example, is a set of variable-length code words, each of which is comprised of a series of "dots" and "dashes." The most frequently used letters of the alphabet (E and T) are assigned the shortest code words, consisting of a single dot for the letter E, and a single dash for the letter T.

For encoding pictures or audio-visual data, the variable-length coding often encodes (run, level) pairs. Typically the run represents the number of consecutive zero-valued transform coefficients in a series of transform coefficients, and the level represents the nonzero value of a transform coefficient which terminates the above chain of zero valued coefficients. For example, a number of standard image compression techniques subdivide a picture into 8×8 blocks of pixels. For each block, a two-dimensional discrete cosine transform is applied to the pixel values to produce a series of 64 DCT coefficients. The coefficient values are quantized in such a way that a large number of the coefficients typically have a level of zero, and most of the coefficients have relatively small level magnitudes.

There are various ways that (run, level) pairs can be variable-length coded. In a common coding scheme, each of the most frequent (run, level) pairs is assigned a corresponding variable-length code having a length that is inversely proportional to the frequency of the (run, level) pair. The less frequent (run, level) pairs, however, are encoded in a different fashion, which will be referred to as an escape sequence. For example, the escape sequence is a fixed-length code word, consisting of an escape code, followed by the run value and the level value. Such variable-length coding of (run, level) pairs is used in a popular video compression technique known as MPEG.

MPEG is an acronym for the Moving Picture Experts Group, which was set up by the International Standards Organization (ISO) to work on compression of video and its associated audio. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P frames and B frames. Each I frame can be decoded without information from any preceding and/or following frame. Decoding of a P frame in general requires information from a preceding frame in the same GOP. Decoding of a B frame in general requires information from both a preceding frame which can be in the previous or the same GOP, and a following frame in the same GOP. To minimize decoder buffer requirements, transmission orders differ from presentation orders for some frames, so that all the information of the reference frames required for decoding a non-causally predicted frame, that is to say a B frame will arrive at the decoder before the B frame.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets embedded in video and audio elementary streams as well as program description, conditional access and network related information carried in other independent elementary streams. The standard specifies the organization of the elementary streams and the transport streams, and imposes constraints to enable synchronized decoding from the audio and video decoding buffers under various conditions.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Audio Information: Video," and ISO/IEC IS 13818-3, "Information Technology-Generic Coding of Moving Pictures and Associated Audio Information: Audio," which are incorporated herein by reference. A concise introduction to MPEG is given in "A guide to MPEG Fundamentals and Protocol Analysis (Including DVB and ATSC)," Tektronix Inc., 1997, incorporated herein by reference.

SUMMARY OF THE INVENTION

The present invention recognizes an opportunity for obtaining a significant reduction in the total bit count for variable-length coding of (run, level) pairs by the introduction of an insignificant amount of noise into the information being encoded. There are circumstances that indicate such an opportunity. The structure of the variable-length coding scheme may inherently provide such an opportunity for certain (run, level) pairs. The presence of an escape mechanism in the coding scheme may provide an opportunity for obtaining a significant reduction in the total bit count for variable-length coding if the introduction of a small amount of noise eliminates an escape sequence. In addition, the scheme for variable-length coding of the (run, level) pairs may have been especially designed for certain nominal statistics of the (run, level) pairs. In this case, if the statistics of the (run, level) pairs for a particular instance deviate from the expected statistics, there may be an opportunity for a significant reduction in total bit count. There may also be an opportunity for a significant reduction in total bit count if the statistics of the (run, level) pairs in general have been modified due to a change from the way that the (run, level)

pairs are normally produced from the source material. For example, there may be an opportunity if there has been a change causing the average run length to increase.

In accordance with one aspect of the present invention, there is provided a method of processing information represented by an original series of (run, level) pairs. The method includes inspecting the (run, level) pairs in the original series of (run, level) pairs to determine whether or not modification of at least one (run, level) pair in the original series of (run, level) pairs would produce a desirable decrease in a number of bits required for variable-length encoding of the information despite introduction of noise into the variable-length encoding of the information. Upon determining that modification of at least one (run, level) pair in the original series of (run, level) pairs would produce a desirable decrease in the number of bits required for variable-length encoding of the information despite introduction of noise into the variable-length encoding of the information, the at least one (run, level) pair is modified to produce a modified series of (run, level) pairs from the original series of (run, level) pairs. The method further includes variable-length encoding the modified series of (run, level) pairs.

In accordance with another aspect, the invention provides a method of variable-length encoding a block of pixels. The method includes computing a two-dimensional discrete cosine transform (DCT) of the block of pixels to produce a series of DCT coefficient values, quantizing the DCT coefficient values to produce quantized coefficient values, and producing an original series of (run, level) pairs each having a level value indicating a respective non-zero quantized coefficient value. The method further includes inspecting the (run, level) pairs in the original series of (run, level) pairs to determine whether or not modification of at least one (run, level) pair in the original series of (run, level) pairs would produce a desirable decrease in a number of bits required for variable-length encoding of the block of pixels despite introduction of noise into the variable-length encoding of the block of pixels. Upon determining that modification of at least one (run, level) pair in the original series of (run, level) pairs would produce a desirable decrease in the number of bits required for variable-length encoding of the block of pixels despite introduction of noise into the variable-length encoding of the block of pixels, the at least one (run, level) pair is modified to produce a modified series of (run, level) pairs from the original series of (run, level) pairs. The method further includes variable-length encoding the modified series of (run, level) pairs.

In accordance with yet another aspect, the invention provides a method of producing MPEG encoded video from an original series of MPEG-compliant (run, level) pairs. The method includes inspecting the (run, level) pairs in the original series of (run, level) pairs to determine whether or not modification of at least one (run, level) pair in the original series of (run, level) pairs would produce a desirable decrease in a number of bits in the MPEG encoded video despite introduction of noise into the MPEG encoded video. Upon determining that modification of at least one (run, level) pair in the original series of (run, level) pairs would produce a desirable decrease in the number of bits in the MPEG encoded video despite introduction of noise into the MPEG encoded video, the at least one (run, level) pair is replaced with a sequence of a first (run, level) pair and a second (run, level) pair to produce a modified series of (run, level) pairs from the original series of (run, level) pairs. The at least one original (run, level) pair has a non-zero run length of M and a level value of N, the first (run, level) pair has run length of M−1 and a level magnitude of one, and the second (run, level) pair has a run length of zero and a level value of N. The method further includes variable-length encoding the modified series of (run, level) pairs to produce the MPEG encoded video.

In accordance with still another aspect, the invention provides a method of decoding MPEG encoded video that includes noise introduced during the encoding process by insertion of at least one (run, level) pair having a level magnitude of one. The method includes decoding a series of (run, level) pairs from the MPEG encoded video, and inspecting the series of (run, level) pairs to find the at least one (run, level) pair having a level magnitude of one. The method further includes determining that the at least one (run, level) pair having a level magnitude of one is likely to represent noise introduced during the encoding process, and therefore rejecting the at least one (run, level) pair having a level magnitude of one in order to reduce noise.

In accordance with yet still another aspect, the invention provides a digital computer for producing MPEG encoded video from an original series of MPEG-compliant (run, level) pairs, the digital computer includes at least one processor programmed for inspecting the (run, level) pairs in the original series of (run, level) pairs to determine whether or not modification of at least one (run, level) pair in the original series of (run, level) pairs would produce a desirable decrease in a number of bits in the MPEG encoded video despite introduction of noise into the MPEG encoded video, and upon determining that modification of at least one (run, level) pair in the original series of (run, level) pairs would produce a desirable decrease in the number of bits in the MPEG encoded video despite introduction of noise into the MPEG encoded video, replacing the at least one (run, level) pair with a sequence of a first (run, level) pair and a second (run, level) pair to produce a modified series of (run, level) pairs from the original series of (run, level) pairs. The at least one original (run, level) pair has a non-zero run length of M and a level value of N, the first (run, level) pair has a run length of M−1 and a level magnitude of one, and the second (run, level) pair has a run length of zero and a level value of N. The processor is further programmed for variable-length encoding the modified series of (run, level) pairs to produce the MPEG encoded video.

In accordance with a final aspect, the invention provides a decoder for decoding MPEG encoded video that includes noise introduced during the encoding process by insertion of at least one (run, level) pair having a level magnitude of one. The decoder includes at least one processor programmed for decoding a series of (run, level) pairs from the MPEG encoded video, inspecting the (run, level) pairs to find the at least one (run, level) pair having a level magnitude of one, determining that the at least one (run, level) pair having a level magnitude of one is likely to represent noise introduced during the encoding process, and therefore rejecting the at least one (run, level) pair having a level magnitude of one in order to reduce noise.

BRIEF DESCRIPTION OF THE DRAWINGS

Other objects and advantages of the invention will become apparent upon reading the following detailed description with reference to the accompanying drawings, in which:

FIG. 7 is a timing diagram showing a timing relationship between video presentation units (VPUs) and associated audio presentation units (APUs) in an original MPEG-2 coded data stream;

FIG. 8 is a timing diagram showing a timing relationship between video presentation units (VPUs) and associated audio presentation units (APUs) for a fast-forward trick-mode stream;

FIG. 9 is a flowchart of a procedure for selection and alignment of audio presentation units (APUs) in the fast-forward trick-mode stream;

Figure 1:
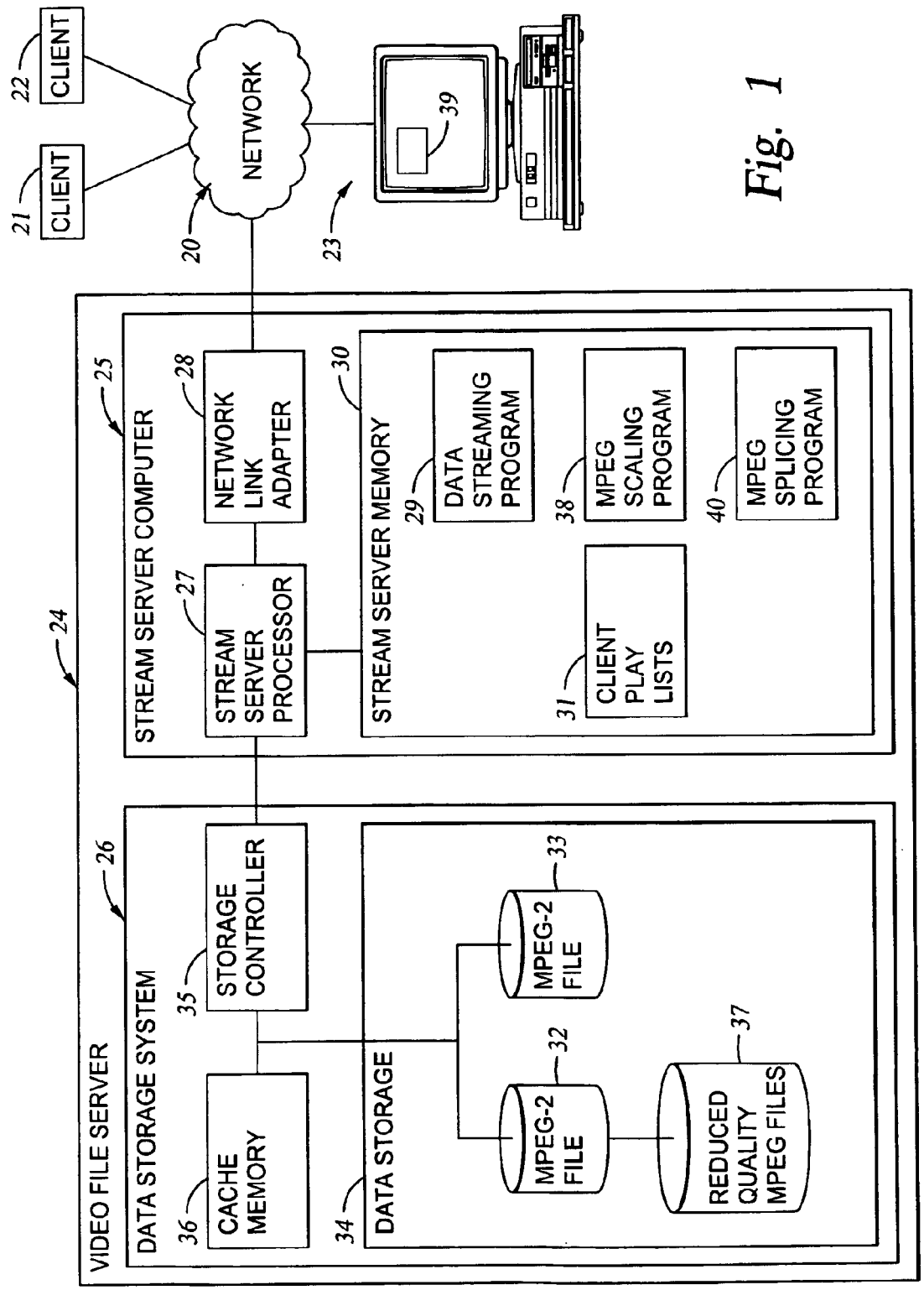
FIG. 1 is a block diagram of a data network including a video file server implementing various aspects of the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

I. Applications for Efficient Scaling of Non-Scalable MPEG-2 Video

With reference to FIG. 1, there is shown a block diagram of a data network 20 linking a number of clients 21, 22, 23 to a video file server 24 implementing various aspects of the present invention. The video file server 24 includes at least one stream server computer 25 and a data storage system 26. The stream server computer 25 has a processor 27 and a network link adapter 28 interfacing the processor to the data network 20. The processor 27 executes a data streaming program 29 in memory 30 in order to stream MPEG coded video in real-time to the clients.

Client requests for real-time video are placed in client play lists 31 in order to schedule in advance video file server resources for the real-time streaming of the MPEG coded video. The play lists 31 specify a sequence of video clips, which are segments of MPEG-2 files 32, 33 in data storage 34 of the data storage system 26. The stream server processor 27 accesses a client play list in advance of the time to begin streaming MPEG coded video from a clip, and sends a video prefetch command to a storage controller 35 in the data storage system 26. The storage controller responds to the video prefetch command by accessing the clip in the data storage 34 to transfer a segment of the clip to cache memory 36. When the video data of the segment needs to be sent to the client, the stream server processor 27 requests the data from the storage controller 35, and the storage controller immediately provides the video data from the cache memory 36. Further details regarding a preferred construction and programming of the video file server 24 are disclosed in Duso et al., U.S. Pat. No. 5,892,915 issued Apr. 6, 1999, entitled "System Having Client Sending Edit Commands to Server During Transmission Of Continuous Media From One Clip in Play List for Editing the Play List," incorporated herein by reference.

In accordance with an aspect of the invention, the stream server computer 25 executes an MPEG scaling program 38 to produce reduced-quality MPEG coded video from non-scalable MPEG-2 coded video by truncating discrete cosine transform (DCT) AC coefficients from the coded blocks in the MPEG-2 coded video data. The reduced-quality MPEG coded video can be produced during ingestion of an MPEG-2 file 32 from the network 20, and stored in one or more associated files 37. Alternatively, the reduced-quality MPEG coded video in the files 37 could be produced as a background task from the MPEG-2 file 32. Reduced-quality MPEG coded video could also be produced in real-time from an MPEG-2 file 33 during streaming of the reduced-quality MPEG coded video from the stream server computer 25 to the network 20. The reduced-quality MPEG coded video is useful for a variety of applications, such as browsing and review of stored MPEG-2 assets for search and play-list generation, bit stream scaling for splicing, and bit-rate adjustment via video quality alteration for services with limited resources.

A typical example of browsing for play-list generation involves searching stored assets in a multi-media data base for segments of a desired content to be included in the play list, and in particular selecting the beginning frame and ending frame of each segment to be included. Such editing occurs often in the broadcast environment for inserting commercials and news clips into pre-recorded television programming, and for editing movies for content and time compression. The decoding technique of the present invention permits a PC workstation 23 to perform the decoding and display in real-time by execution of a software program. An operator can view the video content in a display window 39 in a fast-forward or fast-reverse mode, stop at and resume from freeze frames that are valid "in points" and "out points" for seamless splicing, and select an in-point and out-point for a next segment to be included in the play list. The stream server computer 25 could also include a seamless splicing program 40 providing seamless transitions between video segments that are contiguous in a play list and are from different video clips.

For seamless splicing, it is often necessary to reduce the bitrate for one or more frames at the end of a first segment prior to splicing to a second segment. In this case the bitrate must be reduced to avoid buffer overflow as a result of displaying the original frames at the end of the first segment. One method of reducing the bitrate is to insert a freeze frame at the end of the first segment, but this has the disadvantage of introducing distortion in the temporal presentation of the frames and precluding frame accuracy. A less disruptive method is to use the present invention for reducing the bitrate for a lower-quality presentation of one or more frames at the end of the first segment.

The present invention can also reduce the transmission bit rate and storage requirements for MPEG-2 applications by altering the video quality. For example, different clients may present different bandwidth access requests for video from nonscalable MPEG-2 files 32, 33 in the video file server. Also, temporary network congestion may limit the bandwidth available to satisfy a request for real-time streaming of video data. In each case, the present invention can alter the video quality to meet the desired or available bandwidth to satisfy the request.

Figure 2:
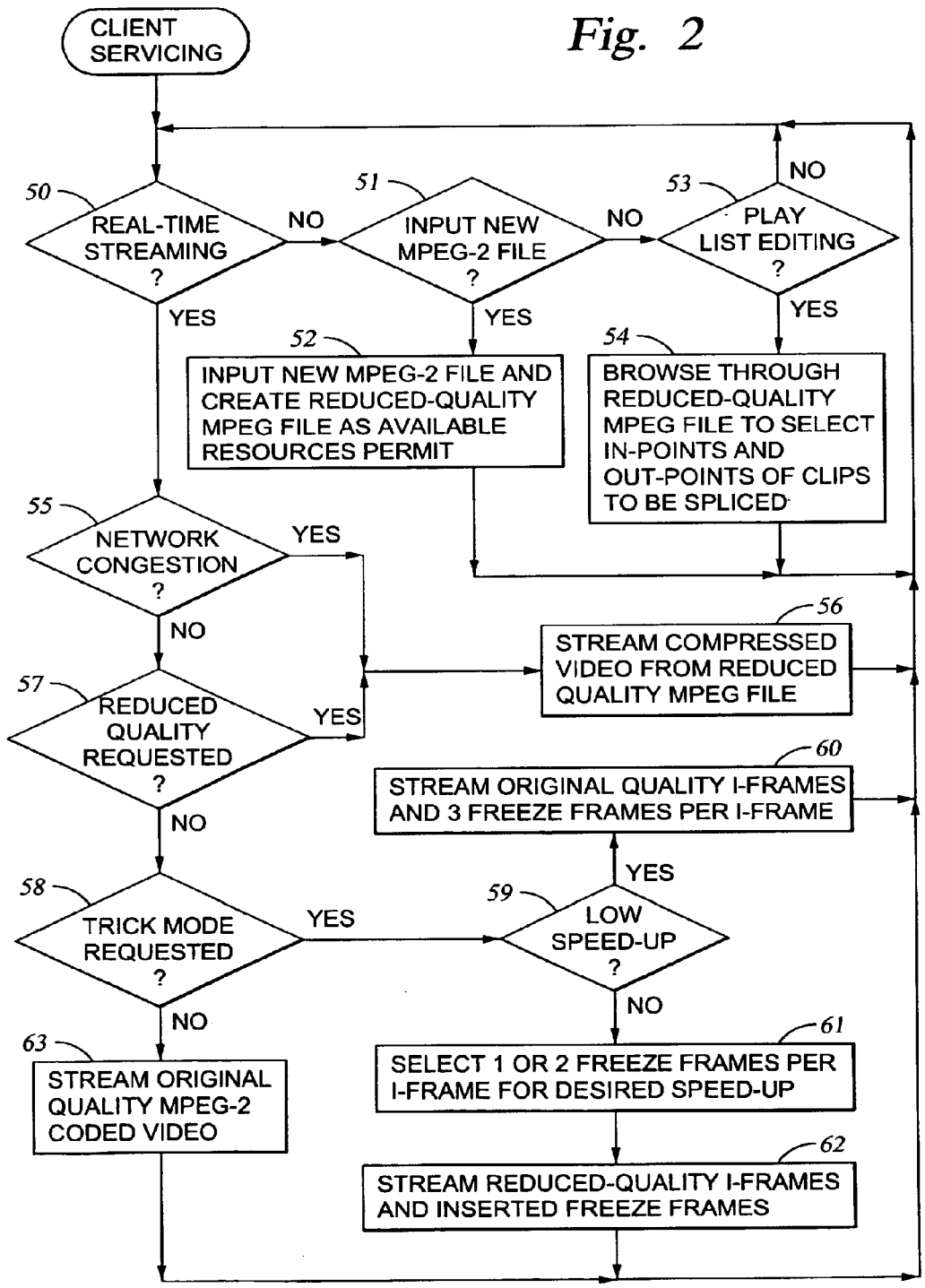
FIG. 2 is a flowchart of a procedure executed by a stream server computer in the video file server of FIG. 1 to service client requests.

With reference to FIG. 2, there is shown a flowchart of a procedure executed by a stream server computer in the video file server of FIG. 1 to service client requests. In a first step 50, execution branches to step 51 when a client request is not a request for real-time streaming. If the request is a request to input a new MPEG-2 file, then execution branches to step 52 to input the new MPEG-2 file and to create a reduced-quality version of the MPEG-2 file as available resources permit. If the request is not a request to input a new MPEG-2 file, then execution continues from step 51 to step 53. In step 53, execution branches to step 54 if the request is for play list editing. In step 54, the client may browse through the reduced-quality MPEG file to select in-points and out-points of clips to be spliced.

In step 50, when the request is for real-time streaming, then execution branches to step 55. In step 55, if there is network congestion so that there is insufficient bandwidth to transmit a stream of original-quality MPEG-2 coded video, then execution branches to step 56 to stream compressed video from the reduced-quality MPEG file. If no reduced-quality MPEG file is available for the desired clip, then the reduced-quality MPEG coded video to be streamed is produced in real-time from the original-quality MPEG-2 coded video. There are also applications, such as the display of spatially down-sampled video in a small display window (39 in FIG. 1), for which the client may request reduced-quality MPEG coded video. In this case, in the absence of network congestion, execution will continue from step 55 to step 57, and branch from step 57 to step 56 for streaming of reduced-quality MPEG coded video to the client.

Reduced-quality MPEG coded video is also useful for "trick-mode" operation. Trick-mode refers to fast forward or fast reverse display of video, in a fashion analogous to the fast forward and fast reverse playback functions of a video cassette recorder (VCR). The problem with trick-mode operation is that the transmission rate of the MPEG stream cannot simply be increased because the transmission bandwidth would be excessive and a conventional MPEG-2 decoder will not be able to handle the increased data rate or even if the decoder would have been able to support the increased data rate, such a change in the original operating conditions is not allowable. For this reason, in trick-mode, neither the original display rate of 29.97 frames per second (for NTSC or 25 frames per second for PAL) nor the original transport stream (TS) multiplex rate should change. Nor is it possible to simply decimate frames since only the I frames are independently coded, and the P frames and B frames need the content of certain other frames for proper decoding. The I frames typically occur once for every 15 frames. Assuming that this convention is followed in the encoding process, it would be possible to preserve and play each I frame from each and every group of pictures (GOP), resulting in a 15 times slower temporal sampling rate, or a 1 to 15 speeding up of motion if the I frames only are played back at the nominal NTSC rate of approximately 30 frames per second. Consequently, the content of a 60 minutes duration clip will be covered in 4 minutes. Unfortunately the average information content per frame for the I frames is more than the average information content of I, P and B frames. Therefore, the trick-mode cannot be implemented simply by transmitting only the I frames for a speed-up by a factor of 15, because this would need an increase in the TS multiplex rate over the nominal rate.

In particular, in a sample analysis the average information content of an I frame has been measured to be about 56374.6 bytes. If the I frames only are transmitted at the standard NTSC rate, then the bit transmission rate would be: 8 (bits per byte)* 56,374.6 (bytes per frame)* 29.97 (frames per sec.) or about 13,516,374.1 bits per second only for the video stream, which is significantly above—almost 3.38 times—the original rate of 4 megabits per second used in this test. This calculation, being based on an average quantity, is ignoring the indispensable need for an actually higher transport rate to provide some safety margin to handle short-term-sustained large size I and/or P frame chains (bursts) which practically always happen. Clearly, some form of modification in the trick-mode operation definition is required to handle this problem and pull the bit-rate requirement down to the nominal 4 megabits per second.

Two degrees of freedom are available to achieve such a reduction in the required bit-rate for trick-mode operation. The first is I frame compression quality and the second is a motion speed-up ratio. With respect to compression quality, it is well known that human observers' perception of image detail degrades with increasing motion speed of objects in the scene. Based on this fact, the type of D pictures were introduced in MPEG-1 video syntax for fast visible (forward or reverse) search purposes. (See ISO/IEC 11172-2: 1993 Information Technology—Coding of moving pictures and associated audio for digital storage media at up to about 1.5 Mbits/s—Part 2: Video, Annex D.6.6. Coding D-Pictures, p.102). D pictures make use of only the DC coefficients in intra coding to produce very low quality (in terms of SNR) reproductions of desired frames which were judged to be of adequate quality in fast search mode.

In order to provide support for enhanced quality trick-mode operation, the quality of the original I frames can be reduced by the preservation of just a sufficient number of AC DCT coefficients to meet the bit-rate limitation. Based on experiments with two standard video test sequences (one encoded at 15 Mbits/sec. and the other at 24 Mbits/sec. and both with I frames only), it is observed that the bandwidth for I frames can be scaled to one half by keeping about 9 lowest order AC coefficients and eliminating the rest. This scheme provides good quality even at the full spatial and temporal resolution, much better than D pictures.

The inherent speed-up ratio lower bound imposed by the GOP structure can be relaxed and further lowered by freeze (P) frame substitution in between genuine (SNR scaled or non-scaled) I frames. The maximum number of freeze frames that can be inserted before visually disturbing motion jerkiness occurs, is very likely to depend heavily on the original GOP structure (equivalently the separation between I frames of the original sequence) and the original amount of motion in the clip. However, 1, 2 or 3 freeze frame substitutions in between genuine I frames present reasonable choices which will yield speed-up ratios of 1 to 7.5, 1 to 5 and 1 to 3.75 respectively instead of the 1 to 15 speed-up ratio provided by the genuine I frames only implementation. (These ratios are computed by a first-order approximation that neglects a slight increase in bandwidth required by the consecutive freeze frames, which are inserted in between genuine I frames and can typically be made very small in size in comparison to the average size of a genuine I frame. Therefore, the insertion of 1, 2, 3 freeze frames will result in bandwidth reductions of 2 to 1, 3 to 1 and 4 to 1 respectively. The accuracy of this approximation degrades as more consecutive freeze frames and/or SNR scaling is employed.) An easy way to see the validity of these approximate figures is to note for example that in the case of 1 freeze frame insertion, the total presentation time of the trick-mode clip for an originally 60 minutes duration asset will increase from 4 minutes to 8 minutes. Since due to the underlying assumption of the first-order approximation stated above, the same amount of data (I frames only) will be transmitted in this doubled time interval, the bandwidth requirement will be halved. The final choice for trick-mode implementation should reflect a balanced trade-off along these two degrees of freedom. For example, SNR scaling of I frames down to 9 AC coefficients can be used along with single freeze frame insertion between I frames. These two choices, both of which are individually capable of providing a 2 to 1 bandwidth reduction as discussed before, will yield a combined 4 to 1 bandwidth reduction which will comfortably bring the non-scaled I frame-only bit-rate of 13516374.1 bits/sec. down to below the 4 Mbits/sec. quota. If the visual quality provided by 9 AC coefficients is not considered adequate, then SNR scaling could be tuned to keep more AC coefficients at the expense of a smaller bandwidth reduction. This, however, could be compensated consequently by increasing the number of freeze frames to be used in between I frames. Coarser quantization (and therefore poorer visual quality) can be tolerated at high trick-mode speeds and better visual quality should be retained at lower trick-mode speeds.

With reference to FIG. 2, if the client has requested trick-mode operation, execution branches from step 58 to step 59. In step 59, execution branches to step 60 for a low value of speed-up. In step 60, the trick-mode stream is produced by streaming original-quality I frames and inserting three freeze frames per I frame, to yield a speed-up factor of 15/4=3.75 based on an original MPEG-2 coded stream having one I frame for every 15 frames. For a higher speed-up factor, execution branches from step 59 to step 61. In step 61, either one or two freeze frames are selected per I frame to provide a speed-up factor of 15/2=7.5, or 15/3=5 respectively. Then in step 62 the trick-mode stream is produced by streaming reduced-quality I frames and inserting the selected number of freeze frames between the reduced-quality I frames. If a trick-mode operation is not requested in step 58, then execution continues from step 58 to step 63. In step 63, the stream server computer streams original-quality MPEG-2 coded data to the client. Further details regarding trick-mode operation are described below with reference to FIGS. 7 to 10.

II. MPEG Splicing

FIGS. 3 to 6 show further details regarding use of the present invention for MPEG splicing. In particular, reduced-quality frames are substituted for the freeze frames used in the seamless splicing procedure found in the common disclosure of Peter Bixby et al., U.S. application Ser. No. 09/539,747 filed Mar. 31, 2000; Daniel Gardere et al., U.S. application Ser. No. 09/540,347 filed Mar. 31, 2000; and John Forecast et al. U.S. application Ser. No. 09/540,306 filed Mar. 31, 2000; which are all incorporated by reference herein. The common disclosure in these U.S. applications considered pertinent to the present invention is included in the written description below with reference to FIGS. 3 to 6 in the present application (which correspond to FIGS. 19, 22, 23, and 24 in each of the cited U.S. applications).

Figure 3:
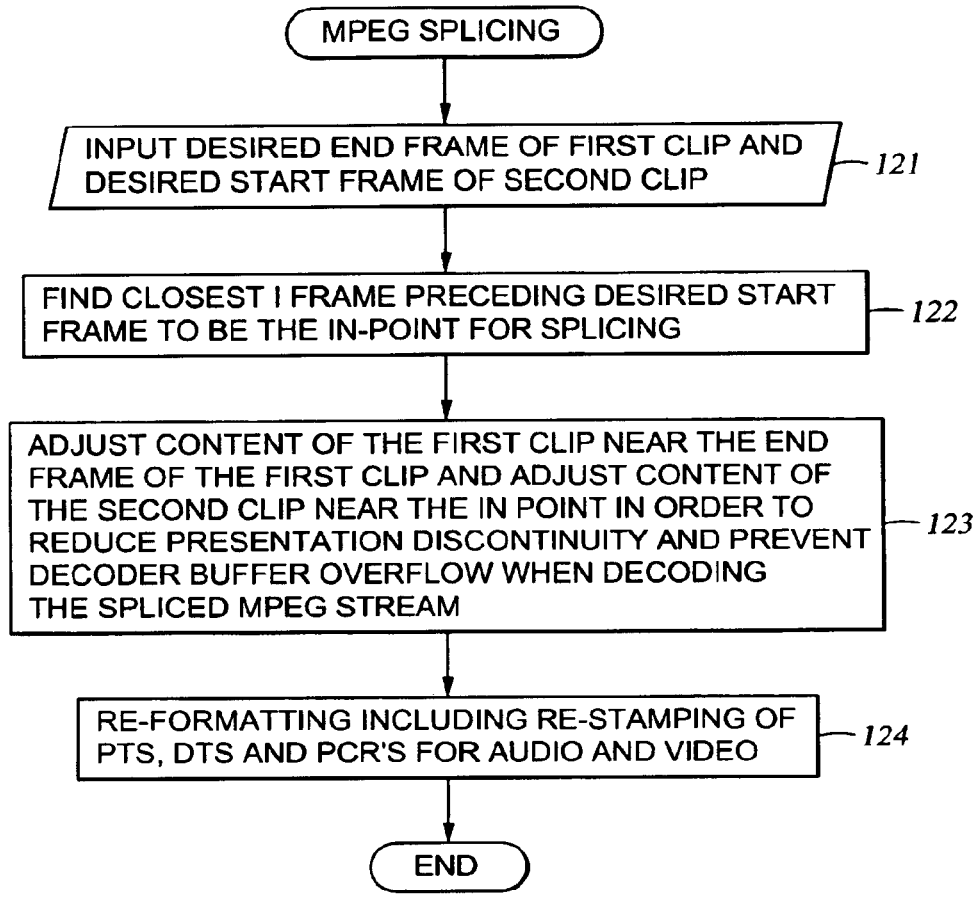
FIG. 3 is a flowchart of a procedure for splicing MPEG clips.

FIG. 3 shows a basic procedure for MPEG splicing. In the first step 121, the splicing procedure receives an indication of a desired end frame of the first clip and a desired start frame of the second clip. Next, in step 122, the splicing procedure finds the closest I frame preceding the desired start frame to be the In Point for splicing. In step 123, the splicing procedure adjusts content of the first clip near the end frame of the first clip and adjusts content of the second clip near the In Point in order to reduce presentation discontinuity (due to decoder buffer underflow) and also to prevent decoder buffer overflow when decoding the spliced MPEG stream. Finally, in step 124, the concatenation of the first clip up to about the Out Point and the second clip subsequent to about the In Point is re-formatted, including re-stamping of the presentation time stamps (PTS), decoding time stamps (DTS), and program clock reference (PCR) values for the audio and video streams in the second clip.

Considering now video splicing, the splicing procedure should ensure the absence of objectionable video artifacts, preserve the duration of the spliced stream, and if possible, keep all of the desired frames in the spliced stream. The duration of the spliced stream should be preserved in order to prevent any time drift in the scheduled play-list. In some cases, it is not possible to keep all of the original video frames due to buffer problems.

Management of the video buffer is an important consideration in ensuring the absence of objectionable video artifacts. In a constant bit rate (CBR) and uniform picture quality sequence, subsequent pictures typically have coded representations of drastically different sizes. The encoder must manage the decoder's buffer within several constraints. The buffer should be assumed to have a certain size defined in the MPEG-2 standard. The decoder buffer should neither overflow nor underflow. Furthermore, the decoder cannot decode a picture before it receives it in full (i.e. completely). Moreover, the decoder should not be made to "wait" for the next picture to decode; this means that every 40 ms in PAL and 1/29.97 second in NTSC, the decoder must have access to a full picture ready to be decoded.

The MPEG encoder manages the video decoder buffer through decode time stamps (DTS), presentation time stamps (PTS), and program clock reference (PCR) values. When splicing the end of a first clip to the beginning of a second clip, there will be a problem of video buffer management if a duration of time $DTS_{L1}-T_e$ is different from a duration of time $DTS_{F2}-PCR_{e2}$ minus one video frame (presentation) interval, where $DTS_{L1}$ is the DTS at the end of the first clip and indicates the time at which the video decoder buffer is emptied of video data from the first clip, $T_e$ is the time at which the last video frame's data is finished being loaded into the video decoder buffer, $DTS_{F2}$ is the DTS of the first frame of the second clip, and $PCR_{e2}$ is the PCR of the second clip extrapolated from the value of the most recent received genuine PCR record, to the first byte of the picture header sync word of the first video frame in the clip to start. The extrapolation adjusts this most recently received genuine PCR record value by the quotient of the displacement in data bits of the clip from the position where it appears in the second clip to the position at which video data of the first frame of the second clip begins, divided by the data transmission bit rate for transmission of the clip to the decoder. Because the time $PCR_{e2}$ must immediately follow $T_e$, there will be a gap in the decoding and presentation of video frames if $DTS_{F2}-PCR_{e2}$ is substantially greater than $DTS_{L1}-T_e$ plus one video frame interval. In this case, the buffer will not be properly full to begin decoding of the second clip one video frame interval after the last frame of the first clip has been decoded. Consequently, either the second clip will be prematurely started to be decoded or the decoder will be forced to repeat a frame one or more times after the end of the display of the last frame from the first clip to provide the required delay for the second clip's buffer build-up. In the case of a premature start for decoding the second clip, a video buffer underflow risk is generated. On the other hand, in case of repeated frames, the desired frame accuracy for scheduled play-lists is lost besides the fact that neither a guaranteed safe buffer management can be achieved through this procedure.

If $DTS_{F2}-PCR_{e2}$ is substantially less than $DTS_{L1}-T_e$ plus one video frame interval, then the decoder will not be able to decode the first frame of the second clip at the specified time $DTS_{F2}$ because either the last frame of the first clip will not yet have been removed from the video buffer or the last frame of the first clip has already been moved but the frame interval duration required before decoding the next frame has not elapsed yet. In this case a video buffer overflow risk is generated. Video buffer overflow may present a problem not only at the beginning of the second clip, but also at a subsequent location of the second clip. If the second clip is encoded by an MPEG-2 compliant encoder, then video buffer underflow or buffer overflow will not occur at any time during the decoding of the clip. However, this guarantee is no longer valid if the $DTS_{F2}$–$PCR_{e2}$ relationship at the beginning of the second clip is altered. Consequently, to avoid buffer problems, the buffer occupancy at the end of the first clip must be modified in some fashion. This problem is inevitable when splicing between clips having significantly different ending and starting buffer levels. This is why the Society of Motion Picture and Television Engineers (SMPTE) has defined some splice types corresponding to well-defined buffer levels. (See SMPTE Standard 312M, entitled "Splice Points for MPEG-2 Transport Streams," SMPTE Journal, November 1998.) In order to seamlessly splice the first clip to the second clip, the content of the first clip (towards its end) is modified so that $PCR_{e2}$ can immediately follow $T_e$ (by one byte transmission time) and $DTS_{F2}$ can just follow $DTS_{L1}$ (by one video frame presentation interval).

Figure 4:
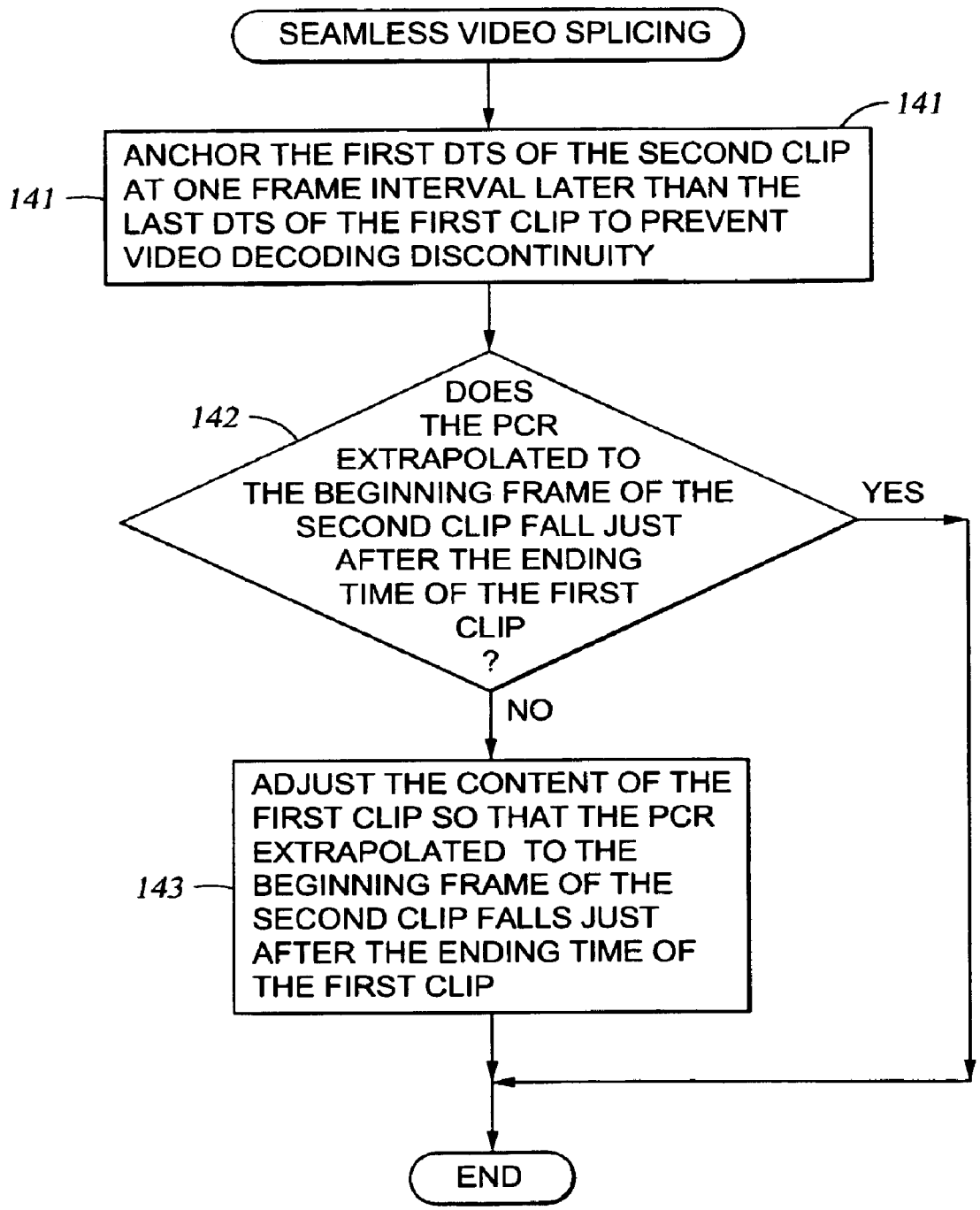
FIG. 4 is a flowchart of a procedure for seamless video splicing of MPEG clips.

FIG. 4 shows a flow chart of a seamless video splicing procedure that attains the desired condition just described above. In a first step 141, the first DTS of the second clip is anchored at one frame interval later than the last DTS of the first clip in order to prevent a video decoding discontinuity. Then, in step 142, the procedure branches depending on whether the PCR extrapolated to the beginning frame of the second clip falls just after the ending time of the first clip. If so, then the splice will be seamless with respect to the original video content. Otherwise, the procedure branches to step 143. In step 143, the content of the first clip is adjusted so that the PCR extrapolated to the beginning frame of the second clip falls just after the ending time of the first clip. Therefore the desired conditions for seamless video splicing are achieved.

Figure 5:
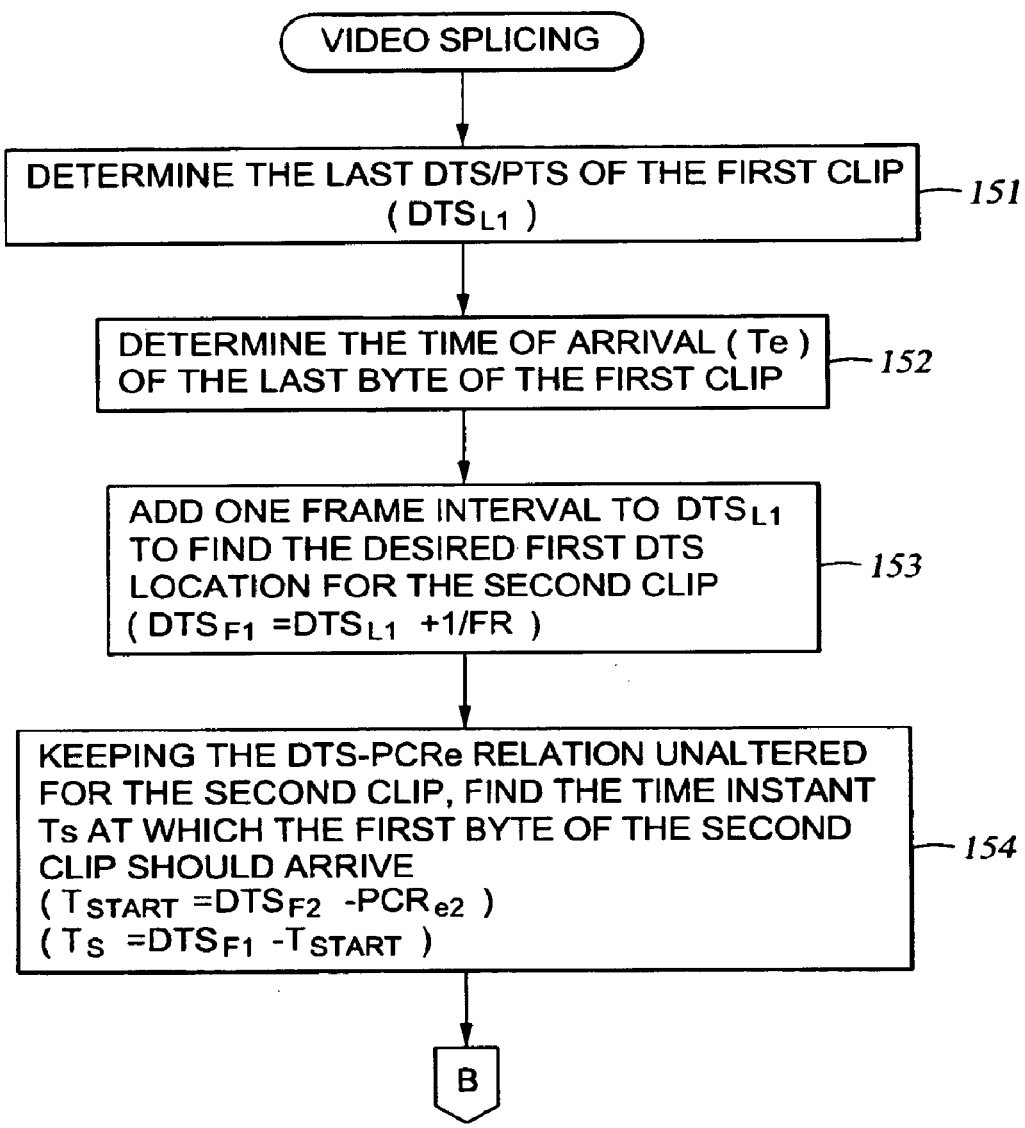
FIG. 5 is a more detailed flowchart of the procedure for seamless video splicing of MPEG clips.

With reference to FIG. 5, there is shown a more detailed flow chart of a seamless video splicing procedure. In a first step 151, the procedure inspects the content of the first clip to determine the last DTS/PTS of the first clip. This last DTS/PTS of the first clip is designated $DTS_{L1}$. Next, in step 152, the procedure inspects the content of the first clip to determine the time of arrival ($T_e$) of the last byte of the first clip. In step 153, the procedure adds one frame interval to $DTS_{L1}$ to find the desired first DTS location for the second clip. The sum, designated $DTS_{F1}$, is equal to $DTS_{L1}+1/FR$, where FR is the video frame rate. In step 154, while keeping the $DTS_{F2}$–$PCR_{e2}$ relationship unaltered for the second clip, the procedure finds the time instant, designated $T_S$, at which the first byte of the second clip should arrive at the decoder buffer. This is done by calculating $T_{START}=DTS_{F2}-PCR_{e2}$, and $T_S=DTS_{F1}-T_{START}$.

Figure 6:
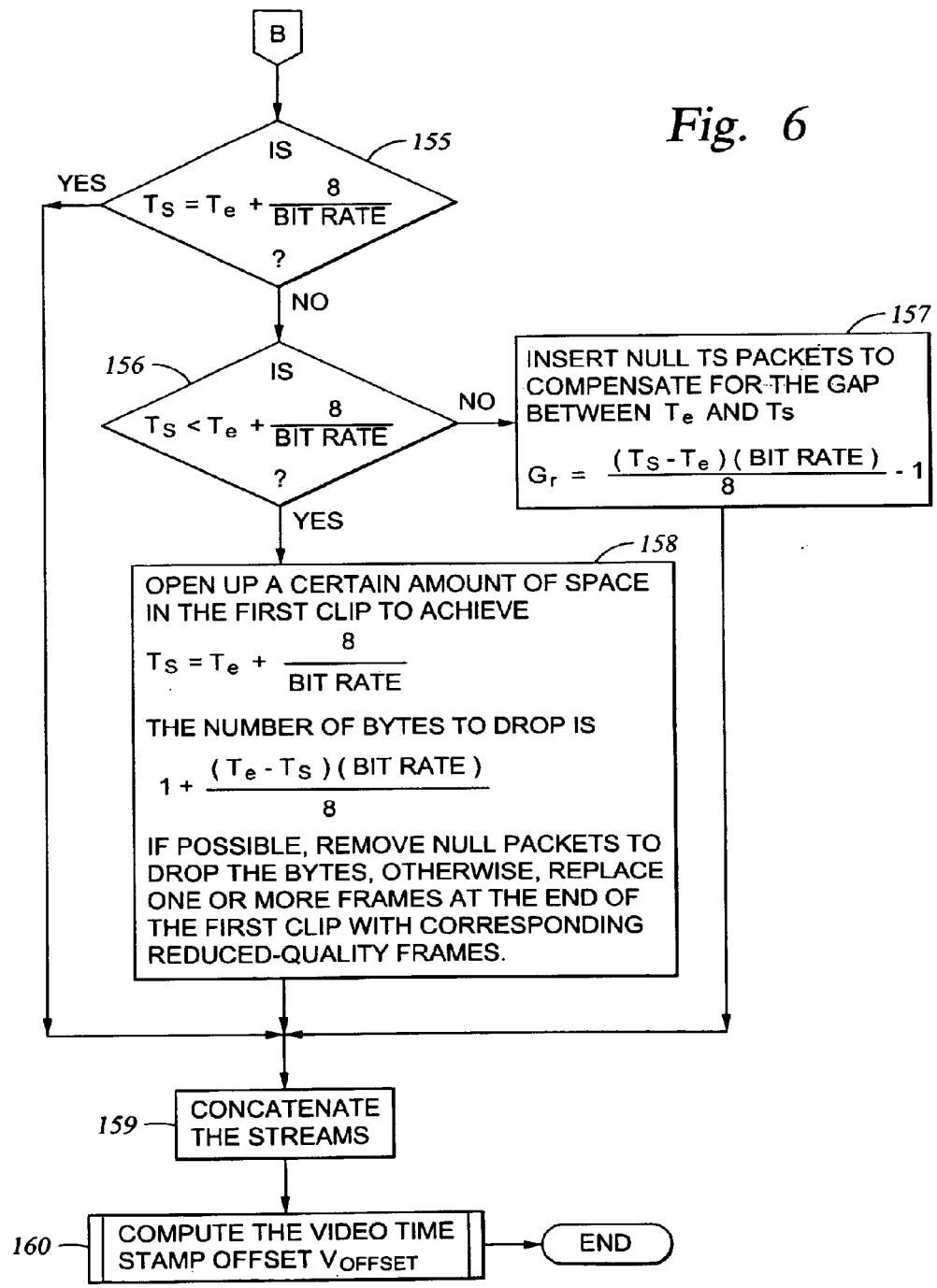
FIG. 6 is a continuation of the flowchart begun in FIG. 5.

Continuing in FIG. 6, in step 155, execution branches depending on whether $T_S$ is equal to $T_e$ plus 8 divided by the bit rate. If not, then the clips to be spliced need modification before concatenation, and execution branches to step 156. In step 156, execution branches depending on whether $T_S$ is less than $T_e$ plus 8 divided by the bit rate. If not, then there is an undesired gap in between the clips to be spliced, and execution branches to step 157. In step 157, null packets are inserted into the clips to be spliced to compensate for the gap. The gap to be compensated has a number of bytes, designated $G_r$, equal to $(T_S-T_e)(BIT\ RATE)/8$ minus one. If in step 156, $T_S$ is less than $T_e$ plus 8 divided by the bit rate, then execution continues from step 156 to step 158 to open up a certain amount of space in the first clip to achieve $T_S=T_e+8/(BIT\ RATE)$. The number of bytes to drop is one plus $(T_e-T_S)(BIT\ RATE)/8$. If possible, the bytes are dropped by removing null packets. Otherwise, one or more frames at the end of the first clip are replaced with corresponding reduced-quality frames, which have fewer bytes than the original-quality frames at the end of the first clip.

If in step 155 $T_S$ is found to be equal to $T_e$ plus 8 divided by the bit rate, then execution continues to step 159. Execution also continues to step 159 from steps 157 and 158. In step 159, the transport streams from the two clips are concatenated. Finally, in step 160, a subroutine is called to compute a video time stamp offset, designated as $V_{OFFSET}$. This subroutine finds the DTS of the last video frame (in decode order) of the first clip. This DTS of the last video frame of the first clip is denoted $DTS_{VL1}$. Then the subroutine finds the original DTS of the first frame to be decoded in the second clip. This DTS of the first frame to be decoded in the second clip is denoted $DTS_{VF2}$. Finally, the subroutine computes the video time stamp offset $V_{OFFSET}$ as $DTS_{VL1}-DTS_{VF2}$ plus one video frame duration.

III. Trick Mode Operation

FIGS. 7 to 10 show further details regarding trick-mode operation. FIG. 7 shows a timing relationship between video presentation units (VPUs) and associated audio presentation units (APUs) in an original MPEG-2 coded data stream, and FIG. 8 shows similar timing for the fast-forward trick-mode stream produced from the original data stream of FIG. 7. (The fast-forward trick-mode stream is an example of a trick-mode stream that could be produced in step 60 of FIG. 2.) The original data stream has successive video presentation units for video frames of type I, B, B, P, B respectively. The trick-mode stream has successive video presentation units for video frames of types I, F, F, I, F where "F" denotes a freeze P (or possibly B) frame. Each I frame and immediately following F frames produce the same video presentation units as a respective I frame in the original data stream of FIG. 7, and in this example, one in every 15 frames in the original data stream is an I frame. Each freeze frame is coded, for example, as a P frame repeating the previous I frame or the previous P-type freeze-frame (in display order). In each freeze frame, the frame is coded as a series of maximum-size slices of macroblocks, with an initial command in each slice indicating that the first macroblock is an exact copy of the corresponding macroblock in the previous frame (achieved by predictive encoding with a zero valued forward motion compensation vector and no encoded prediction error), and two consequent commands indicating that the following macroblocks in the slice until and including the last macroblock of the slice are all coded in the same way as the first macroblock.

For trick-mode operation, there is also a problem of how to select audio presentation units (APU) to accompany the video presentation units that are preserved in the trick-mode stream. Because the video presentation units (VPU) have a duration of (1/29.97) sec. or about 33.37 msec. and the audio presentation units (APU) typically have a duration of 24 msec., there is neither a one-to-one correspondence nor alignment between VPUs and APUs. In a preferred implementation, the audio content of a trick-mode clip is constructed as follows. Given the total presentation duration (1/29.97) sec. or about 33.37 msec. for a single video frame, it is clear that always at least one and at most two 24 msec. long audio presentation units (APU) will start being presented during the end-to-end presentation interval of each video frame. This statement refers to the original clip and does not consider any audio presentation unit whose presentation is possibly continuing as the video frame under consideration is just put on the display. The first of the above mentioned possibly two audio presentation units will be referred to as the aligned audio presentation unit with respect to the video frame under consideration. For example, in FIG. 8, the $APU_j$ is the aligned audio presentation unit with respect to the $VPU_i$. Now, when the I frames are extracted and possibly SNR scaled and possibly further interleaved with a number of freeze P frames in between them to produce the trick-mode video packetized elementary stream (PES), the associated trick-mode audio stream is constructed as follows. For each I type video frame presentation interval (and for that matter also for freeze P type video frames) in this trick-mode clip, the above stated fact of at least one (and at most two) audio presentation unit being started, holds. Then for each I frame presentation interval in the trick-mode clip, once any possibly previously started and continuing audio presentation unit ends, insert its aligned audio presentation unit (from the original clip) and continue inserting APUs from the original clip subsequent to the aligned one until covering the rest of the I frame presentation interval and also any possibly following freeze P frame presentation intervals until crossing into and overlapping (or less likely aligning) with the next I frame's presentation interval. In FIG. 8, for example, the audio presentation units $APU_j$, $APU_{j+1}$, $APU_{j+2}$, and $APU_{j+3}$ are inserted, until crossing into and overlapping with the next I frame $VPU_{i+15}$. Following $APU_{j+3}$ is inserted $APU_k$, which designates the APU aligned with $VPU_{i+15}$ in the original stream. Clearly, the final alignment of (the aligned and consequent) audio presentation units with respect to their associated I frames will be slightly different in the trick-mode clip as compared to the original clip. However, considering how the trick-mode audio component will sound like, this poses no problem at all.

FIG. 9 is a flowchart of a procedure for producing the desired sequencing of audio presentation units (APUs) in the fast-forward trick-mode stream. This procedure scans the audio elementary stream in the original MPEG-2 stream to determine the sequence of APUs in the original stream and their presentation-time alignment with the I frames in the video elementary stream of the original MPEG-2 transport stream, while selecting APUs to include in the trick-mode stream. In a first step 171, execution proceeds once the end of the current APU is reached. If the end of the current APU has not entered a new VPU (i.e., the beginning of the current APU is within the presentation time of one VPU and the end of the current APU is within the presentation time of the same VPU), or if it has entered a new VPU (i.e., the beginning of the current APU is within the presentation time of one VPU and the end of the current APU is within the presentation time of a new (next) VPU) but the new VPU is not an I frame, then execution branches to step 174. In step 174, an APU pointer is incremented, and in step 175 execution proceeds into this next APU. If in step 173 the end of the current APU extends into an I frame, then in step 176 the APU pointer is advanced to point to the first APU beginning within the duration of the VPU of the I frame in the original MPEG-2 stream.

Figure 10:
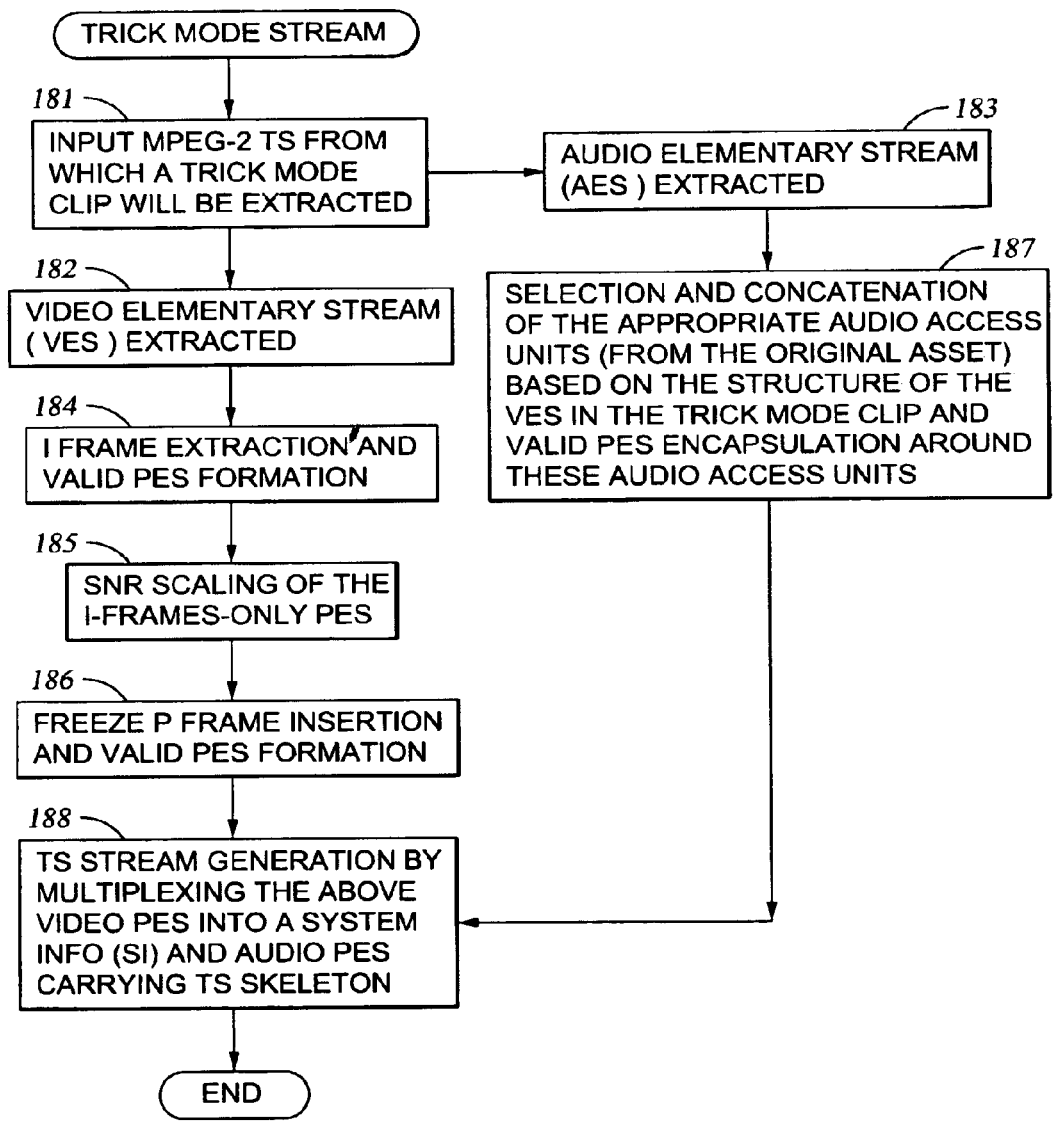
FIG. 10 is a flowchart of a procedure for producing a trick-mode MPEG-2 transport stream from a regular MPEG-2 transport stream (TS)

FIG. 10 is a flowchart of a procedure for producing a trick-mode stream from an MPEG-2 transport stream (TS). In a first step 181, the MPEG-2 TS is inputted. In step 182, the video elementary stream (VES) is extracted from the TS. In step 183, a concurrent task extracts the audio elementary stream (AES) from the TS. In step 184, I frames are extracted from the VES and valid packetized elementary stream (PES) packets are formed encapsulating the I frames. In step 185, the I frames are SNR scaled, for the high speed cases of the trick-mode. In step 186, P-type freeze frames are inserted into the stream of SNR scaled I frames (in between the scaled I frames), and valid PES packets are formed for the trick-mode VES encapsulating the P-type freeze frames and the SNR scaled I frames. Concurrently, in step 187, appropriate audio access units (from the originally input MPEG-2 TS asset) are selected and concatenated based on the structure of the VES being formed for the trick-mode clip, as described above with reference to FIG. 9, and valid PES packet encapsulation is formed around these audio access units. Finally, in step 188, the trick-mode TS stream is generated by multiplexing the trick-mode VES from step 186 into a system information (SI) and audio PES carrying TS skeleton including the audio PES packets from step 187.

Figure 11:
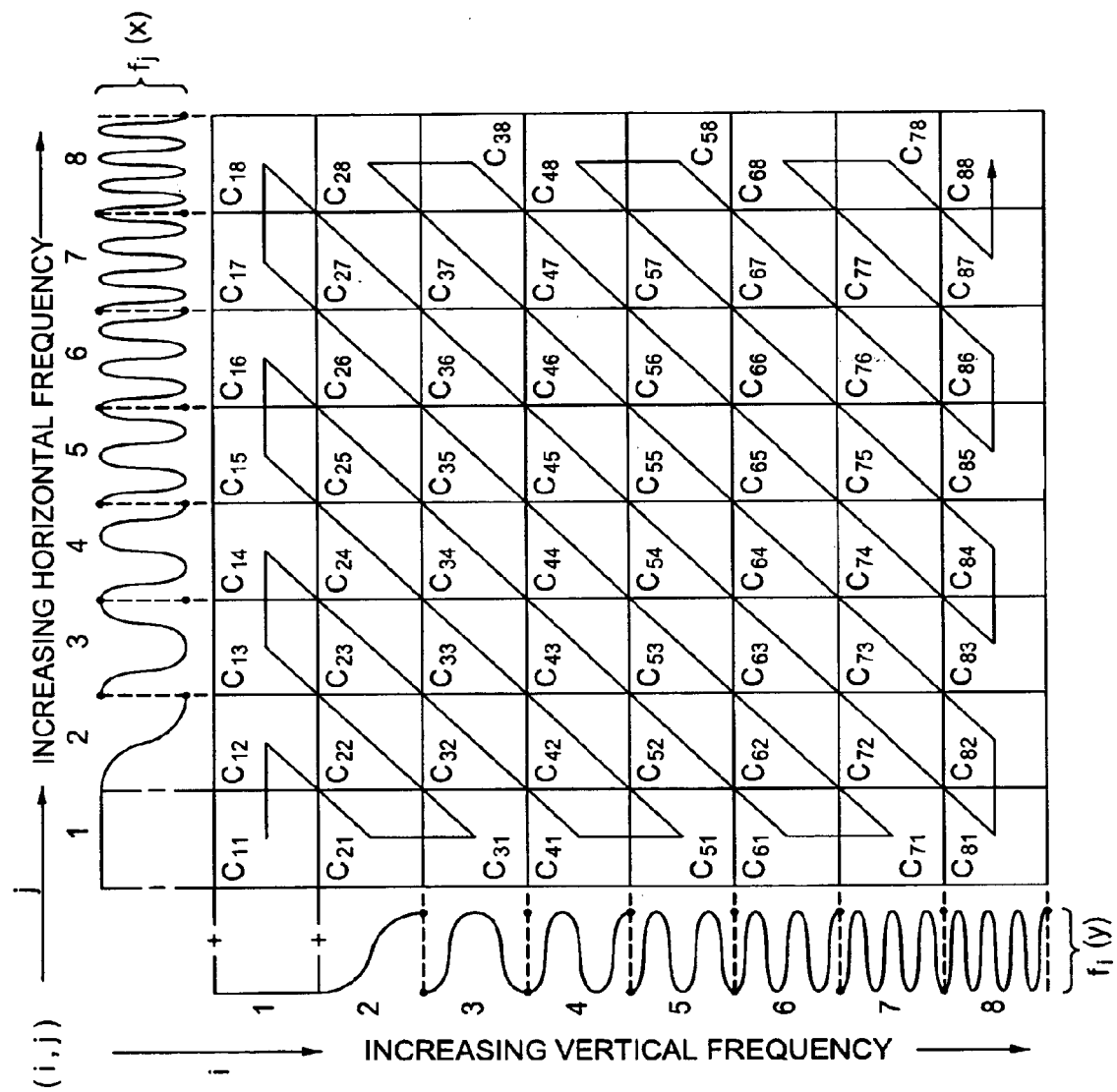
FIG. 11 is a diagram illustrating relationships between the MPEG discrete cosine transform (DCT) coefficients, spatial frequency, and the typical zig-zag scan order.

IV. Truncation of AC DCT Coefficients for Producing Low-Quality MPEG Coded Video FIGS. 11 to 19 include details of the preferred techniques for truncating AC DCT coefficients for producing low-quality MPEG-2 coded video from original-quality MPEG-2 coded video. Most of these techniques exploit the fact that in the typical (default) zig-zag scan order, the basis functions for the high-order AC DCT coefficients have an increasing frequency content. FIG. 11, for example, shows a matrix of the DCT coefficients $C_{ij}$. The row index (i) increases with increasing vertical spatial frequency in a corresponding 8×8 coefficient block, and the column index (j) increases with increasing horizontal spatial frequency in the corresponding 8×8 coefficient block. The coefficient $C_{11}$ has zero frequency associated with it in both vertical and horizontal directions, and therefore it is referred to as the DC coefficient of the block. The other coefficients have non-zero spatial frequencies associated with their respective basis functions, and therefore they are referred to as AC coefficients. Each coefficient has an associated basis function $f_{ij}(x, y)$ that is separable into x and y components such that $f_{ij}(x, y)=f_i(y) f_j(x)$. The x and y component functions $f_i(y)$ and $f_j(x)$ are shown graphically in FIG. 11 as cosine functions in order to illustrate their associated spatial frequencies. In practice, the component functions are evaluated at discrete points for the 64 pixel positions in the 8×8 blocks, so that each of the DCT basis functions is an 8×8 array of real numbers. In particular, the component functions are:

$$f_i(y)=\text{SQRT}((2-\delta_{i-1})/8)(\cos((\pi/8)(y-\tfrac{1}{2})(i-1))) \text{ for } y=1, 2, 3, \ldots, 8$$

$$f_j(x)=\text{SQRT}((2-\delta_{j-1})/8)(\cos((\pi/8)(x-\tfrac{1}{2})(j-1))) \text{ for } x=1, 2, 3, \ldots, 8$$

where $\delta_0=1$, and $\delta_p=0$ for p>0. The path including a number of diagonal line segments through the matrix of coefficients in FIG. 11 denotes the default zig-zag scan order typically used for MPEG-2 encoding. Listed in this order, the coefficients are $C_{11}$, $C_{12}$, $C_{21}$, $C_{31}$, $C_{22}$, $C_{13}$, $C_{14}$, $C_{23}$, $C_{32}$, $C_{41}$, ..., $C_{86}$, $C_{77}$, $C_{68}$, $C_{78}$, $C_{87}$, $C_{88}$. The first coefficient in this zig-zag scan order is the DC coefficient $C_{11}$ providing the lowest spatial frequency content in the 8×8 block of pixels, and the last coefficient in this zig-zag scan order is the coefficient $C_{88}$ providing the highest spatial frequency content in the 8×8 block of pixels.

Figure 12:
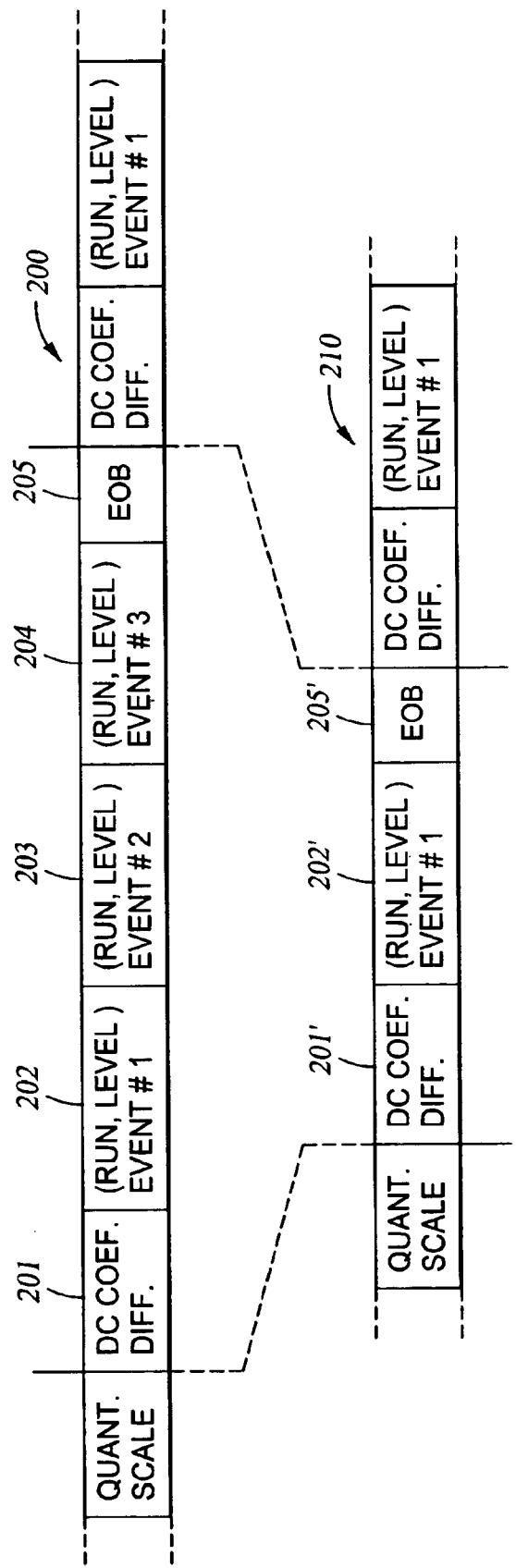
FIG. 12 is a diagram illustrating a relationship between an MPEG-2 coded bit stream and a reduced-quality MPEG-2 coded bit stream resulting from truncation of high-order DCT coefficients.

FIG. 12 is a diagram illustrating a relationship between an original MPEG-2 coded bit stream 200 and a reduced-quality MPEG-2 coded bit stream 210 resulting from truncation of high-order DCT coefficients from the original MPEG-2 coded bit stream. Shown in the original MPEG-2 coded bit stream 200 is a portion of a video PES packet including DCT coefficients for an 8×8 pixel block. The DCT coefficients include a differentially coded DC coefficient 201, and three (run, level) events 202, 203, 204 encoding three respective nonzero AC coefficients possibly along with some zero valued AC coefficients preceding the three non-zero valued ones. The DCT coefficients are ordered according to the zig-zag scan order shown in FIG. 11 (or possibly according to an alternate zig-zag scan pattern also supported by the MPEG-2 standard), and AC coefficients having zero magnitude are described in terms of total counts of consecutive zero valued coefficients lying in between two nonzero valued coefficients, in the MPEG-2 coded bit stream. An end-of-block (EOB) code 205 signals the end of the encoded DCT coefficients for the current block. The reduced-quality MPEG-2 coded bit stream 210 includes a DC coefficient 201' identical to the DC coefficient 201 in the original MPEG-2 coded bit stream 200, and a (run, level) event 202' identical to the (run, level) event 202 in the original MPEG-2 coded bit stream 200. Second and third (run, level) events, however, have been omitted from the reduced-quality MPEG-2 bit stream 210, because an EOB code 205' immediately follows the (run, level) event 202'. Therefore, the two nonzero high-order AC DCT coefficients encoded by the second and third (run, level) events 203, 204 have been omitted from the reduced-quality MPEG-2 bit stream 210.

Figure 13:
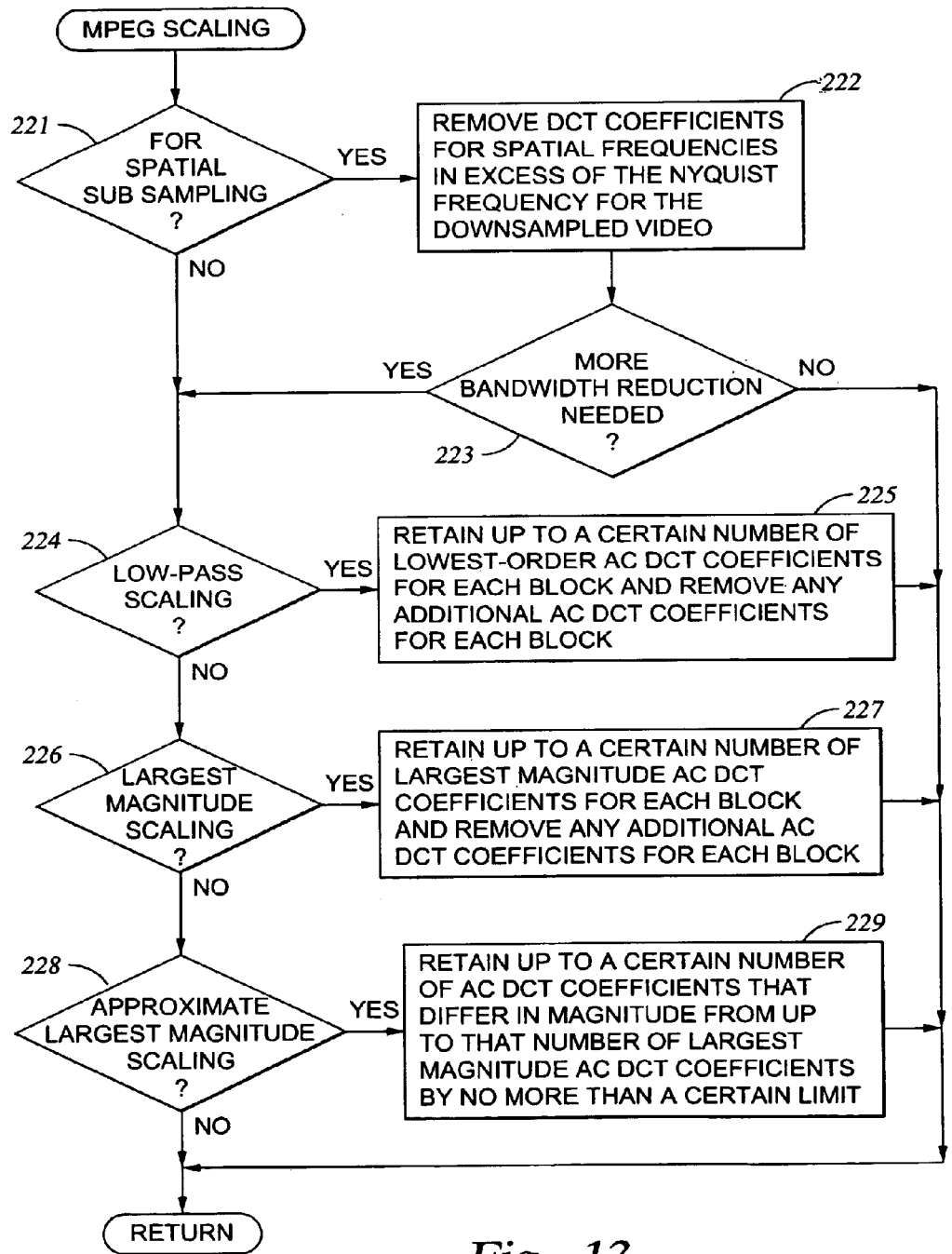
FIG. 13 is a flowchart of a procedure for scaling MPEG-2 coded video using a variety of techniques.

FIG. 13 is a flowchart of a procedure for scaling MPEG-2 coded video using a variety of techniques including the omission of AC DCT coefficients. The procedure operates upon an original-quality MPEG-2 coded video stream by removing AC DCT coefficients in this stream to produce a lower quality MPEG coded video stream. In a first step 221, execution branches to step 222 if the scaled MPEG coded video is to be spatially subsampled. In step 222, the procedure removes any and all DCT coefficients for spatial frequencies in excess of the Nyquist frequency for the downsampled video. For example, if the low-quality video stream will be downsampled by a factor of two in both the vertical and the horizontal directions, then the procedure removes any and all DCT coefficients having a row index (i) greater than four and any and all DCT coefficients having a column index (j) greater than four. This requires the decoding of the (run, level) coded coefficients to the extent necessary to obtain an indication of the coefficient indices. If a sufficient number of the original AC DCT coefficients are removed for a desired bandwidth reduction, then the scaling procedure is finished. Otherwise, execution branches from step 223 to step 224. Execution also continues from step 221 to step 224 if spatial downsampling is not intended.

In step 224, execution branches to step 225 if low-pass scaling is desired. Low-pass scaling requires the least computational resources and may produce the best results if the scaled, low-quality MPEG coded video is spatially downsampled. In step 225, the procedure retains up to a certain number of lowest-order AC DCT coefficients for each block and removes any additional DCT coefficients for each block. This is a kind of frequency domain signal-to-noise ratio scaling (FDSNR) that will be designated FDSNR_LP. A specific example of the procedure for step 225 will be described below with reference to FIG. 14.

Execution continues from step 224 to step 226 if low-pass scaling is not desired. In step 226, execution branches to step 227 if largest magnitude based scaling is desired. Largest magnitude based scaling produces the least squared error or difference between the original-quality MPEG-2 coded video and the reduced-quality MPEG coded video for a given number of nonzero AC coefficients to preserve, but it requires more computational resources than the low-pass scaling of step 225. More computational resources are needed because if there are more nonzero AC coefficients than the desired number of AC coefficients for a block, then the (run, level) events must be decoded fully to obtain the coefficient magnitudes, and additional resources are required to find the largest magnitude coefficients. In step 227, the procedure retains up to a certain number of largest magnitude AC DCT coefficients for each block, and removes any and all additional AC DCT coefficients for each block. This is a kind of frequency domain signal-to-noise ratio scaling (FDSNR) that will be designated FDSNR_LM. A specific example of the procedure for step 227 will be described below with reference to FIG. 15.

If in step 226 largest magnitude based scaling is not desired, then execution continues to step 228. In step 228, execution branches to step 229 to retain up to a certain number of AC DCT coefficients that differ in magnitude from up to that number of largest magnitude AC DCT coefficients by no more than a certain limit. This permits a kind of approximation to FDSNR_LM in which an approximate search is undertaken for the largest magnitude AC DCT coefficients if there are more nonzero AC DCT coefficients than the desired number of AC DCT coefficients in a block. The approximate search can be undertaken using a coefficient magnitude classification technique such as a hashing technique, and the low-pass scaling technique can be applied to the classification level that is incapable of discriminating between the desired number of largest magnitude AC DCT coefficients. A specific example is described below with reference to FIG. 19.

Figure 14:
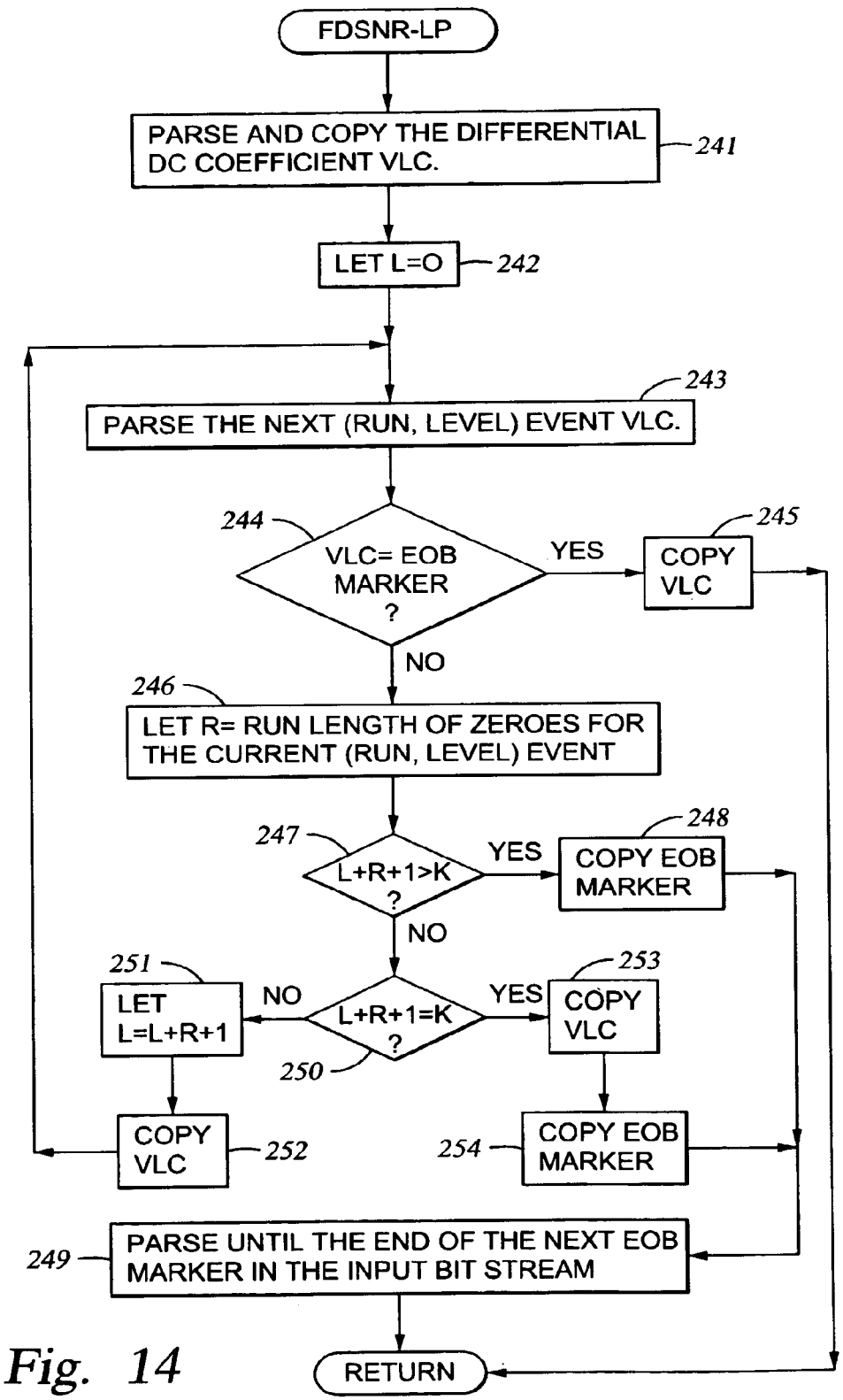
FIG. 14 is a flowchart of a procedure for signal-to-noise ratio scaling MPEG-2 coded video using a frequency-domain low-pass truncation (FDSNR_LP) technique.

With reference to FIG. 14, there is shown a flowchart of a procedure for scaling MPEG-2 coded video using the low-pass frequency-domain signal-to-noise (FDSNR_LP) scaling technique. This procedure scans and selectively copies components of an input stream of original-quality MPEG-2 coded video to produce an output stream of reduced-quality MPEG-2 coded video. The procedure is successively called, and each call processes coefficient data in the input stream for one 8×8 block of pixels. No more than a selected number "k" of coded lowest order (nonzero or zero valued) AC coefficients are copied for the block where the parameter "k" can be specified for each block.

In a first step 241 of FIG. 14, the procedure parses and copies the stream of original-quality MPEG-2 coded data up to and including the differential DC coefficient variable-length code (VLC). Next, in step 242, a counter variable "l" is set to zero. In step 243, the procedure parses the next (run, level) event VLC in the stream of original-quality MPEG-2 coded data. In step 244, if the VLC just parsed is an end-of-block (EOB) marker, execution branches to step 245 to copy the VLC to the stream of reduced-quality MPEG-2 coded video, and the procedure is finished for the current block.

In step 244, if the VLC just parsed is not an EOB marker, then execution continues to step 246. In step 246, a variable "r" is set equal to the run length of zeroes for the current (run, level) event, in order to compute a new counter value l+r+1. In step 247, if the new counter value l+r+1 is greater than the parameter "k", then the procedure branches to step 248 to copy an EOB marker to the stream of reduced-quality MPEG coded data. After step 248, execution continues to step 249, where the procedure parses the input stream of original-quality MPEG-2 coded data until the end of the first EOB marker, and the procedure is finished for the current block.

In step 247, if the new counter value l+r+1 is not greater than the parameter "k", then execution continues to step 250. In step 250, execution branches to step 251 if the new counter value l+r+1 is not equal to "k" (which would be the case if the new counter value is less than "k"). In step 251, the counter state l is set equal to the new counter value l+r+1. Then, in step 252, the VLC just parsed (which will be a VLC encoding a (run, level) event) is copied from the stream of original-quality MPEG-2 coded data to the stream of reduced-quality MPEG-2 coded data. After step 252, execution loops back to step 243 to continue the scanning of the stream of original-quality MPEG-2 coded data.

In step 250, if the new counter value l+r+1 is equal to "k", then execution branches from step 250 to step 253, to copy the VLC just parsed (which will be a VLC encoding a (run, level) event) from the stream of original-quality MPEG-2 coded data to the stream of reduced-quality MPEG-2 coded data. Next, in step 254, the procedure copies an EOB marker to the stream of reduced-quality MPEG-2 coded data. After step 254, execution continues to step 249, where the procedure parses the input stream of original-quality MPEG-2 coded data until the end of the first EOB marker, and the procedure is finished for the current block.

Figure 15:
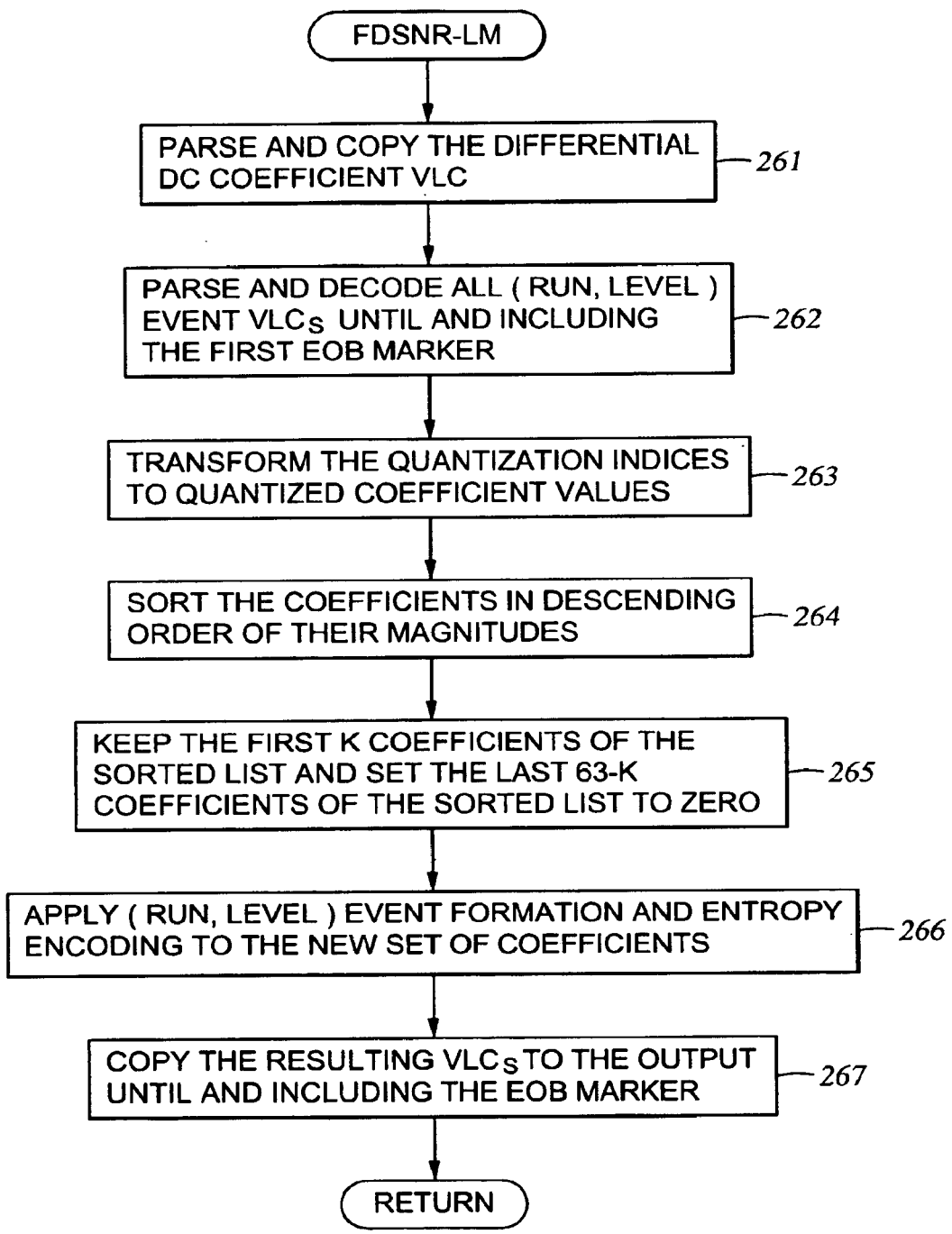
FIG. 15 is a flowchart of a procedure for signal-to-noise ratio scaling MPEG-2 coded video using a frequency-domain largest-magnitude coefficient selection (FDSNR_LM) technique.

FIG. 15 is a flowchart of a procedure for scaling MPEG-2 coded video using the largest magnitude based frequency-domain signal-to-noise ratio (FDSNR_LM) scaling technique. This routine is successively called, and each call processes coefficient data in the input stream for one 8×8 block of pixels. No more than a specified number "k" of largest magnitude AC DCT coefficients are copied for the block, and a different number "k" can be specified for each block.

In a first step 261 in FIG. 15, the procedure parses and copies the input stream of original-quality MPEG-2 coded data to the output stream of lower-quality MPEG-2 data up to and including the differential DC coefficient variable-length code (VLC). Then in step 262 all (run, level) event VLCs are parsed and decoded until and including the EOB marker of the current block. The decoding produces coefficient identifiers and corresponding quantization indices representing the quantized coefficient values. In step 263, the quantization indices are transformed to quantized coefficient values. In step 264, the (quantized) coefficients are sorted in descending order of their magnitudes. In step 265, the first "k" coefficients of the sorted list are preserved and the last 63-k AC DCT coefficients in the sorted list are set to zero. In step 266, (run, level) event formation and entropy coding (VLC encoding) are applied to the new set of coefficient values. Finally, in step 267, the VLCs resulting from step 266 are copied to the output stream until and including the EOB marker.

The sorting step 264 of the FDSNR_LM procedure can consume considerable computational resources. It is important to notice that not a full sorting of the quantized AC coefficients with respect to their magnitudes but rather a search for a specified number "k" of largest magnitude AC coefficients is all that is required. This task can be performed exactly or approximately in different ways so as to avoid the complexity associated with a conventional sorting procedure. In general, a relatively large number of the 63 AC DCT coefficients will have a quantized value of zero. Only the non-zero coefficients need be included in the sorting process. Moreover, if there are "n" non-zero coefficients and only "k" of them having the largest magnitudes are to be preserved in the output stream, then the sorting process may be terminated immediately after only the largest magnitude "k" coefficients have been found, or equivalently immediately after only the smallest magnitude "n-k" coefficients have been found. Moreover, the sorting procedure itself can be different depending on a comparison of "k" to "n" in order to minimize computations.

Figure 16:
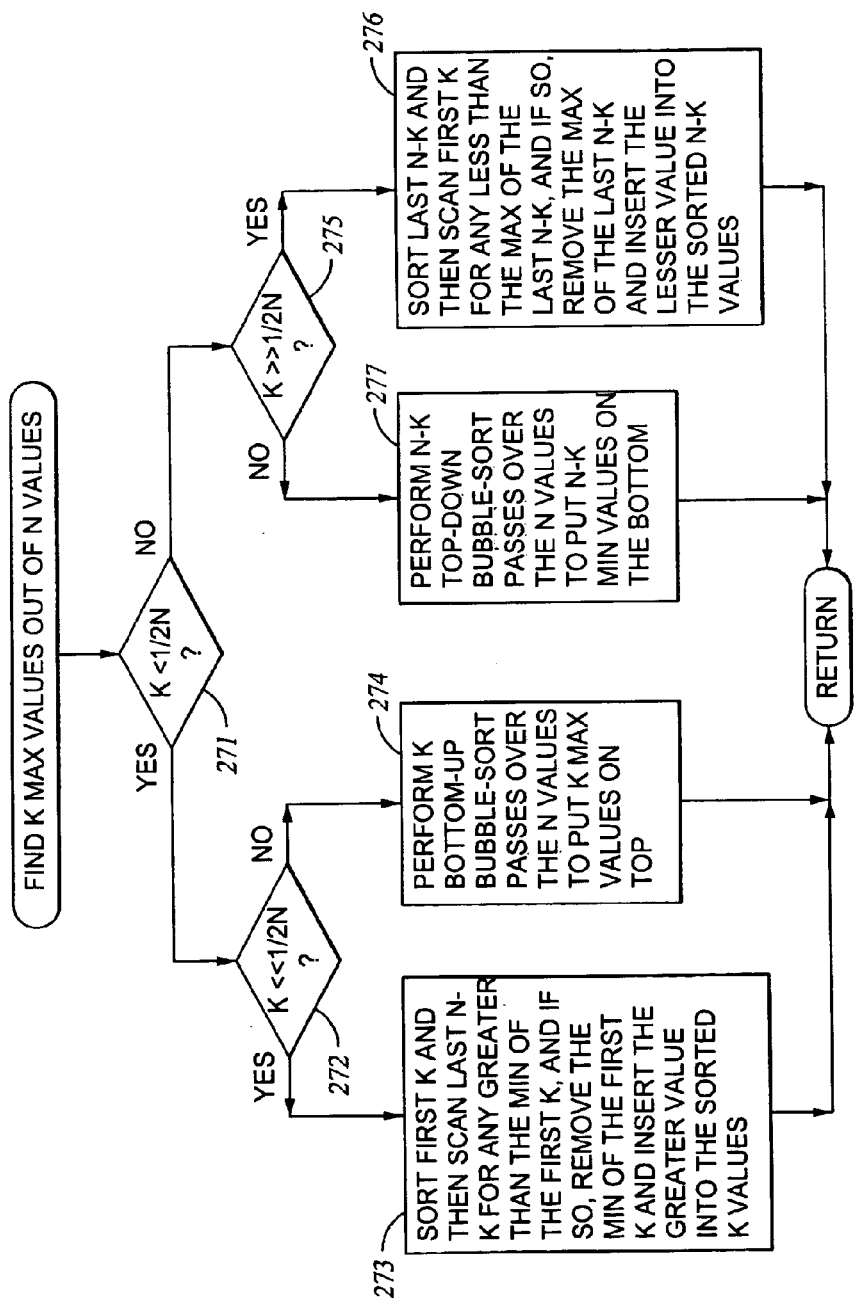
FIG. 16 is a flowchart of a procedure that selects one of a number of techniques for finding a certain number "k" of largest values out of a set of "n" values.

With reference to FIG. 16, there is shown a flowchart of a procedure that selects one of a number of techniques for finding a certain number "k" of largest values out of a set of "n" values. In a first step 271, execution branches to step 272 if "k" is less than ½ "n." In step 272, execution branches to step 273 if "l" is much less than ½ "n." In step 273, the first "k" values are sorted to produce a list of "k" sorted values, and then the last "n-k" values are scanned for any value greater than the minimum of the sorted "k" values. If a value greater than the minimum of the sorted "k" values is found, then that minimum value is removed and the value greater than the minimum value is inserted into the list of "k" sorted values. At the end of this procedure, the list of sorted "k" values will contain the maximum "k" values out of the original "n" values. A specific example of this procedure is described below with reference to FIG. 17.

In step 272, if "k" is not much less than ½ "n", then execution branches to step 274. In step 274, a bubble-sort procedure is used, including "k" bottom-up bubble-sort passes over the "n" values to put "k" maximum values on top of a sorting table. An example of such a bubble-sort procedure is listed below:

```
/* TABLE(0) to TABLE(n-1) INCLUDES n VALUES */
/* MOVE THE k LARGEST OF THE n VALUES IN TABLE TO THE
RANGE
TABLE(0) TO TABLE(k-1) IN THE TABLE */
/* k <= ½ n */
FOR i=1 to k
    FOR j=1 to n-i
        IF (TABLE(n-j) > TABLE(n-j-1)) THEN(
            /* SWAP TABLE(n-j) WITH TABLE(n-j-1) */
            TEMP ← TABLE(n-j)
            TABLE(n-j) ← TABLE(n-j-1)
            TABLE(n-j-1) ← TEMP)
    NEXT j
NEXT i
```

In step 271, if "k" is not less than ½ "n", then execution branches to step 275. In step 275, if "k" is much greater than ½ "n", then execution branches to step 276. In step 276, a procedure similar to step 273 is used, except the "n-k" minimum values are maintained in a sorted list, instead of the "k" maximum values. In step 276, the last "n-k" values are placed in the sort list and sorted, and then the first "k" values are scanned for any value less than the maximum value in the sorted list. If a value less than the maximum value in the sorted list is found, then the maximum value in the sorted list is removed, and the value less than this maximum value is inserted into the sorted list. At the end of this procedure, the values in the sorted list are the "n-k" smallest values, and the "k" values excluded from the sorted list are the "k" largest values.

In step 275, if "k" is not much greater ½ "n", then execution branches to step 277. In step 277, a bubble-sort procedure is used, including "n-k" top-down bubble-sort passes over the "n" values to put "n-k" minimum values at the bottom of a sorting table. Consequently, the k maximum values will appear in the top "k" entries of the table. An example of such a bubble-sort procedure is listed below:

```
/* TABLE(0) to TABLE(n-1) INCLUDES n VALUES */
/* MOVE THE n-k SMALLEST OF THE n VALUES IN THE TABLE */
/* TO THE RANGE TABLE(k) TO TABLE(n-1) IN THE TABLE */
/* n > k >= ½ n */
FOR i=1 to n-k
FOR j=0 to n-i-1
IF (TABLE(j) < TABLE(j+1)) THEN(
    /* SWAP TABLE(j) WITH TABLE(j+1)*/
    TEMP ← TABLE(j)
    TABLE(j) ← TABLE(j+1)
    TABLE (j+1) ← TEMP)
NEXT j
NEXT i
```

Figure 17:
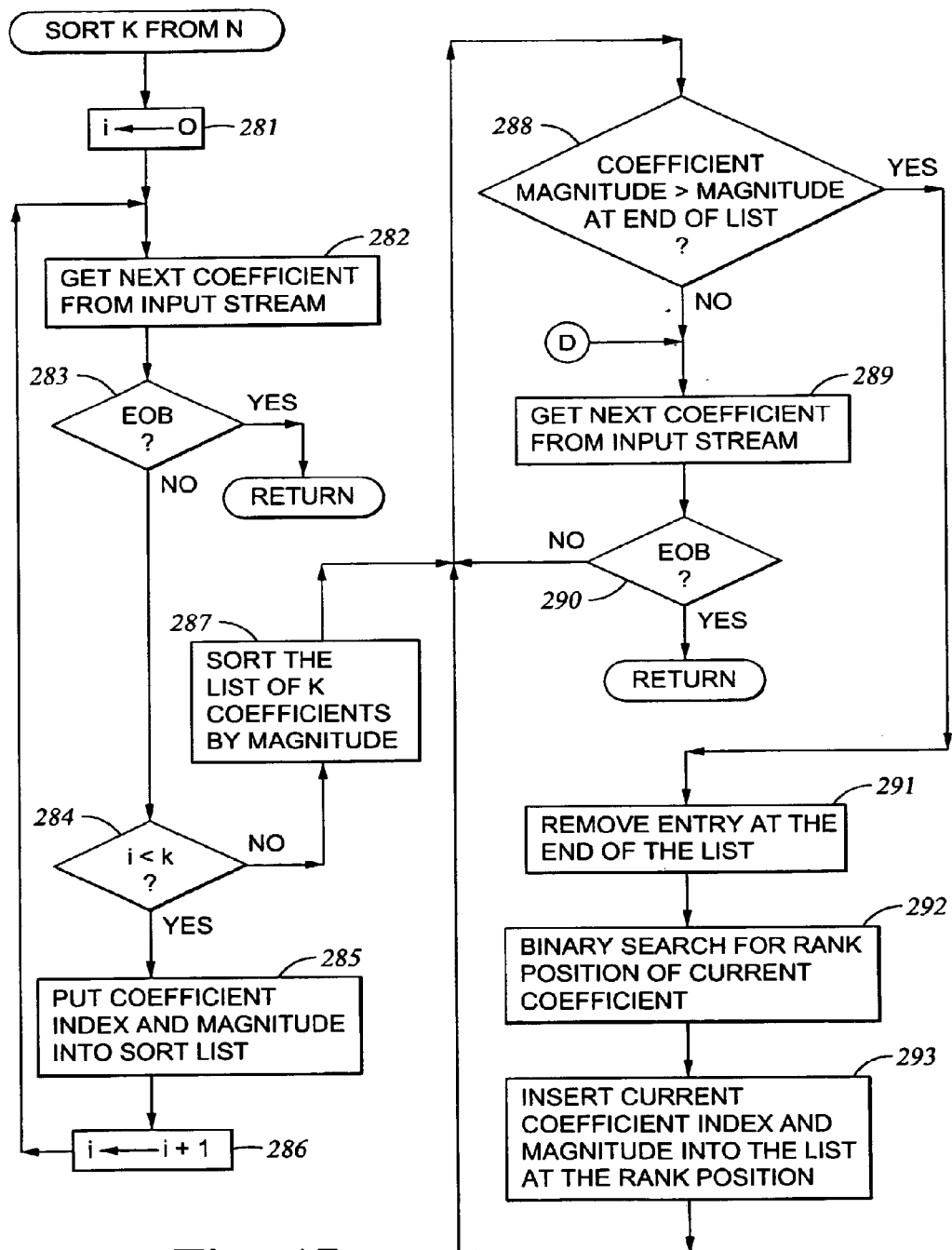
FIG. 17 is a flowchart of a procedure for finding a certain number "k" of largest values from a set of "n" values, which is used in the procedure of FIG. 16 for the case of k<<½ n.

Turning now to FIG. 17, there is shown a flowchart of a procedure for finding up to a specified number "k" of largest magnitude AC DCT coefficients from a set of "n" coefficients, corresponding to the procedure of FIG. 16 for the case of k<<½n. In a first step 281, a counter "i" is set to zero. In step 282, the next AC DCT coefficient is obtained from the input stream of original-quality MPEG-2 coded data. If an EOB marker is reached, as tested in step 283, then execution returns. In step 284, the counter "i" is compared to the specified number "k", and if "i" is less than "k", execution continues to step 285. In step 285, a coefficient index and magnitude for the AC DCT coefficient is placed on a sort list. In step 286, the counter "i" is incremented, and execution loops back to step 282.

Once the sort list has been loaded with indices and magnitudes for "k" AC DCT coefficients and one additional coefficient has been obtained from the input stream, execution branches from step 284 to step 287. In step 287 the list is sorted by magnitude, so that the minimum magnitude appears at the end of the list. Then in step 288 the coefficient magnitude of the current coefficient last obtained from the input stream is compared to the magnitude at the end of the list. If the coefficient magnitude of the current coefficient is not greater than the magnitude appearing at the end of the list, then execution continues to step 289 to get the next AC DCT coefficient from the input stream. If an EOB marker is reached, as tested in step 290, then execution returns. Otherwise, execution loops back to step 288.

In step 288, if the magnitude of the current coefficient is greater than the magnitude at the end of the list, then execution branches to step 291. In step 291, the entry at the end of the list is removed. In step 292, a binary search is performed to determine the rank position of the magnitude of the current coefficient, and in step 293, the current coefficient index and magnitude are inserted into the list at the rank position. The list, for example, is a linked list in the conventional fashion to facilitate the insertion of an entry for the current coefficient at any position in the list. After step 293, execution loops back to step 288.

Figure 18:
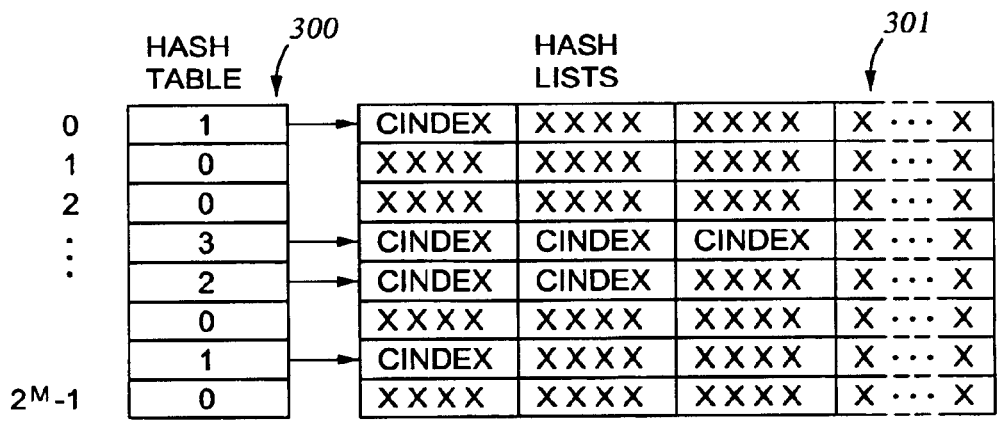
FIG. 18 is a diagram of a hash table and associated hash lists.

An approximation technique of coefficient magnitude classification can be used to reduce the computational burden of sorting by coefficient magnitude. A specific example is the use of hashing of the coefficient magnitude and maintaining lists of the indices of coefficients having the same magnitude classifications. As shown in FIG. 18, a hash table 300 is linked to hash lists 301 storing the indices of classified coefficients. As shown, the hash table 300 is a list of $2^M$ entries, where "M" is three, and an entry has a value of zero if its associated list is empty, and otherwise the entry has a pointer to the end of the coefficients in its associated list. The lists shown in FIG. 18 have fixed memory allocations in which the pointers in the hash table also indicate the number of coefficient indices in the respective hash lists. Alternatively, the hash lists could be dynamically allocated and linked in the conventional fashion.

Figure 19:
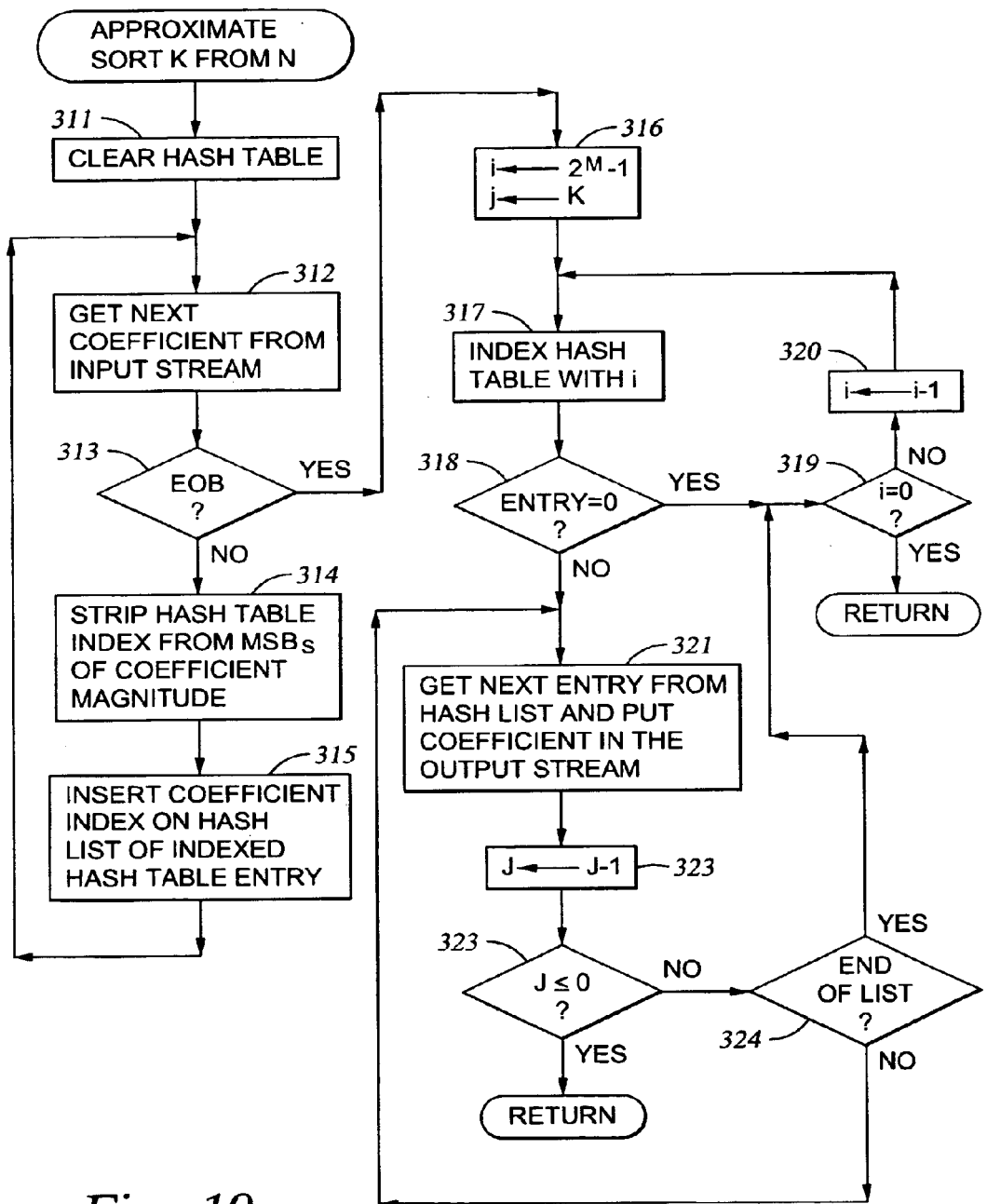
FIG. 19 is a flowchart of a procedure for finding a certain number "k" of values that are not less than the smallest of the "k" largest values in a set of "n" values beyond a certain amount.

FIG. 19 shows a flowchart of a procedure for using the hash table 300 and hash lists 301 of FIG. 18 to perform a sort of "k" coefficients having approximately the largest magnitudes from a set of "n" coefficients. This approximation technique ensures that none of the "k" coefficients selected will have a magnitude that differs by more than a certain error limit from the smallest magnitude value of "k" coefficients having the largest magnitude. The error limit is established by the number of hash table entries, and it is the range of the magnitudes that can be hashed to the same hash table entry.

In a first step 311 in FIG. 19, the hash table is cleared. Then in step 312, the next AC DCT coefficient is obtained from the input stream. If an EOB marker is not reached, as tested in step 313, then execution continues to step 314. In step 314, a hash table index is stripped from the most significant bits (MSBs) of the coefficient magnitude. For the hash table in FIG. 18 having eight entries, the three most significant bits of the coefficient magnitude are stripped from the coefficient magnitude. This is done by a bit masking operation together with a logical arithmetic shift operation. Then in step 315, the coefficient index is inserted on the hash list of the indexed hash table entry. For example, the hash table entry is indexed to find the pointer to where the coefficient index should be inserted, and then the pointer in the hash table entry is incremented. After step 315, execution loops back to step 312. Once all of the AC coefficients for the block have been classified by inserting them in the appropriate hash lists, an EOB marker will be reached, and execution will branch from step 313 to step 316.

Beginning in step 316, the hash table and hash lists are scanned to find approximately the "k" largest magnitude coefficients. The hash lists linked to the bottom entries of the hash table will have the indices for the largest magnitude coefficients. Each hash list is scanned from its first entry to its last entry, so that each hash list is accessed as a first-in-first-out queue. Therefore, in each magnitude classification, the coefficient ordering in the output stream will be the same as the coefficient ordering in the input stream, and the approximation will have a "low pass" effect in which possibly some lower-frequency coefficients having slightly smaller magnitudes will be retained at the expense of discarding some higher-frequency coefficients having slightly larger magnitudes. (The approximation results from the fact that the last hash list to be scanned is not itself sorted, and to eliminate the error of the approximation, the last hash list to be scanned could be sorted.)

In step 316, a scan index "i" is set to $2^M-1$ in order to index the hash table beginning at the bottom of the table, and a counter "j" is set equal to "k" in order to stop the scanning process after finding "k" coefficients. Next, in step 317, the hash table is indexed with "i". In step 318, if the indexed entry of the hash table is zero, then execution branches to step 319. In step 319, the procedure is finished if "i" is equal to zero; otherwise, execution continues to step 320. In step 320, the index "i" is decremented, and execution loops back to step 317.

If in step 318 the indexed hash table entry is not zero, then execution continues to step 321. In step 321, the next entry is obtained from the indexed hash list, and the coefficient index in the entry is used to put the indexed coefficient in the output stream. Then in step 322 the counter "j" is decremented, and in step 323 the counter "j" is compared to zero. In step 323, if the counter "j" is less than or equal to zero, then the procedure is finished. Otherwise, if the counter "j" is not less than or equal to zero in step 323, execution branches to step 324. In step 324, if the end of the hash list has not been reached, execution loops back to step 321 to get the next entry in the hash list. Otherwise, if the end of the hash list has been reached, execution branches to step 319.

The FDSNR_LM procedure, as described above, in general provides a significant improvement in peak signal-to-noise ratio (PSNR) over the FDSNR_LP procedure when each procedure retains the same number of non-zero AC DCT coefficients. It has been found, however, that substantially more bits are required for the (run, level) coding of the non-zero AC DCT coefficients resulting from the FDSNR_LM procedure than those resulting from the FDSNR_LP procedure, provided that the same coefficient quantization and scanning method is used. Therefore, the FDSNR_LM procedure provides at best a marginal improvement in rate-distortion (PSNR as a function of bit rate) over the FDSNR_LP procedure unless the non-zero AC DCT coefficients for the FDSNR_LM procedure are quantized, scanned, and/or (run, level) coded in a fashion different from the quantization, scanning, and/or (run, level) coding of the coefficients in the original MPEG-2 clip. A study of this problem resulted in a discovery that it is sometimes possible to reduce the number of bits for (run, level) coding of coefficients for an 8×8 block including a given number of the non-zero largest magnitude AC DCT coefficients if additional coefficients are also (run, level) coded for the block.

The (run, level) coding of the non-zero AC DCT coefficients from the FDSNR_LM procedure has been found to require more bits than from the FDSNR_LP procedure due to an increased occurrence frequency of escape sequences for the (run, level) coding. The increased frequency of escape sequences is an indication that the statistical likelihood of possible (run, level) combinations for the non-zero AC DCT coefficients selected by the FDSNR_LM procedure is different from the statistical likelihood of possible (run, level) combinations for the non-zero AC DCT coefficients produced by the standard MPEG-2 coding process and in particular those selected by the FDSNR_LP procedure.

The MPEG-2 coding scheme assigns special symbols to the (run, level) combinations that occur very frequently in ordinary MPEG-2 coded video. The most frequent (run, level) combinations occur for short run lengths (within the range of about 0 to 5, where the run length can range from 0 to 63) and relatively low levels (about 1 to 10, where the level can range from 1 to 2048). The most frequent of these special symbols are assigned variable-length code words (VLCs). If a (run, level) combination does not have such a VLC, then it is coded with an escape sequence composed of a 6-bit escape sequence header code word followed by a 6-bit run length followed by a 12 bit signed level. An escape sequence requires a much greater number of bits than the VLCs which have varying lengths depending on their relative frequency. In particular, the escape sequences each has 24 bits, and the variable-length code words have a maximum of 17 bits.

There are two (run, level) VLC tables in MPEG-2. The first coding table is designated TABLE 0, and the second is designated as TABLE 1. These tables specify the (run, level) combinations having VLCs. For each table, the (run, level) combinations represented by VLCs and the range of the VLC lengths are summarized below:

| Run | Range of Levels | Range of Code Lengths |
|---|---|---|
| SUMMARY OF PROPERTIES OF DCT COEFFICIENT TABLE ZERO (Table Zero is Table B.14, p. 135 of ISO/IEC 13818-2 1996E) | | |
| 0 | 1 to 40 | 2 to 16 |
| 1 | 1 to 18 | 4 to 17 |
| 2 | 1 to 5 | 5 to 14 |
| 3 | 1 to 4 | 6 to 14 |
| 4 | 1 to 3 | 6 to 13 |
| 5 | 1 to 3 | 7 to 14 |
| 6 | 1 to 3 | 7 to 17 |
| 7 | 1 to 2 | 7 to 13 |
| 8 | 1 to 2 | 8 to 13 |
| 9 | 1 to 2 | 8 to 14 |
| 10 | 1 to 2 | 9 to 14 |
| 11 | 1 to 2 | 9 to 17 |
| 12 | 1 to 2 | 9 to 17 |
| 13 | 1 to 2 | 9 to 17 |
| 14 | 1 to 2 | 11 to 17 |
| 15 | 1 to 2 | 11 to 17 |
| 16 | 1 to 2 | 11 to 17 |
| 17 | 1 | 13 |
| 18 | 1 | 13 |
| 19 | 1 | 13 |
| 20 | 1 | 13 |
| 21 | 1 | 13 |
| 22 | 1 | 14 |
| 23 | 1 | 14 |
| 24 | 1 | 14 |
| 25 | 1 | 14 |
| 26 | 1 | 14 |
| 27 | 1 | 17 |
| 28 | 1 | 17 |
| 29 | 1 | 17 |
| 30 | 1 | 17 |
| 31 | 1 | 17 |
| SUMMARY OF PROPERTIES OF DCT COEFFICIENT TABLE ONE (Table One is Table B.15, p. 139 of ISO/IEC 13818-2 1996E) | | |
| 0 | 1 to 40 | 3 to 16 |
| 1 | 1 to 18 | 4 to 17 |
| 2 | 1 to 5 | 6 to 14 |
| 3 | 1 to 4 | 6 to 14 |
| 4 | 1 to 3 | 7 to 13 |
| 5 | 1 to 3 | 7 to 14 |
| 6 | 1 to 3 | 8 to 17 |
| 7 | 1 to 2 | 8 to 13 |
| 8 | 1 to 2 | 8 to 13 |
| 9 | 1 to 2 | 8 to 14 |
| 10 | 1 to 2 | 8 to 14 |
| 11 | 1 to 2 | 9 to 17 |
| 12 | 1 to 2 | 9 to 17 |
| 13 | 1 to 2 | 9 to 17 |
| 14 | 1 to 2 | 10 to 17 |
| 15 | 1 to 2 | 10 to 17 |
| 16 | 1 to 2 | 11 to 17 |
| 17 | 1 | 13 |
| 18 | 1 | 13 |
| 19 | 1 | 13 |
| 20 | 1 | 13 |
| 21 | 1 | 13 |
| 22 | 1 | 14 |
| 23 | 1 | 14 |
| 24 | 1 | 14 |
| 25 | 1 | 14 |
| 26 | 1 | 14 |
| 27 | 1 | 17 |
| 28 | 1 | 17 |
| 29 | 1 | 17 |
| 30 | 1 | 17 |
| 31 | 1 | 17 |

The FDSNR_LP procedure selected AC DCT coefficients have (run, level) symbol statistics that are similar to the statistics of ordinary MPEG-2 coded video, and therefore the FDSNR_LP AC DCT coefficients have a similar frequency of occurrence for escape sequences in comparison to the ordinary MPEG-2 coded video. In contrast, the FDSNR_LM procedure selects AC DCT coefficients resulting in (run, level) combinations that are less likely to be encountered in ordinary MPEG-2 coded video. This is due to two reasons. First, the FDSNR_LM procedure selects AC DCT coefficients having the largest levels. Second, the FDSNR_LM procedure introduces longer run lengths due to the elimination of coefficients over the entire range of coefficient indices. The result is a significantly increased rate of occurrence for escape sequences. Escape sequences form the most inefficient mode of coefficient information encoding in MPEG-2 incorporated into the standard so as to cover important but very rarely occurring coefficient information.

In order to improve the rate-distortion performance of the scaled-quality MPEG-2 coded video resulting from the FDSNR_LM procedure, the non-zero AC DCT coefficients selected by the FDSNR_LM procedure should be quantized, scanned, and/or (run, level) coded in such a way that tends to reduce the frequency of the escape sequences. For example, if the original-quality MPEG-2 coded video was (run, level) coded using TABLE 0, then the largest magnitude coefficients should be re-coded using TABLE 1 because TABLE 1 provides shorter length VLCs for some (run, level) combinations having higher run lengths and higher levels. It is also possible that re-coding using the alternate scan method instead of the zig-zag scan method may result in a lower frequency of occurrence for escape sequences. For example, each picture could be (run, level) coded for both zig-zag scanning and alternate scanning, and the scanning method providing the fewest escape sequences, or the least number of bits total, could be selected for the coding of the reduced-quality coded MPEG video.

There are two methods having general applicability for reducing the frequency of escape sequences resulting from the FDSNR_LM procedure. The first method is to introduce a non-zero, "non-qualifying" AC DCT coefficient of the 8×8 block into the list of non-zero qualifying AC DCT coefficients to be coded for the block. In this context, a "qualifying" coefficient is one of the k largest magnitude coefficients selected by the FDSNR_LM procedure. The non-qualifying coefficient referred to above, must be lying in between two qualifying AC DCT coefficients (in the coefficient scanning order) that generate the (run, level) combination causing the escape sequence. Moreover, this non-qualifying coefficient must cause the escape sequence to be replaced with two shorter length VLCs when the AC DCT coefficients are (run, level) coded. This first method has the effect of not only decreasing the number of bits in the coded reduced-quality MPEG video in most cases, but also increasing the PSNR.

The qualifying AC DCT coefficient causing the escape sequence that is first in the coefficient scanning order will be simply referred to as the first qualifying coefficient. The qualifying AC DCT coefficient causing the escape sequence that is second in the coefficient scanning order will be simply referred to as the second qualifying coefficient. For example, suppose the qualifying coefficients in zig-zag scan order for an 8×8 block include $C_{51}$ followed by $C_{15}$ having a level of 40. If only the qualifying coefficients were (run, level) coded for the microblock, $C_{15}$ would result in a run length of 3, because there are a total of three non-qualifying coefficients ($C_{42}$, $C_{33}$, and $C_{24}$) between $C_{51}$, and $C_{15}$ in the scan order.

Therefore, $C_{15}$ would have to be coded as an escape sequence, because a run of 3 and level of 40 does not have a special symbol. In this example, the escape sequence is in effect caused by a first qualifying coefficient, which is $C_{51}$, and a second qualifying coefficient, which is $C_{15}$. This escape sequence can possibly be eliminated say, if $C_{24}$ is a non-zero, non-qualifying coefficient of the block, $C_{24}$ has a level of 5 or less, and $C_{24}$ is (run, level) coded together with the qualifying coefficients. For example, assuming that $C_{24}$ has a level of 5, and using the MPEG-2 (run, level) coding TABLE 1, then $C_{24}$ has a run length of two and is coded as the special symbol 0000 0000 1010 0s, where "s" is a sign bit, and $C_{15}$ now has a run length of 0 and is coded as the special symbol 0000 0000 0010 00s. Such a consideration clearly applies to the rest of the non-zero non-qualifying coefficients lying in between the two qualifying coefficients producing the escape sequence. In the above example, these non-qualifying coefficients are $C_{42}$ and $C_{33}$.

Whether or not an escape sequence can be eliminated from the (run, level) coding of the qualifying coefficients can be determined by testing a sequence of conditions. The first condition is that the second qualifying coefficient must have a level that is not greater than the maximum level of 40 for the special (run, level) symbols. If this condition is satisfied, then there must be a non-zero non-qualifying AC DCT coefficient that is between the first and second qualifying coefficients in the coefficient scanning order. If there is such a non-qualifying coefficient, then the combination of its level and the run length between the first qualifying coefficient and itself in the coefficient scanning order must be one of the special (run, level) symbols. If so, then the combination of the level of the second qualifying coefficient and the run length between the non-qualifying coefficient and the second qualifying coefficient must also be a special (run, level) symbol, and if so, all required conditions have been satisfied. If not, then the conditions with respect to the non-qualifying coefficient are successively applied to any other non-zero non-qualifying AC DCT coefficient of the block lying in between the two qualifying coefficients, until either all conditions are found to be satisfied or all such non-qualifying coefficients are tested and failed. If there are sufficient computational resources, this search procedure should be continued to find all such non-qualifying coefficients that would eliminate the escape sequence, and to select the non-qualifying coefficient that converts the escape sequence to the pair of special symbols having respective code words that in combination have the shortest length.

Figure 20:
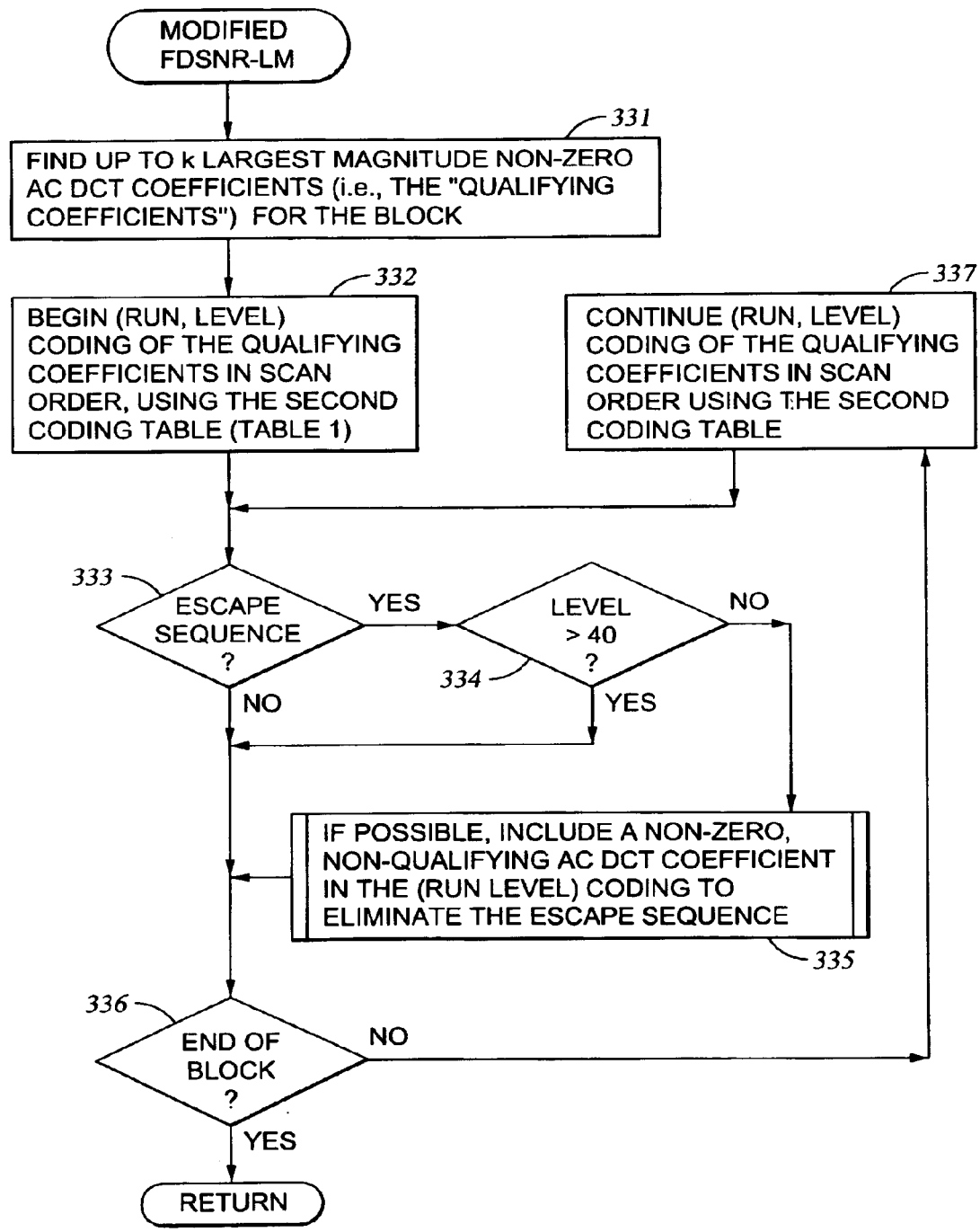
FIG. 20 is a flowchart of modification of the procedure of FIG. 15 in order to possibly eliminate escape sequences in the (run, level) coding of the largest magnitude coefficients.
Figure 21:
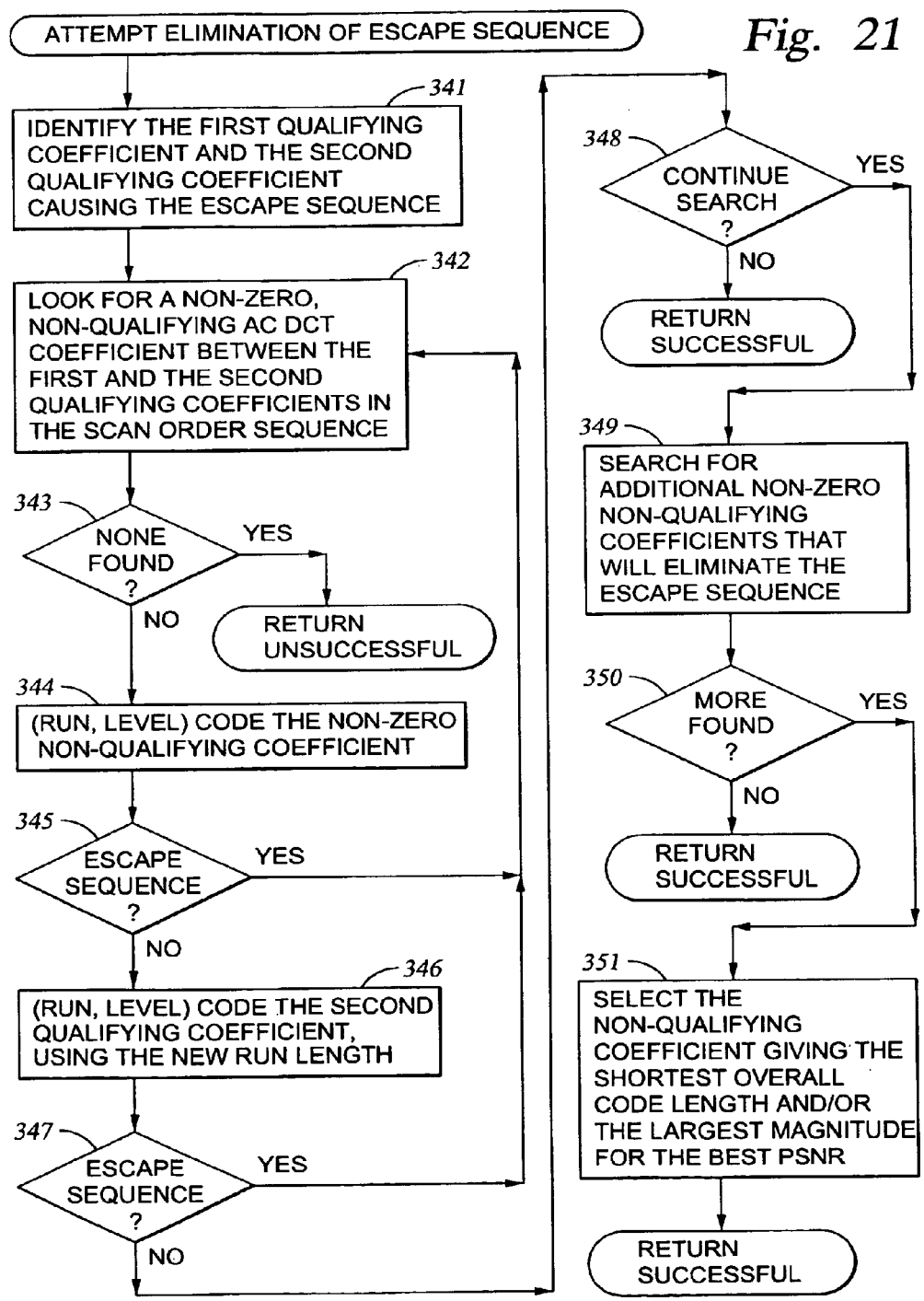
FIG. 21 is a flowchart of a subroutine called in the flowchart of FIG. 20 in order to possibly eliminate an escape sequence.
Figure 22:
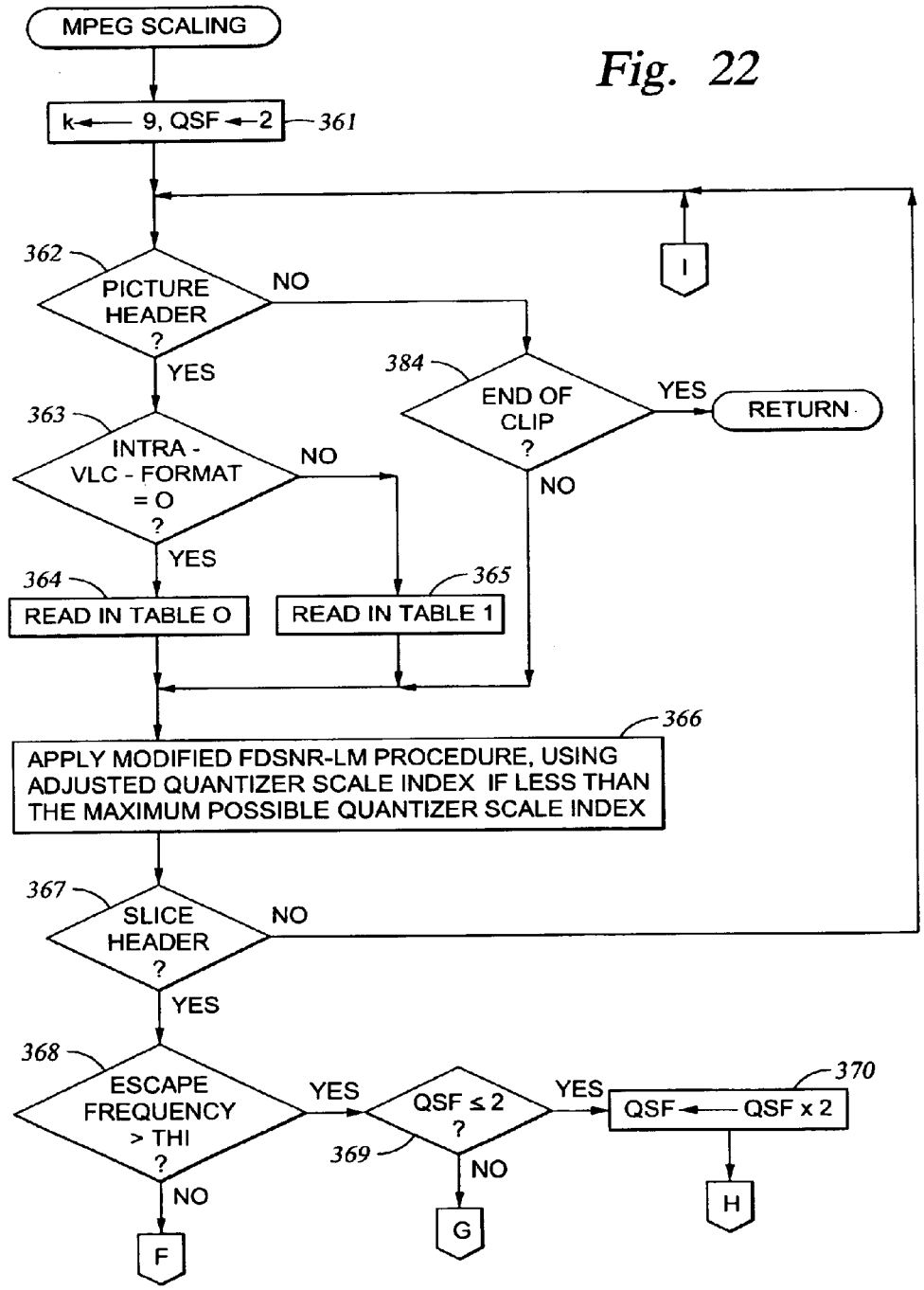
FIG. 22 is a first portion of a flowchart of a procedure for scaling an MPEG-2 coded video data stream using the modified procedure of FIG. 20 while adjusting the parameter "k" to achieve a desired bit rate, and adjusting a quantization scaling factor (QSF) to achieve a desired frequency of occurrence of escape sequences.

A flow chart for a modified FDSNR_LM procedure using the first method is shown in FIGS. 20 and 21. In a first step 331 of FIG. 20, the procedure finds up to "k" largest magnitude non-zero AC DCT coefficients (i.e., the "qualifying coefficients") for the block. (This first step 331 is similar to steps 261 to 265 of FIG. 15, as described above.) In step 332, (run, level) coding of the qualifying coefficients is begun in the scan order using the second coding table (Table 1). This (run, level) coding continues until an escape sequence is reached in step 333, or the end of the block is reached in step 336. If an escape sequence is reached, execution branches from step 333 to step 334. If the level of the second qualifying coefficient causing the escape sequence is greater than 40, execution continues from step 334 to step 336. Otherwise, execution branches from step 334 to step 335 to invoke a subroutine (as further described below with reference to FIG. 21) to possibly include a non-zero non-qualifying AC DCT coefficient in the (run, level) coding to eliminate the escape sequence. The subroutine either returns without success, or returns such a non-qualifying coefficient so that the escape sequence is replaced with the two new (run, level) codings of the first qualifying coefficient and the non-qualifying coefficient and then the non-qualifying coefficient and the second qualifying coefficient. From step 335, execution continues to step 336. Execution returns from step 336 if the end of the block is reached. Otherwise, execution continues from step 336 to step 337, to continue (run, level) coding of the qualifying coefficients in the scan order using the second coding table (TABLE 1). This (run, level) coding continues until an escape sequence results, as tested in step 333, or until the end of the block is reached, as tested in step 336.

With reference to FIG. 21, there is shown a flow chart of the subroutine (that was called in step 335 of FIG. 20) for attempting to find a non-zero, non-qualifying AC DCT coefficient that can be (run, level) coded to eliminate an escape sequence for a qualifying coefficient. In a first step 341, the procedure identifies the first qualifying coefficient and the second qualifying coefficient causing the escape sequence. For example, the subroutine of FIG. 21 can be programmed as a function having, as parameters, a pointer to a list of the non-zero AC DCT coefficients in the scan order, an index to the first qualifying coefficient in the list, and an index to the second qualifying coefficient in the list. In step 342, the subroutine looks for a non-zero non-qualifying AC DCT coefficient between the first and the second qualifying coefficients in the scan order. For example, the value of the index to the first qualifying coefficient is incremented and compared to the value of the index for the second qualifying coefficient, and if they are the same, there is no such non-qualifying coefficient. Otherwise, if the new coefficient pointed to (by incrementing the index of the first qualifying coefficient) is a non-zero coefficient then it becomes a candidate non-qualifying coefficient deserving further testing. If however the new coefficient pointed to (by incrementing the index of the first qualifying coefficient) has a value zero then it is not a candidate non-qualifying coefficient. If no such (candidate) non-qualifying coefficients are found, as tested in step 343, then execution returns from the subroutine with a return code indicating that the search has been unsuccessful. Otherwise, execution continues to step 344.

In step 344, the non-qualifying coefficient is (run, level) coded, to determine in step 345 whether it codes to an escape sequence. If it codes to an escape sequence, then execution loops back from step 345 to step 342 to look for another non-zero non-qualifying AC DCT coefficient in the scan order between the first and second qualifying coefficients. If it does not code to an escape sequence, then execution continues from step 345 to step 346. In step 346, the second qualifying coefficient is (run, level) coded, using the new run length, which is the number of coefficients in the scan order between the non-qualifying coefficient and the second qualifying coefficient. If it codes to an escape sequence, as tested in step 347, then execution loops back from step 347 to step 342 to look for another non-zero non-qualifying AC DCT coefficient in the scan order between the first and second qualifying coefficients. If it does not code to an escape sequence, then execution continues from step 347 to step 348.

In step 348, execution returns with a successful search result unless a continue search option has been selected. If the continue search option has been selected, then execution branches from step 348 to step 349 to search for additional non-zero non-qualifying AC DCT coefficients that would eliminate the escape sequence. In other words, steps 342 to 347 are repeated in an attempt to find additional non-zero non-qualifying AC DCT coefficients that would eliminate the escape sequence. If no more such non-qualifying coefficients are found, as tested in step 350, execution returns with a successful search result. Otherwise, execution branches from step 350 to step 351 to select the non-qualifying coefficient giving the shortest overall code word length and/or the largest magnitude for the best PSNR, and execution returns with a successful search result. For example, for each non-qualifying coefficient that would eliminate the escape sequence, the total bit count is computed for the (run, level) coding of the non-qualifying coefficient and the second qualifying coefficient. Then a search is made for the non-qualifying coefficient producing the smallest total bit count, and if two non-qualifying coefficients which produce the same total bit count are found, then the one having the largest level is selected for the elimination of the escape sequence.

A second method of reducing the frequency of occurrence of the escape sequences in the (run, level) coding of largest magnitude AC DCT coefficients for an 8×8 block is to change the mapping of coefficient magnitudes to the levels so as to reduce the levels. Reduction of the levels increases the likelihood that the (run, level) combinations will have special symbols and therefore will not generate escape sequences. This second method has the potential of achieving a greater reduction in bit rate than the first method, because each escape sequence can now be replaced by the codeword for one special symbol, rather than by the two codewords as is the case for the first method. The second method, however, may reduce the PSNR due to increased quantization noise resulting from the process producing the lower levels. Therefore, if a desired reduction of escape sequences can be achieved using the first method, then there is no need to perform the second method, which is likely to reduce the PSNR. If the first method is used but not all of the escape sequences have been eliminated, then the second method could be used to possibly eliminate the remaining escape sequences.

The mapping of coefficient magnitudes to the levels can be changed by decoding the levels to coefficient magnitudes, changing the quantization scale factor (qsi), and then re-coding the levels in accordance with the new quantization scale factor (qsi). The quantization scale factor is initialized in each slice header and can also be updated in the macroblock header on a macroblock basis. Therefore it is a constant for all blocks in the same macroblock. In particular, the quantization scale factor is a function of a q_scale_type parameter and a quantizer_scale_code parameter. If q_scale_type=0, then the quantizer scale factor (qsi) is twice the value of q_scale_code. If q_scale_type=1, then the quantizer scale factor (qsi) is given by the following table, which is the right half of Table 7-6 on page 70 of ISO/IEC 13838-2:1996(E):

| quantizer scale code | quantization scale factor (qsi) |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 10 |
| 10 | 12 |

-continued

| quantizer scale code | quantization scale factor (qsi) |
|---|---|
| 11 | 14 |
| 12 | 16 |
| 13 | 18 |
| 14 | 20 |
| 15 | 22 |
| 16 | 24 |
| 17 | 28 |
| 18 | 32 |
| 19 | 36 |
| 20 | 40 |
| 21 | 44 |
| 22 | 48 |
| 23 | 52 |
| 24 | 56 |
| 25 | 64 |
| 26 | 72 |
| 27 | 80 |
| 28 | 88 |
| 29 | 96 |
| 30 | 104 |
| 31 | 112 |

In a preferred implementation, to reduce the coefficient levels, the quantization scale factor is increased by a factor of two, and the levels of the non-zero AC DCT coefficients are reduced by a factor of two, so long as the original value of the quantization scale factor is less than or equal to one-half of the maximum possible quantization scale factor. For q_scale_type=1, a factor of two increase in the quantization scale factor (qsi) is most easily performed by a table lookup of a new quantization_scale_code using the following conversion table:

| Original quantization scale code | New quantization scale code |
|---|---|
| 1 | 2 |
| 2 | 4 |
| 3 | 6 |
| 4 | 8 |
| 5 | 9 |
| 6 | 10 |
| 7 | 11 |
| 8 | 12 |
| 9 | 14 |
| 10 | 16 |
| 11 | 17 |
| 12 | 18 |
| 13 | 19 |
| 14 | 20 |
| 15 | 21 |
| 16 | 22 |
| 17 | 24 |
| 18 | 25 |
| 19 | 26 |
| 20 | 27 |
| 21 | 28 |
| 22 | 29 |
| 23 | 30 |
| 24 | 31 |

V. Trick Mode Files

In a preferred method for generation of trick mode files, the quantization scale factor is adjusted in order to achieve a desired reduction in the escape sequence occurrence frequency resulting from the modified FDSNR_LM procedure, and the number (k) of largest magnitude coefficients is adjusted in order to achieve a desired reduction in bit rate. A specific implementation is shown in the flow chart of FIGS. 22–23. In a first step 361, the number (k) of largest magnitude AC coefficients per 8×8 block is initially set to a value of 9, and the quantization scaling factor (QSF) is initially set to a value of 2. Then conversion of the I frames of an original-quality MPEG-2 coded video clip to a lower quality level begins. When a picture header is encountered in step 362, indicating the beginning of a new I frame, execution continues to step 363. In step 363, execution branches depending on the value of the intra_vlc_format parameter in the picture header of the original-quality MPEG-2 coded video clip. This value is either 0, indicating that the first (run, level) coding table (TABLE 0) was used for coding the picture, or 1, indicating that the second (run, level) coding table (TABLE 1) was used for coding the picture. In either case, the down scaled quality picture will be coded with the second (run, level) coding table. If the intra_vlc_format parameter is equal to 0 execution continues from step 363 to step 364 where TABLE 0 is read in for (run, level) symbol decoding in the original-quality MPEG-2 coded clip. Otherwise, if the intra_vlc_format parameter is equal to 1, then execution continues from step 363 to step 365 where TABLE 1 is read in for (run, level) symbol decoding in the original-quality MPEG-2 coded clip.

After steps 364 and 365, execution continues to step 366. In step 366, the modified FDSNR_LM procedure is applied to the 8×8 blocks of the current slice, using the adjusted quantization scale index, if the adjusted quantization scale index is less than the maximum possible quantization scale index. In step 367, execution loops back to step 362 to continue 8×8 block conversion until a new slice header is encountered, indicating the beginning of a new slice. Once a new slice is encountered, execution continues from step 367 to step 368. In step 368, the average escape sequence occurrence frequency per block for the last slice is compared to a threshold TH1. If the escape sequence occurrence frequency is greater than the threshold, then execution branches to step 369. In step 369, if the quantization scaling factor (QSF) is less than or equal to a limit value such as 2, then execution branches to step 370 to increase the quantization scaling factor (QSF) by a factor of two.

Figure 23:
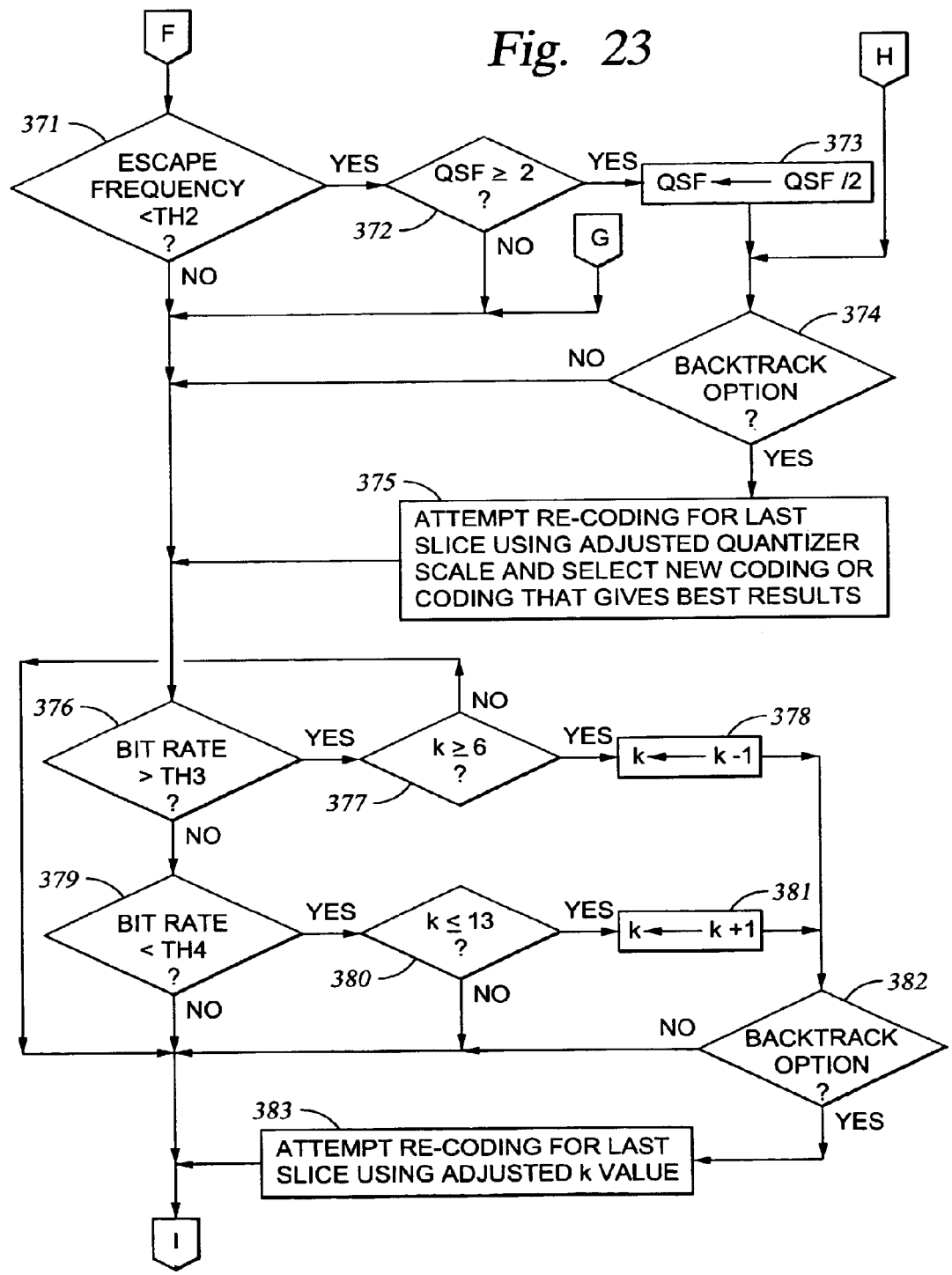
FIG. 23 is a second portion of the flowchart begun in FIG. 22.

In step 368, if the escape sequence occurrence frequency is not greater than the threshold TH1, then execution continues to step 371 of FIG. 23. In step 371, the average escape sequence occurrence frequency per 8×8 block for the last slice is compared to a threshold TH2. If the escape sequence occurrence frequency is less than the threshold TH2, then execution branches to step 372. In step 372, if the quantization scaling factor (QSF) is greater than or equal to a limit value such as 2, then execution branches to step 373 to decrease the quantization scaling factor (QSF) by a factor of two. After step 373, and also after step 370 of FIG. 22, execution continues to step 374 of FIG. 23. In step 374, execution continues to step 375 if a backtrack option has been selected. In step 375, re-coding for the last slice is attempted using the adjusted quantization scale factor. The new coding, or the coding that gives the best results in terms of the desired reduction of escape sequence occurrence frequency, is selected for use in the scaled quality picture. After step 375, execution continues to step 376. Execution also continues to step 376 from: step 369 in FIG. 22 if the quantization scaling factor (QSF) is not less than or equal to 2; step 371 in FIG. 23 if the escape sequence occurrence frequency is not less than the threshold TH2; step 372 in FIG. 23 if the quantization scaling factor (QSF) is not greater than or equal to 2; and from step 374 in FIG. 23 if the backtrack option has not been selected.

In step 376, the average bit rate of the (run, level) coding per 8×8 block for at least the last slice is compared to a high threshold TH3. Preferably this average bit rate is a running average over the already processed segment of the current scaled quality I-frame, and the high threshold TH3 is selected to prevent video buffer overflow in accordance with the MPEG-2 Video Buffer Verifier restrictions. If the average bit rate exceeds the high threshold TH3, then execution continues to step 377, where the number (k) of non-zero largest magnitude AC coefficients per 8×8 block is compared to a lower limit value such as 6. If the number (k) is greater than or equal to 6, then execution continues to step 378 to decrement the number (k). In step 376, if the average bit rate is not greater than the threshold TH3, then execution continues to step 379. In step 379, the average bit rate is compared to a lower threshold TH4. If the average bit rate is less than the threshold TH4, then execution branches from step 379 to step 380, where the number (k) of non-zero largest magnitude AC DCT coefficients per 8×8 block is compared to a limit value of 13. If the number (k) is less than or equal to 13, then execution continues to step 381 to increment the number (k). After step 378 or 381, execution continues to step 382. In step 382, execution continues to step 383 if a backtrack option is selected. In step 383, an attempt is made to re-code the last slice for the scaled quality picture using the adjusted value of the number (k) of non-zero largest magnitude AC DCT coefficients per block. After step 383, execution loops back to step 362 of FIG. 22 to continue generation of the scaled quality clip. Execution also loops back to step 362 of FIG. 22 after: step 377 if the value of (k) is not greater than or equal to 6; step 379 if the average bit rate is not less than the threshold TH4; step 380 if the value of (k) is not less than or equal to 13; and step 382 if the backtrack option has not been selected. Coding of the scaled quality clip continues until the end of the original quality clip is reached in step 384 of FIG. 22, in which case execution returns.

Figure 24:
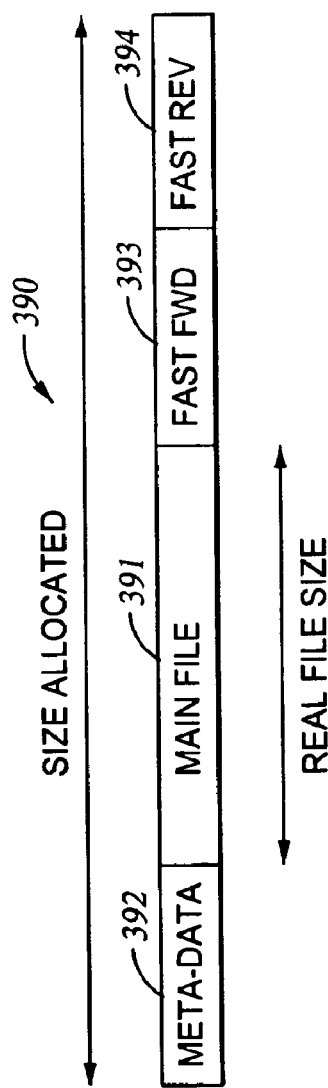
FIG. 24 is a simplified block diagram of a volume containing a main file, a corresponding fast forward file for trick mode operation, and a corresponding fast reverse file for trick mode operation.

In a preferred implementation, a fast forward trick mode file and a fast reverse trick mode file are produced from an original-quality MPEG-2 coded video main file when the main file is ingested into the video file server. As shown in FIG. 24, a volume generally designated 390 is allocated to store the main file 391. The volume 390 includes an allocated amount of storage that exceeds the real file size of the main file 391 in order to provide additional storage for meta-data 392, the fast forward trick file 393, and the fast reverse trick file 394. The trick files are not directly accessible to clients as files; instead, the clients may access them through trick-mode video service functions. With this strategy, the impact on the asset management is a minimum. No modification is needed for delete or rename functions.

Because the volume allocation is done once for the main file and its fast forward and fast reverse trick mode files, there is no risk of lack of disk space for production of the trick files. The amount of disk blocks to allocate for these files is computed by the video service using a video service parameter (vsparams) specifying the percentage of size to allocate for trick files. A new encoding type is created in addition to types RAW for direct access and MPEG2 for access to the main file. The new encoding type is called EMPEG2, for extended MPEG2, for reference to the main file plus the trick files. The video service allocates the extra file size only for these files.

For the transfer of these files to archive or to another video file server, it would be useful to transfer all the data even if it is a non-standard format. For the FTP copy-in, a new option is added to specify if the source is in the EMPEG2 format or if it is a standard MPEG2 file. In the first case, the copy-in should provide the complete file 390. In the second case, the video service allocates the extra size and the processing is the same as for a record. For the copy-out, the same option can be used to export the complete file 390 or only the main part 391. The archiving is always done on the complete file 390.

The trick mode file production is done by a new video service procedure. This procedure takes as input the speed-up factor (or the target trick mode file size) along with the number of freeze (P or B) frames to insert in between the scaled I frames and then generates both the fast forward file 393 and the fast reverse file 394 for this speed-up factor (or target trick mode file size) and with the specified number of interleaving freeze frames. Since the bandwidth of the original clip (in the main file) and the bandwidths of the two trick mode clips (in the fast forward and fast reverse files) are the same, the speed-up factor and the target trick mode file size are equivalent pieces of information. A default speed-up factor (system parameter) can be used. The main file is read and the trick mode files are produced. If a trick mode file already exists with the same speed-up factor, it is rewritten or nothing is done depending on an option. Multiple trick mode files could be created with different speed-up factors. But it is preferred to permit only one set of fast forward and fast reverse trick mode files to be produced at a time (i.e., no parallel generation with different speed-up factors). The current speed-up factor is a parameter within the video service parameters (vsparams).

As stated above another parameter to be provided to the video service procedure in charge of trick mode file generation is the number of freeze frames to be inserted in between consequent scaled I frames. The preferred values for this parameter are 0 and 1, although other positive integer values greater than 1 are also possible. The inclusion of freeze frames due to their very small sizes spare some bandwidth which can then be used to improve the quality of scaled I frames. Hence, the freeze frames in this context provide a mechanism to achieve a trade-off between the scaled I frame quality and the temporal (motion) sampling. Depending on the speed-up factor (or the target trick mode file size) and also the number of interleaving freeze frames to be inserted, the video service procedure in charge of trick mode file generation determines a sub-sampling pattern (closest to uniform) to choose the original I frames which will be scaled and included in the trick mode files. For example, the case of an original clip with 10 frames per GOP, a trick mode file size which is 10% of the main file together with 0 freeze frames, implies the use of all original I frames for being scaled and included in the trick mode file. This will typically result in a low quality scaling. As another example, the case of an original clip with 10 frames per GOP, a trick mode file size which is 10% of the main file together with 1 freeze frame, implies the use of a 2 to 1 (2:1) sub-sampling on the original I frames which will choose every other original I frame for being scaled and included in the trick mode file.

Figure 25:
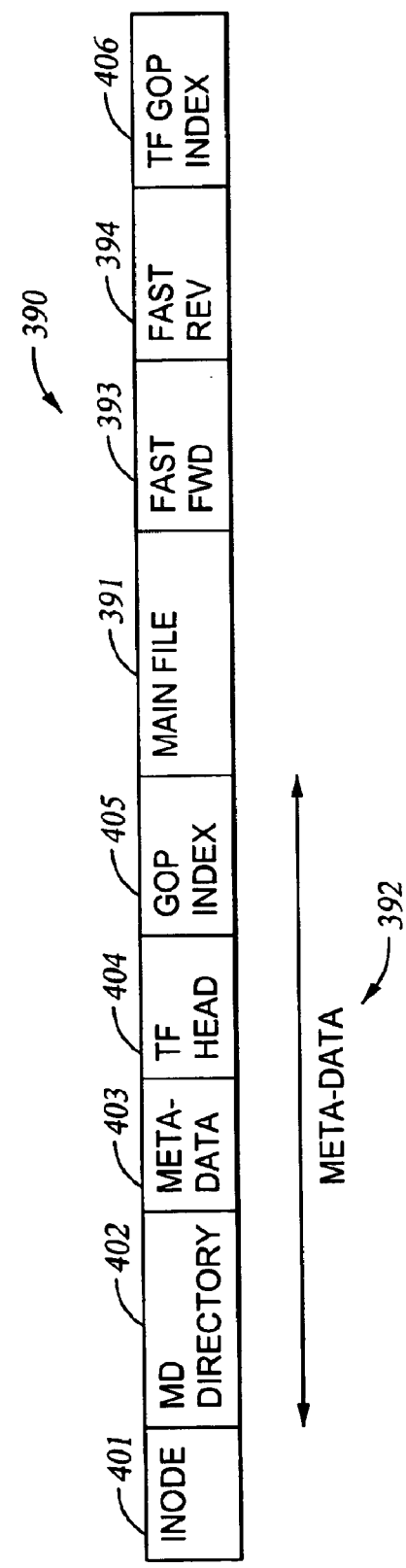
FIG. 25 is a more detailed block diagram of the volume introduced in FIG. 24.

FIG. 25 is a more detailed diagram of the volume 390, showing additional meta-data and related data structures. The Inode 401 includes 4 disk blocks containing a file-system oriented description of the file. The meta-data (MD) directory 402 includes 4 disk blocks describing each entry of the meta-data area 392. The entries of the meta-data area 392 include a description of the MPEG-2 meta-data 403, a description of the trick files header meta-data 404, and a description of the GOP index meta-data 405. The MPEG-2 meta-data 403 includes 15 disk blocks maximum.

The trick files header 404 includes 1 disk block, which specifies the beginning of free area (end of last trick file) in blocks, the number of trick files couple (FF FR), and for each trick file, a speed-up factor, a block address of the GOP index, a block address of the trick file forward, a byte length of the trick file forward, a block address of the trick file reverse, a byte length of the trick file reverse, a frames number of the trick file, and a number of GOP of each trick files.

The GOP index includes 2024 disk blocks. The GOP index specifies, for each GOP, a frame number, a pointer to the MPEG-2 data for the GOP in the main file, and various flags and other attributes of the GOP. The flags indicate whether the GOP entry is valid and whether the GOP is open or closed. The other attributes of the GOP include the maximum bit rate, the average bit rate, the AAU size in bytes, the APU duration in seconds, the audio PES packet starting locations, the AAU starting locations, the AAU PTS values, and the decode time stamp (DTS) and the value of the program clock reference (PCR) extrapolated to the first frame of the GOP. The size of all the data preceding the main file is, for example, 1 megabyte.

There is one GOP index 406 for both the fast forward file 393 and the fast reverse file 394. The GOP index 406 of the trick files is different than the GOP index 405 of the main file. The GOP index 406 of the trick files contains, for each GOP, the byte offset in the trick file forward of the TS packet containing the first byte of the SEQ header, the frame number in the fast forward file of the GOP (the same value for the fast reverse file can be computed from this value for the fast forward file), the frame number in the original file of the first frame of the GOP, and the byte offset in the original file of the same frame (to resume after fast forward or reverse without reading the main GOP index).

Figure 26A:
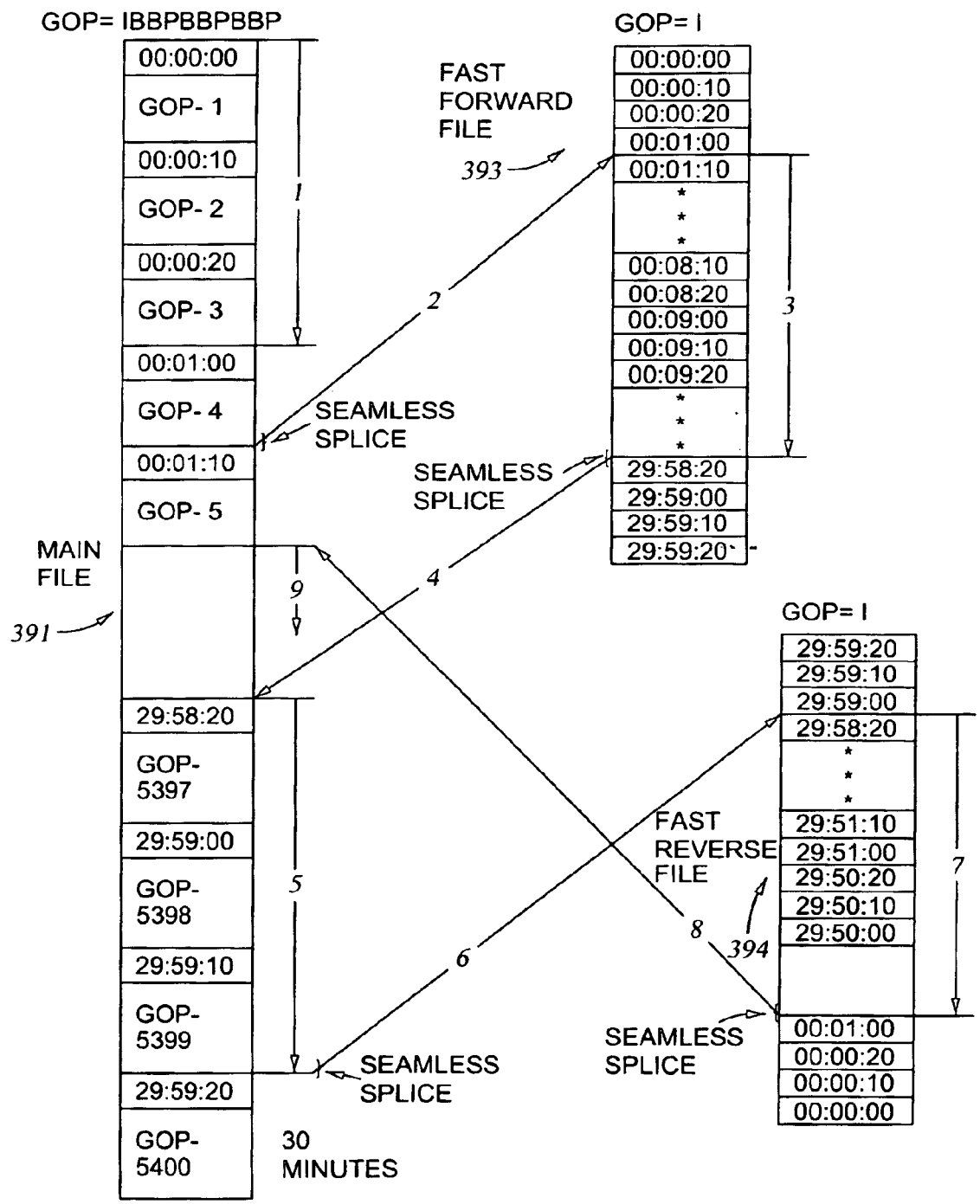
FIG. 26A is a diagram showing video file access during a sequence of video operations including transitions between the main file, the related fast forward file, and the related fast reverse file.

The GOP index 405 for the main file and the GOP index 406 for the fast forward and fast reverse trick files provide a means for rapidly switching between the normal video-on-demand play operation during the reading of the main file, and the fast-forward play during the reading of the fast-forward file, and the fast-reverse play during the reading of the fast-reverse file. For example, FIG. 26A illustrates the read access to various GOPs in the main file, fast forward file, and fast reverse file, during a play sequence listed in FIG. 26B. Due to the presence of down-scaled I frames and possibly present consequent freeze frames in the trick mode files, the video buffer verifier (VBV) model for a trick mode file is different than the VBV model of the main file. Consequently, the mean video decoder main buffer fullness levels can be significantly different for these files. For example, a transition from the main file to one of the trick files will usually involve a discontinuity in the mean video decoder main buffer fullness level, because only the I frames of the main file correspond to frames in the trick files, and the corresponding I frames have different bit rates when the trick mode I frames are scaled down for a reduced bit rate. An instantaneous transition from a trick file back to the main file may also involve a discontinuity especially when freeze frames are inserted between the I frames for trick mode operation. To avoid these discontinuities, the seamless splicing procedure of FIGS. 3 to 6 as described above is used during the transitions from regular play mode into trick mode and similarly from trick mode back into the regular play mode. Through the use of the seamless splicing procedure to modify the video stream content, for example for the "Seamless Splice" locations identified in FIG. 26A, the video decoder main buffer level will be managed so as to avoid both overflows and underflows leading to visual artifacts.

It is desired to copy in and out of the volume 390 with or without the meta-data 392 and the trick files 393, 394. This is useful to export and/or import complete files without regenerating the trick files. The file encoding type is now recognized as a part of the volume name. Therefore there can be multiple kinds of access to these files. The read and write operations are done by derivations of the class file system input/output (FSIO) which takes into account the proper block offset of the data to read or write. There is one derivation of FSIO per encoding type, providing three different access modes. EMPEG2, MPEG2, and RAW. EMPEG2 accesses the whole volume from the beginning of the meta-data array, and in fact provides access to the entire volume except the inode 401, but no processing is done. MPEG2 access only the main part of the asset with MPEG processing, including file analysis and meta-data generation in a write access. RAW access only the main part of the asset without processing. These access modes are operative for read and write operations for various access functions as further shown in FIG. 27.

During a record operation, the video service allocates a volume and computes the number of blocks to allocate using the volume parameter giving the percentage to add for the trick files. Then, the size in blocks given to the stream server is the main part size only without the extension for the trick files. This avoids using the reserved part of the volume when the effective bit rate is higher than the requested bit rate. At the end of a record operation or an FTP copy-in operation, the video service calls a procedure CMSPROC_GETATTR, and the stream server returns the actual number of bytes received and the actual number of blocks used by the main file plus the meta-data. The same values are returned for both MPEG2 and EMPEG2 files. The video service computes again the file extension to manage the trick files and adjust the number of allocated blocks.

Both trick files, forward and reverse, are generated by the same command. First, the trick file forward is generated by reading the main file. The trick file GOP index is concurrently built and kept in memory. During this generation, only the video packets are kept. PCR, PAT and PMT will be regenerated by the MUX in play as for any other streams. The audio packets are discarded. This ensures that there is enough stuffing packets for the PCR reinsertion. For this, a stuffing packet is inserted every 30 milliseconds.

Then using the GOP index, the trick file forward is read GOP by GOP in reverse order to generate the trick file reverse. The same GOPs are present in both files. The only modification done is an update of the video PTS, which must be continuous. Then, the GOP index is written on disk. This avoids reading again the file while generating the second trick file. The GOP index size is: 24 times the GOP number. In the worst case (the file is assumed not to be 1 frame only), there are 2 frames per GOP and 30 frames per second. So for 1 hour in fast forward, the GOP index size is: $(24 \times 3600 \times 30)/2 = 1296000$ bytes. This will be the case for a 4 hour film played at 4 times the normal speed. Therefore, this GOP index can be kept in memory during the trick file generations without risk of memory overflow.

The read and write rates are controlled to conserve bandwidth on the cached disk array. The bandwidth reserved for these operations is a parameter given by the video service. It is a global bandwidth for both read and writes. The number of disk I/Os per second is counted so as not to exceed this bandwidth.

The trick files' header update is done once when both the fast forward and fast reverse trick files and the GOP index have been successfully written.

Playing a file is done with the CM_MpegPlayStream class. Fast forward (reverse) can only be requested when the stream is in the paused state. The current frame on which the stream is paused is known from the MpegPause class. This frame is located in the GOP index of the trick file. Then the clip start point and length are modified in the Clip instance with the trick file position computed from the beginning of the clip. So, the Clip class handles these trick files in a manner similar to the main file. The current logical block number is updated with the block address in the trick file recomputed from the beginning of the main clip. In fact, a seek is performed in the trick file as it was part of the main file, which is totally transparent for the ClipList and Clip classes. The transition from fast forward to pause is handled in a similar fashion. The clip start and length and the logical block number are again updated. The smooth transitions from pause to fast forward and from fast forward to pause are done in the same way as for regular play. There is a splicing from the pause stream to the play stream.

Figures 26B, 27, 28:
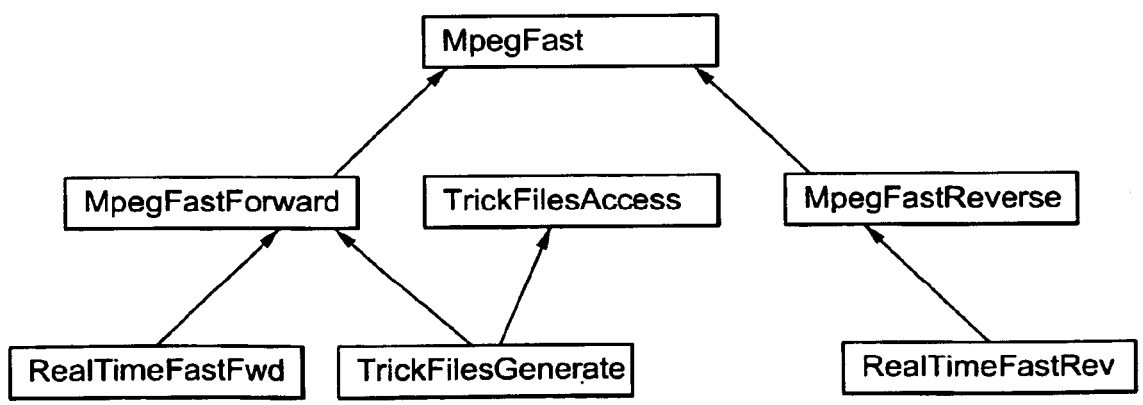
FIG. 26B shows a script of a video command sequence producing the sequence of video play shown in FIG. 26A.
FIG. 27 is a table of read and write access operations upon the volume of FIG. 24 and access modes that are used for the read and write access operations.
FIG. 28 is a hierarchy of video service classes associated with the fast forward file and the fast reverse file in the volume of FIG. 25.

The class hierarchy for trick file handling is shown in FIG. 28. The MpegFast, MpegFastForward and MpegFastReverse class handles the GOP generation from the initial file. This is the common procedure for building the GOP whatever the source and the destination are. RealTimeFastFwd and RealTimeFastRev are the classes instantiated when a real time fast forward (reverse) has to be done. They manage the real-time buffer flow to the player. There is a derivation of the methods takeBuffer and returnBuffer which use the base class to build the GOP in the buffer to be played. The main file access is done using a buffer pool.

TrickFilesGenerate is the class instantiated to generate trick files forward and reverse. It inherits from TrickFilesAccess the methods for reading the original file into some buffers and for writing the trick file and its meta-data. It inherits from MpegFastForward the methods for building the GOP and for managing the advance in the file.

The computation of the next 1 frame to play is done by MpegFast, MpegFastForward and RealTimeFastFwd. When a trick file generation command is invoked, a thread is created and started and the generation itself is done off-line. A call-back is sent to the video service when the generation is completed. The class TrickFilesGenerate generates the trick file forward, and then, using the GOP index built in memory, the class TrickFilesGenerate generates the trick file reverse.

When there is a transition from play to pause, the only latency issue is related to the buffer queue handled by the player and to the GOP size. The stream can build immediately the active pause GOP, and then this GOP will be sent at the end of the current GOP with a splicing between these two streams.

When there are transitions from pause to regular play or fast forward and fast reverse, a seek in the file is done. This means that the current buffer pool content is invalidated and the buffer pool is filled again. Play can start again while the buffer pool is not completely full, as soon as the first buffer is read. The buffer pool prefilling can continue as a background process. The issue here is that there is a risk to generate an extra load on the cached disk array as well as on the stream server side when the buffer pool is being prefilled.

To avoid too frequent transitions from play to fast forward and fast reverse, there is a limitation of the number of requests per second for each stream. This limitation is part of the management of the video access commands. A minimum delay between two commands is defined as a parameter. If the delay between a request and the previous one is too small, the request is delayed. If a new request is received during this delay, the new request replaces the waiting one. So the last received request is always executed.

The video service parameters file (vsparams) contains these new parameters for the trick mode files:
TrickFileExtensionSize:<percent>:
DefaultFastAcceleration:<acceleration>:
DMtrickFileGen:<mask of reserved DM>(This parameter is a mask of the stream servers that can be chosen to perform the trick file generation. The default value is 0xfffc: all of the stream servers.)
DMtrickFileGenBW:<bandwidth used for trick file generation>(This parameter is the value of the bandwidth effectively used by the stream server for the trick files generation.)

The video service routines are modified to operate upon the EMPEG2 files, and in particular to compute the size of the EMPEG2 files, to allocate the volume for the main file and the trick files, and to generate the trick files. The volume creation functions (VAPP) and volume access functions (RRP) use the EMPEG2 files in the same way as MPEG2 files. This means that an MPEG2 volume is created on the stream server. Both MPEG2 and EMPEG2 files can be used in the same session or play-list. The session encoding type is MPEG2. In record (or copy-in), the number of blocks allocated for an EMPEG2 file is computed using the percentage of size to add. At the end of record (or copy-in), the number of blocks is adjusted using the number of blocks returned by the stream server (by CMSPROC_GETATTR) and adding the percentage for trick files. The trick files validity and generation date are stored by the video service in the asset structure. The bandwidth allocated to the TrickFilesGenerate command is defined in the video service parameters (vsparams or vssiteparams). The selection of a stream server to generate the trick files takes into account this bandwidth only. If preferred stream servers are specified in vsparams (or vssiteparams), then the selected stream server will be one of these specified stream servers.

In a preferred implementation of the video service software, a new encoding type is created. The encoding type enum becomes:

```
enum encoding-t{
    ENC_UNKNOWN  = 0,   /* unknown format */
    ENC_RAW      = 1,   /* uninterpreted data */
    ENC_MPEG1    = 2,   /* constrained MPEG1 */
    EMC_MPEG     = 3,   /* generic MPEG */
    ENC_EMPEG2   = 4,   /* MPEG2 with trick files extension */
};
```

The encoding information accessible by VCMP_EXTENDEDINFO includes information about trick files:

```
struct trickFilesInfo_t{
    ulong_t        generationDate;  /* date/time of the generation of
                                       the trick files */
    rate_factor_t  acceleration;    /* acceleration factor */
    ulong_t        framesNumber;    /* frames number in each trick file
                                       (FWD and REV) */
    ulong_t        gopNumber;       /* GOP number of each file */
};
struct EMPEG2info_t{
    MPEG2info_t       MPEG2info;
    trickFilesInfo_t  trickFiles< >;
};
union encodingInfo_t switch (encoding-t enc){
    case ENC_MPEG:
        MPEG2info_t    MPEG2info;
```

-continued

```
    case ENC_EMPEG2:
        EMPEG2info_t    EMPEG2info;
    default:
        void;
};
```

The video service software includes a new procedure (VCMP_TRICKFILESGEN) for trick file generation, which uses the following structures:

```
    struct VCMPtrickgenres_t{
        VCMPstatus_t       status;
        tHandle_t          handle;
    };
    struct VCMPtrickfilesargs_t{
        name_t             clipname;
        bool_t             overwriteIfExists;
        rate_factor_t      acceleration;
    };
    VCMPtrickgenres_t      VCMP_TRICKFILESGEN
                           (VCMPtrickfilesargs_t) =
    36,
```

If the trick files already exist and if the boolean overwriteIfExists is true, then the trick files are generated again, in the other case nothing is done. Acceleration is the acceleration as defined and used for the controlled speed play function. It is a percentage of the normal speed, it must be greater than 200 and smaller than 2000. The special value of 0 can be used to generate files with the default acceleration defined in vssiteparams. The procedure starts the generation process. The completion is notified by a callback.

The video service includes a new option to copy-in and copy-out. The option is added to allow a user to copy all the file or the main asset only. For compatibility with old client programs, the following new procedures are added:

```
VCMPcopyres_t  VCMP_FULL_COPYIN   (copyinargs2_t)   = 37,
VCMPcopyres_t  VCMP_FULL_COPYOUT  (copyoutargs2_t)  = 38,
```

These new procedures have the same interface as the already existing one, but are used to copy-in the complete file: meta-data+asset+trick files.

The video service includes a new procedure VCMP_TRICKFILESGENCOMPLETED, which uses the following structures:

```
    struct VCMPtrickfilescomplete_t{
        tHandle_t          handle;
        VCMPstatus_t       status;
    };
    VCMPstatus_t TRICKFILESGENCOMPLETED
    (VCMPtrickfilescomplete_t) = 10,
```

The video service includes new procedures added for handling trick mode generation arguments and using the following structures:

```
    struct cms_trick_gen_args {
        Handle_t           Vshandle;
        name_t             name;
        bool_t             overwriteIfExists;
        rate_factor_t      acceleration;
        bandwidth_t        reservedBw;
    };
    cms_status         CMSPROC_GEN_TRICK_FILES       = 34,
                       (cms_trick_gen_args)
    struct trick_gen_completed_args {
        Handle_t           Vshandle;
        cms_status         status;
    };
    void CTLPROC_TRICKGENCOMPLETED                   = 8,
    (trick_gen_completed_args)
```

The video service includes the following option to force the regeneration of trick files even if they exist:

nms_content -gentrick<name>[<-f>] [acceleration]

Without this option, an error code is returned if the trick files exist. "Acceleration" is an acceleration factor. If it is not present, the default value is taken from vsparams.

The video services include an encoding information access function (nms_content -m). This function produces displayed output containing, for each trick file generated, the acceleration, the generation date and time, the number of frames, and the number of GOPs.

For the use of an FTP copy function with the trick files, the following new commands are added:

nms_content -copyinfull<same arguments as -copyin>
nms_content -copyoutfull<same arguments as -copyout>

Figure 29:
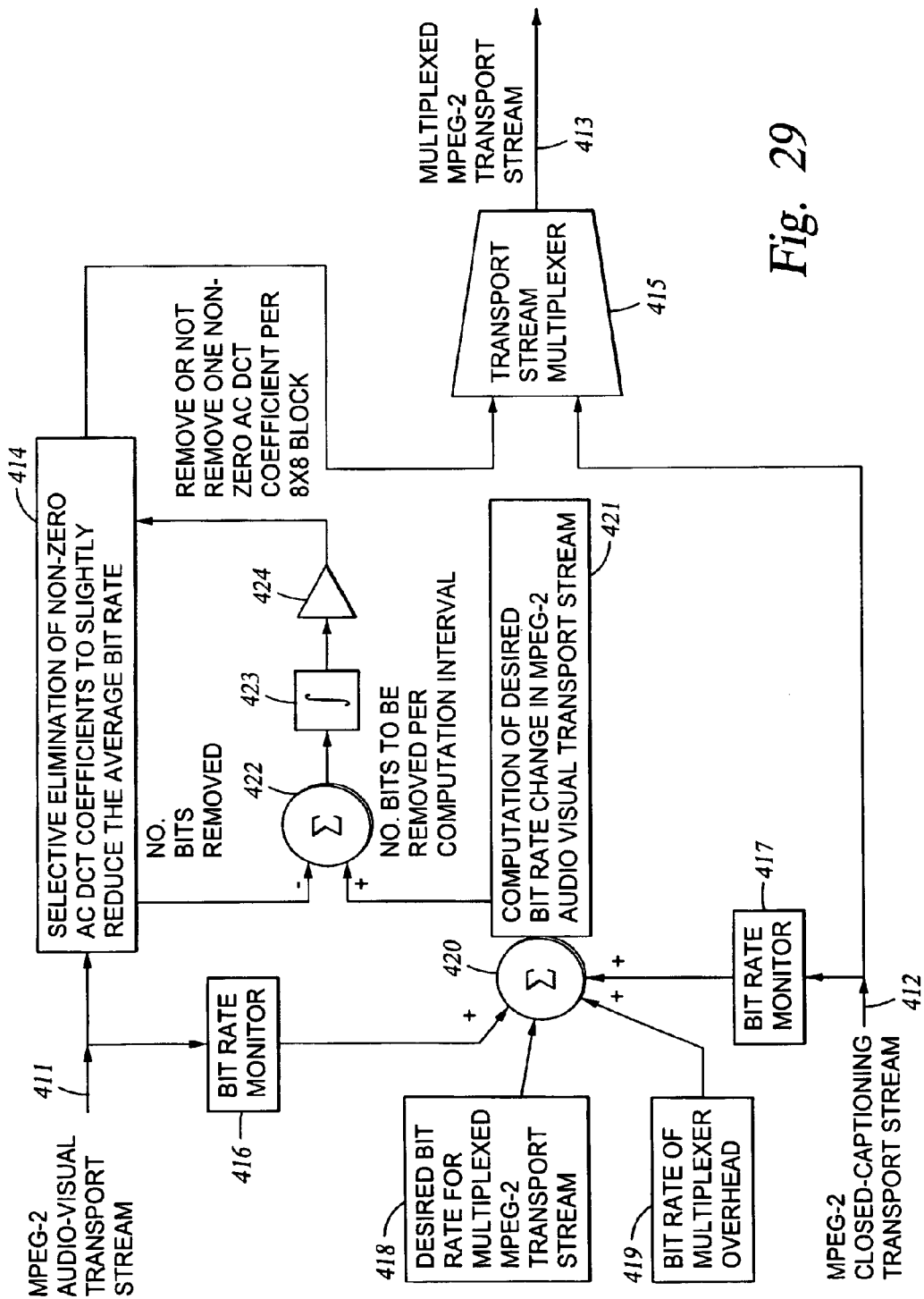
FIG. 29 shows a system for modifying and combining an MPEG-2 audio-visual transport stream with an MPEG-2 closed-captioning transport stream to produce a multiplexed MPEG-2 transport stream having the same bit rate as the original MPEG-2 audio-visual transport stream.

VI. Reduction of MPEG-2 Transport Stream Bit Rate for Combining Multiple MPEG-2 Transport Streams Another application of the SNR scaling achieved by the invention is to reduce the bit rate of an MPEG-2 transport stream in order to allow combining multiple MPEG-2 transport streams to match a target bit rate for a multiple program transport stream. For example, FIG. 29 shows a system for combining an MPEG-2 audio-visual transport stream 411 with an MPEG-2 closed-captioning transport stream 412 to produce a multiplexed MPEG-2 transport stream 413. In this case, the closed captioning transport stream 412, containing alphanumeric characters and some control data instead of audio-visual information, has a very low bit rate compared to the audio-visual transport stream 411. Assuming that the target bit rate for the multiplexed transport stream 413 is the same as the bit rate of the audio-visual transport stream 411, there need be only a slight decrease in the bit rate of the audio-visual transport stream, and this slight decrease can be obtained by occasionally removing one non-zero AC DCT coefficient per 8×8 block. Therefore, in the system of FIG. 29, the audio-visual transport stream 411 is processed by a program module 414 for selective elimination of non-zero AC DCT coefficients to slightly reduce the average bit rate of this transport stream. A transport stream multiplexer 415 then combines the modified audio-visual transport stream with the closed captioning transport stream 412 to produce the multiplexed MPEG-2 transport stream 413.

In order to determine whether or not any non-zero AC DCT coefficient should be eliminated from a next 8×8 block in the audio-visual transport stream 411, a module 421 is executed periodically to compute a desired bit rate change in the audio-visual transport stream 411. For example, respective bit rate monitors 416, 417 may measure the actual bit rate of the audio-visual transport stream 411 and the closed captioning transport stream 412. Alternatively, if it is known precisely how these transport streams are generated, presumed values for the bit rates of these transport streams may be used in lieu of measured bit rates. The computation of the desired bit rate change also includes the desired bit rate 418 for the multiplexed MPEG-2 transport stream, and a bit rate 419 of multiplexer overhead, representing any net increase in bit rate related to the multiplexing of the audio-visual transport stream 411 with the closed captioning transport stream 412. An adder/subtractor 420 combines the various bit rate values from the inputs 416, 417, 418, and 419 to compute the desired bit rate change in the audio-visual transport stream 411. From the adder/subtractor 420 output, the module 421 converts the desired change in bit rate to a desired number of bits to be removed per computational cycle (e.g., per millisecond). This number of bits to be removed per computational cycle is received in an adder/subtractor 422, and the output of the adder/subtractor is received in an integrator 423. A limiter 424 takes the sign (positive or negative) of the integrated value to produce a flag indicating whether or not one non-zero AC DCT coefficient should be removed from the coefficients for the next 8×8 block, assuming that the next block has at least one non-zero AC DCT coefficient. (Alternatively, a non-zero AC DCT coefficient could be removed only if the 8×8 block has more than a predetermined fraction of the average number of AC DCT coefficients per 8×8 block.) The particular non-zero AC DCT coefficient to remove in each case can be selected using any of the methods discussed above with reference to FIGS. 14, 15, or FIG. 20. For example, the coefficient to remove could be the last non-zero AC DCT coefficient in the scan order. Alternatively, the non-zero AC DCT coefficient having the smallest magnitude could be removed so long as its removal does not cause an escape sequence.

When the module 414 removes a non-zero AC DCT coefficient from a 8×8 block, it sends the number of bits removed to the adder/subtractor 422. In a preferred implementation, the operations of the adder/subtractor 422, integrator 423, and limiter 424 are performed by a subroutine having a variable representing the integrated value. During each computational cycle, the variable is incremented by the number of bits to be removed per computational interval, and whenever the module 414 removes a non-zero AC DCT coefficient from a 8×8 block of the audio-visual transport stream, the variable is decremented by the number of bits removed.

Although the system in FIG. 29 has been described for achieving a slight reduction in bit rate of the MPEG-2 audio-visual transport stream 411 for combining multiple transport streams to produce a multiple program MPEG-2 transport stream, it should be apparent that it could be used for obtaining relatively large reductions in bit rate. In this case, the module 414 would use the procedure of FIGS. 14, 15 or preferably FIG. 20, and a multi-level comparator 424 would be used instead of a single-level comparator 424. The multi-level comparator would determine a desired number of non-zero coefficients to discard per 8×8 block based on the value of the output of the integrator 423. The maximum number of non-zero AC coefficients to keep for each 8×8 block (i.e., the value of the parameter "k"), for example, would be determined by subtracting the number of non-zero AC DCT coefficients in the 8×8 block from the desired number to discard, and limiting this difference to no less than a predetermined fraction of the average number of non-zero AC coefficients per 8×8 block.

VII. Largest Magnitude Indices Selection for (Run, Level) Encoding of a Block Coded Picture As described above with reference to FIG. 15, one way of scaling original-quality MPEG-2 video to produce lower-quality MPEG video is to retain up to a certain number of largest-magnitude non-zero AC DCT coefficients and to truncate any remaining non-zero AC DCT coefficients from each 8×8 block of pixels. This was referred to as the FDSNR_LM procedure. As shown and described with reference to FIG. 15, in step 262, the (run, level) event variable-length codes (VLCs) for each block are parsed and decoded to produce a set of quantization indices. In step 263, the quantization indices (for AC DCT coefficients) are transformed to quantized coefficient values, and in step 264, the quantized coefficient values are sorted in descending order of their magnitudes.

In order to perform scaling in a computationally more efficient way, it is possible to eliminate the step 263 of transforming the quantization indices to quantized coefficient values by selecting largest magnitude quantization indices (for the AC DCT coefficients) instead of selecting the largest magnitude quantized coefficient values. This would make the scaling procedure more suitable for real-time applications, so long as there would not be a significant degradation in performance compared to the performance obtained by selecting largest magnitude quantized coefficient values. For comparison purposes, the method of selecting the largest magnitude quantization indices will be referred to as "LMIS" (Largest Magnitude Indices Selection) and the method of selecting the largest magnitude quantized coefficient values will be referred to as "LMCS" (Largest Magnitude Coefficient Selection). It has been discovered that LMIS is not only computationally more efficient than LMCS but also LMIS provides an improvement in performance over LMCS in the rate-distortion sense.

Figure 30:
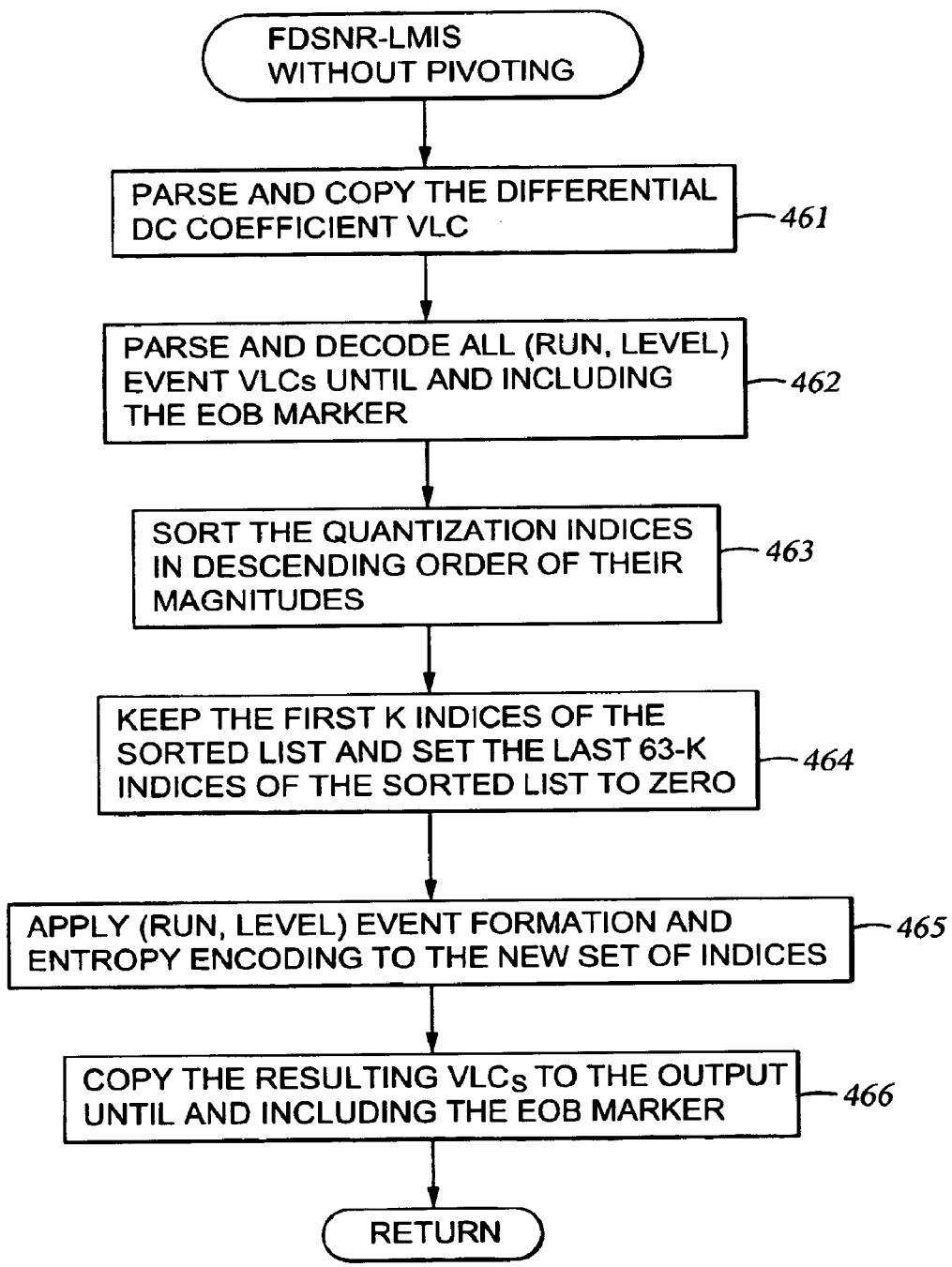
FIG. 30 shows a flowchart of a procedure for signal-to-noise ratio scaling MPEG-2 coded video using a frequency-domain largest magnitude indices selection (FDSNR_LMIS) technique.

FIG. 30 shows the LMIS procedure performed on an 8×8 pixel block for the case where no pivoting is used. (The use of pivoting will be discussed below with reference to FIG. 43.) In other words, a subroutine corresponding to the flowchart in FIG. 30 is called once for each series of variable-length codes corresponding to an 8×8 pixel block. In a first step 461, the differential DC coefficient representing variable-length code (VLC) is parsed and copied from an input bit stream of original-quality MPEG-2 video to an output bit stream of reduced-quality MPEG video. Then in step 462, all of the following (run, level) event variable-length codes (VLCs) are parsed and decoded until and including the first end-of-block (EOB) marker in the input bit stream. In step 463, the quantization indices are sorted in descending order of their magnitudes. Step 463 could use any of the sorting methods described above with reference to FIGS. 14 to 19. In step 464, up to the first K indices of the sorted list are kept and the last 63-K indices of the sorted list are in effect set to zero. In other words, the last 63-K indices in the sorted list are not allowed to be represented by nonzero levels of (run, level) events in the output bit stream for the lower-quality MPEG video, but rather these last 63-K indices in the sorted list contribute to runs of zeros. In step 465, (run, level) event formation and entropy encoding is applied to the new set of up to the first K indices in the sorted list. In the last step 466, the resulting VLCs are copied to the output bit stream until and including the end of block (EOB) marker.

The performance of LMIS would be equivalent to the performance of LMCS if the quantization of the coefficient values affected all coefficients to the same degree. However, MPEG-2 provides a visually weighted quantization matrix that modifies the quantization step size within a block. (See, for example, Section 7.4, Inverse Quantization, page 68, of the MPEG-2 International Standard ISO/IEC 13818-2 Information technology—Generic coding of moving pictures and associated audio information: Video, 1996.) Therefore, DCT coefficients at higher frequencies with larger magnitudes may be mapped to indices with smaller values than DCT coefficients at lower frequencies with smaller magnitudes. Consequently, the ordering of the largest magnitude quantized coefficient values (produced by sorting the coefficient magnitudes in step 264 of FIG. 15) is not necessarily the same as the ordering of the largest magnitude quantization indices (produced by sorting index magnitudes in step 463 of FIG. 30).

If the video tends to have a predominant high spatial frequency content, then the coefficient matrix will tend to have larger values for the higher frequencies than the lower frequencies, and the visually weighted quantization matrix will cause the LMIS procedure to favor the selection of lower-frequency coefficients. In this case, the LMIS procedure will trade many of the indices with value one in the mid-to-high frequency range with value one (and sometimes 2 or 3) indices in the low frequency range. This swap of indices may result in lower picture signal-to-noise ratio (PSNR) than that obtained via the LMCS procedure for the same number of retained AC coefficients. However, the bit savings achieved by the LMIS procedure are much more significant than the PSNR loss, and overall, the performance of LMIS is a lot better in the rate-distortion sense than that of LMCS. The indices that are retained by the LMIS procedure will not only shorten the run-lengths but also from the perceptual coding point of view, it will result in more pleasant images better matching subjectively/visually the Human Visual System's (HVS) low-pass resembling nature. That is not to say that mid-to-high frequency components are not important. It means simply that when the coefficient values are comparable to a certain extent, it is a better decision to keep the ones in the low-pass band both for bit savings and for achieving perceptual coding. Even though 11 when two indices at different frequency channels have the same magnitude, the corresponding coefficient at the higher frequency channel being in general larger than that at the lower frequency channel, the difference does not justify the significantly higher bit-rate cost of coding the larger coefficient.

It may also be argued that LMIS is almost the same as the low-pass (LP) scaling described above with reference to FIG. 14. This is true for blocks of low-pass nature, and all three procedures (LMCS, LMIS, and LP) behave more or less the same when the signal power is concentrated in the low-pass band. However, when there is high signal power present in some other frequency band(s) as opposed to or in addition to the low-pass band, it is usually desirable to keep the signal components in those bands. While the LP scaling procedure can not achieve this, the LMCS procedure, being sensitive even to the smallest difference in the coefficient values, retains such bands even when the power in those bands is comparable to the power in the lower-frequency bands. Not only due to high coding cost of indices in such bands but also due to the low-pass nature of the human visual system, we would like to favor the lower-frequency bands to higher frequency bands when the power levels are comparable. In many cases where the LMCS procedure favors the indices in higher frequency bands, it may be better to favor the indices in low-frequency bands due to extremely higher cost of coding indices in higher frequency bands. Two intermingled effects are present here. First, the indices at the higher frequencies are usually paired with longer run lengths, and secondly, the exclusion of indices in lower frequencies will result in even longer run lengths for the indices to be kept in those bands. Therefore, in the rate-distortion sense, the signal components in higher frequencies should be retained when they indeed represent some significantly strong image feature. LMIS does that very well. It balances the power and bit budget and hence results in better rate-distortion curves. LMCS, on the other hand, is strictly focused to obtaining the most signal power without any attention to the bit budget. If the bid budget were not a concern, LMCS could be a better choice. However, the problem domain dictates that these two factors must be balanced in an appropriate manner.

Figure 31:
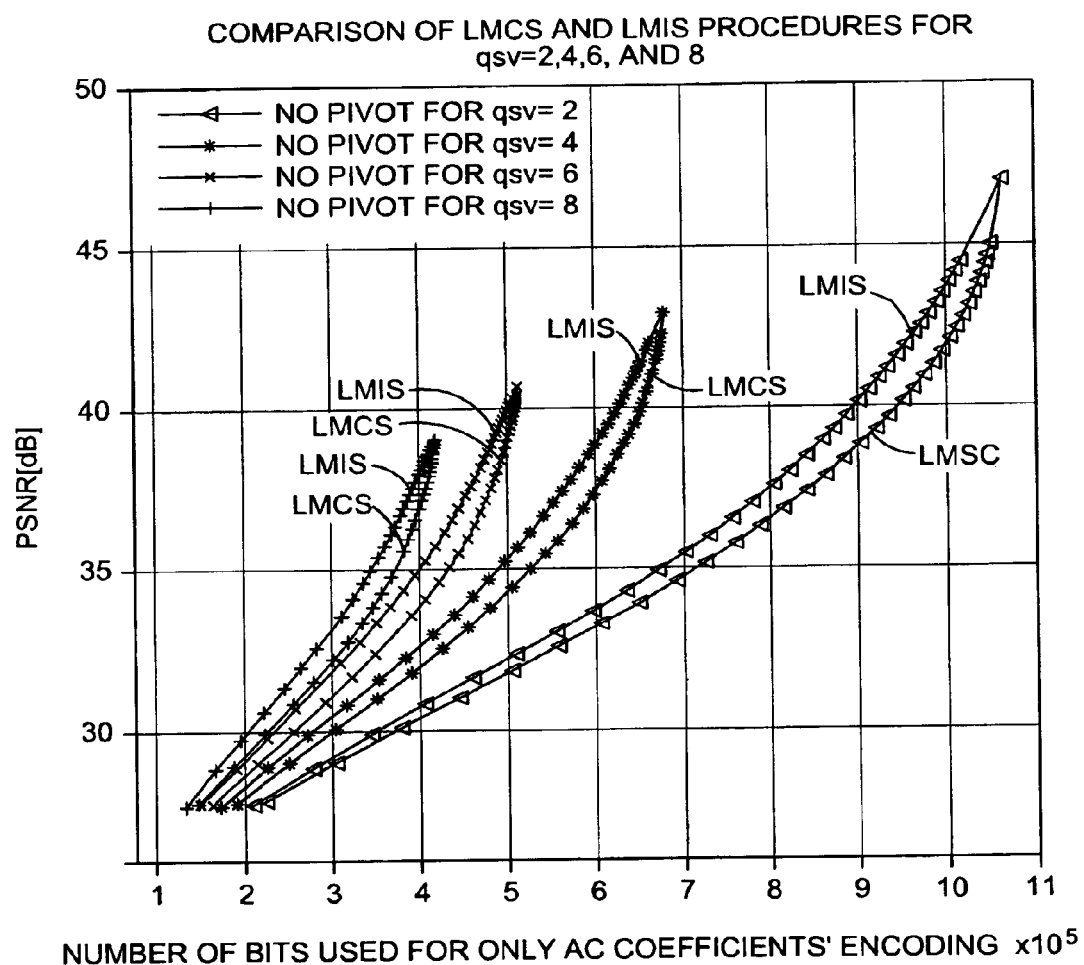
FIG. 31 shows a graph of the picture signal-to-noise ratio (PSNR) as a function of the number of bits used for only AC coefficients' encoding using the largest magnitude coefficient selection (LMCS) and largest magnitude indices selection (LMIS) procedures for quantization scale values (qsv) of 2, 4, 6, and 8, without the insertion of pivots.
Figure 32:
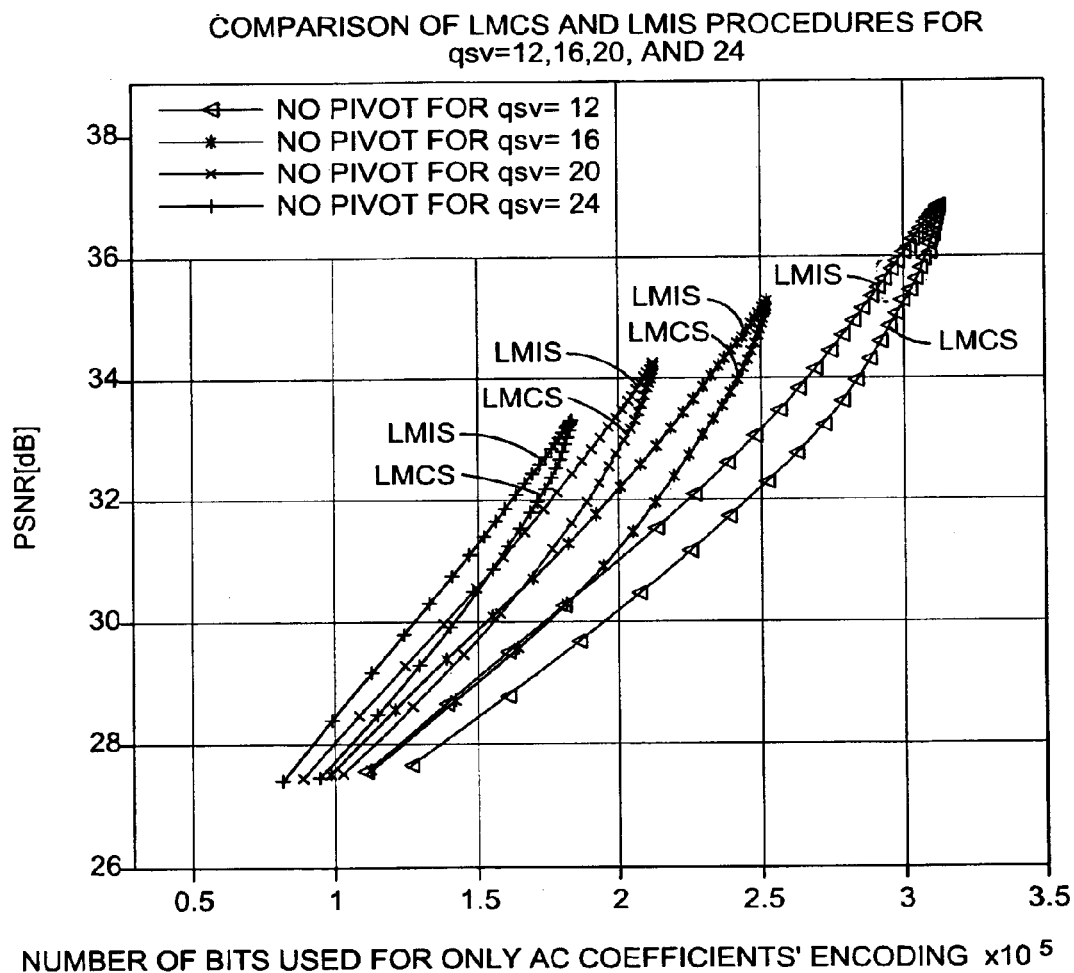
FIG. 32 shows a graph of the picture signal-to-noise ratio (PSNR) as a function of the number of bits used for only AC coefficients' encoding using the largest magnitude coefficient selection (LMCS) and largest magnitude indices selection (LMIS) procedures for quantization scale values (qsv) of 12, 16, 20, and 24, without the insertion of pivots.

FIGS. 31 and 32 show performance comparisons between the LMCS and LMIS procedures for the case of no pivot insertion and the use of MPEG-2's default visually weighted quantization matrix having larger values for the higher frequencies than the lower frequencies for video. The performance improvement of LMIS over LMCS is less significant when pivot insertion is used, as described below, for avoiding escape sequences and reducing the bits needed for (run, level) coding.

VIII. Avoiding Escape Sequences in Coding of (Run, Level) Pairs

In view of the above, there have been described methods of efficient SNR scaling of video originally present in a high-quality and nonscalable MPEG-2 transport stream. To reduce the bandwidth of nonscalable MPEG-2 coded video, certain non-zero AC DCT coefficients for the 8×8 blocks are removed from the MPEG-2 coded video.

It is recognized that the largest magnitude coefficient selection (LMCS) procedure of FIG. 15, in theory, has a great potential to provide high-quality scaling. However, in practice, under the practical bit rate versus quality, peak signal-to-noise (PSNR) rate-distortion measure, the LMCS procedure has a performance problem. The source of the problem, in the most part, appears to be a mismatch (i.e. a non-compatibility), between the (run, level) event statistics generated by the LMCS procedure and the statistics that the MPEG-2 (run, level) VLC codebooks are designed for. This mismatch revealed itself by both the generation of a drastically increased number of escape sequences and also an increased tendency towards using less likely (according to the MPEG-2 base statistics) (run, level) symbols represented by longer code words.

There are two principal and coupled mechanisms leading to the problem. First of all, the LMCS procedure, by its very nature, retains the larger magnitude coefficients. Secondly, smaller magnitude coefficients in between the larger ones (to be retained) are discarded, leading to longer run lengths. The MPEG VLC codebooks are such that the larger the magnitude of indices and the longer the run lengths, the more bits are required to code them. Very often, the (run, level) pairs generated via LMCS fall out of the codebook, necessitating to resort to the costly (fixed 24 bits) Escape Sequence coding, which is a mechanism to code very rarely, in a statistical sense, occurring (run, level) pairs.

As described above with reference to FIGS. 20 and 21, one way of avoiding escape sequences from the LMCS procedure was to include a non-zero, non-qualifying AC DCT coefficient in the (run, level) coding. As described below, this method can be extended to avoid escape sequences or reduce the number of bits used in the variable-length coding by introducing indices of magnitude 1 into coefficient channels corresponding to zero-valued AC DCT coefficients in the original-quality MPEG-2 coded video. In any case, a quantization index introduced into the coding for the reduced-quality MPEG coded video for the purpose of avoiding an escape sequence or reducing the number of bits for variable-length coding will be referred to as a "pivot index." The pivot indices, when used jointly with the LMCS or LMIS procedures, effectively change the original statistics of the (run, level) symbols generated by the baseline LMCS or LMIS procedures. In fact, the pivot technique, as described below, is useful in combination with any encoding or scaling technique producing (run, level) codes that deviate from the normal MPEG statistics by having a greater than normal frequency of escape sequences and an increased probability mass on (run, level) symbols with relatively long codewords.

The objective of inserting pivot indices is to break the long run-lengths of zero valued AC DCT coefficients when such a split leads to a savings in the number of bits required for encoding. The basic underlying principle is that if preserving a non-qualifying smaller magnitude coefficient normally to be discarded by the LMCS (or the LMIS) procedure requires fewer bits to encode both itself and the following larger magnitude coefficient which was originally to be retained, then one can shoot two birds with one stone by preserving this non-qualifying coefficient. That is to say, not only a bit savings is achieved but also the quality, i.e. the PSNR measure, improves due to the inclusion of one more genuine coefficient.

Figure 33:
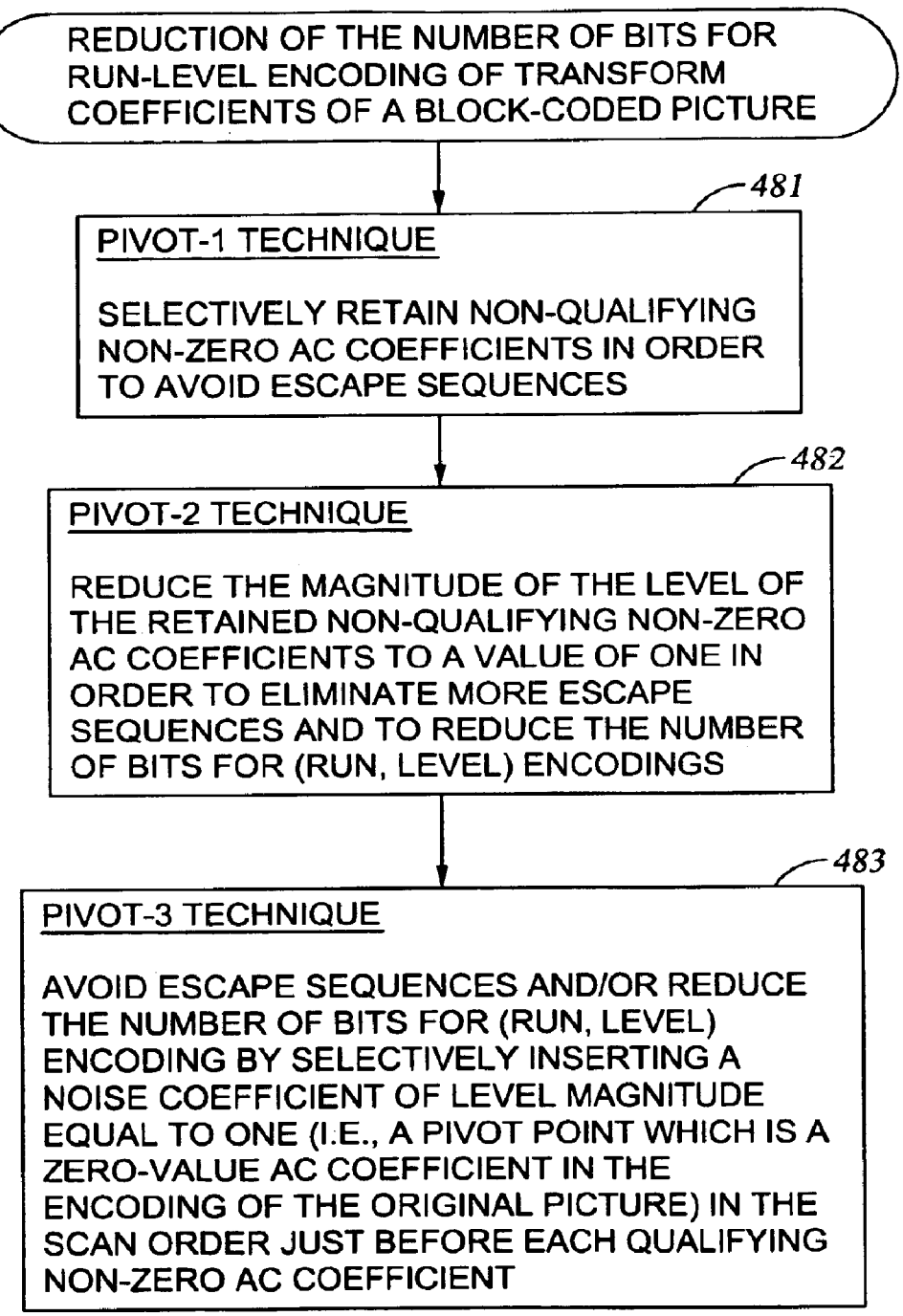
FIG. 33 shows a flowchart showing the successive application of a Pivot-1 technique, a Pivot-2 technique, and a Pivot 3 technique for selection or insertion of pivot indices in order to avoid escape sequences or reduce the number of bits for (run, level) encoding.

The following example illustrates the basic underlying principle. Assume that in a sample quantized 8×8 coefficient block, a partial listing of the indices ordered s according to the employed zigzag scan order is given as ( . . . , 9, 0, 3, 6, . . . ). Assume further that the LMCS algorithm decides to retain the coefficients associated with the indices 9 and 6 but not 3. Then, the index 3 will be treated as zero resulting in a (run, level) pair of value (2, 6). The symbol (2, 6) is not allocated a particular variable length codeword in the codebook and hence its encoding requires the use of an Escape Sequence of 24 bits. However, if we decide to retain the index 3 as well, then two alternate (run, level) pairs, namely (1, 3) and (0, 6), need to be encoded instead. Since the encoding of the latter two symbols requires 15 bits in total, 9 bits are saved with respect to the first alternative. Also, the inclusion of the index 3 contributes in a positive sense to reduce the power of the reconstruction error. Here, the index 3 is the pivot index. This technique is the first version, called Pivot 1, of a class of pivot techniques summarized in FIG. 33. As shown in the first step 481 of FIG. 33, the Pivot-1 technique selectively retains genuine non-qualifying non-zero AC coefficients in order to avoid escape sequences.

The primary motivation for preserving the index 3 in the above example is to save bits by avoiding the generation of an escape sequence which is the most inefficient way of encoding quantized coefficient data in MPEG-2. The marginal improvement in the PSNR came as a side benefit. An analysis of both of the (run, level) VLC codebooks (Table 0 and Table 1) employed by MPEG-2 reveals the fact that for a fixed value of the run-length, the lengths of the codewords are always defined by a monotonic non-decreasing function of the level. Since the marginal SNR improvement provided by the pivot index is of secondary significance, why not, then, change the value of the pivot index to plus one or minus one depending on the sign of its original value and achieve a further savings in bits? Going back to our previous example, when we apply this idea to s the original two (run, level) pairs, we get the symbols (1, 1) and (0, 6) the encoding of both of which requires 11 bits instead of 15. It should be also noted that, even though to a lesser extent with respect to its preservation in its original value, the inclusion of an index with magnitude one and the correct sign, still contributes positively to the quality (i.e., PSNR) as compared to the case of its total elimination. This version will be called the Pivot-2 technique. As shown in step 482 of FIG. 33, the Pivot-2 technique reduces the level magnitudes of the retained non-qualifying non-zero AC coefficients to a value of one in order to eliminate more escape sequences and to reduce the number of bits for (run, level) encodings.

A third and final version of the pivot techniques, called Pivot-3, involves inserting a pivot of level magnitude 1 for a level zero coefficient in the transformation of the original high-quality 8×8 pixel block into the lower quality version. (See step 483 in FIG. 33.) In effect, the pivot is noise that is inserted into the picture to obtain a more than compensating benefit of reducing the number of bits to encode the picture. Moreover, the objective reduction in PSNR due to inserting the noise-like pivots is masked subjectively by inter-coefficient contrast masking and in many cases is not visible to a casual human observer.

Figure 34:
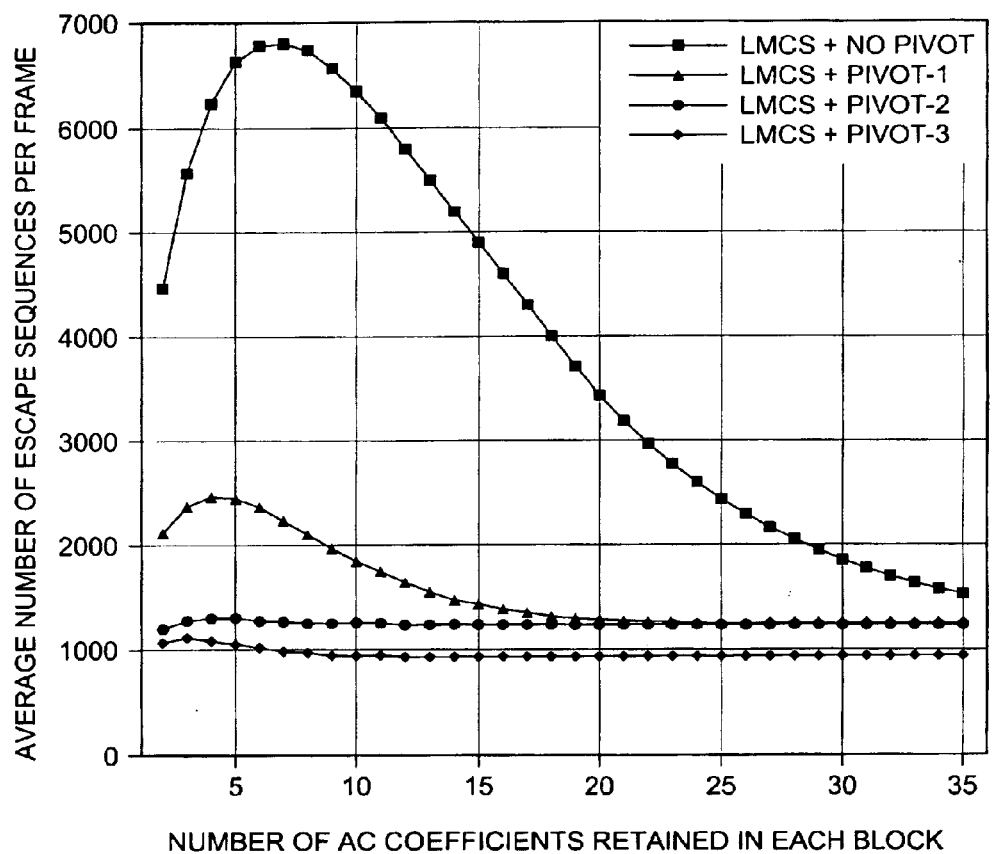
FIG. 34 shows a graph of the average number of escape sequences per frame and a function of the number of AC coefficients retained in each block for a quantization scale value (qsv) of four for largest magnitude coefficient selection (LMCS) for no pivot insertion and for pivot insertion by each of the Pivot-1, Pivot-2, and Pivot-3 techniques.
Figure 35:
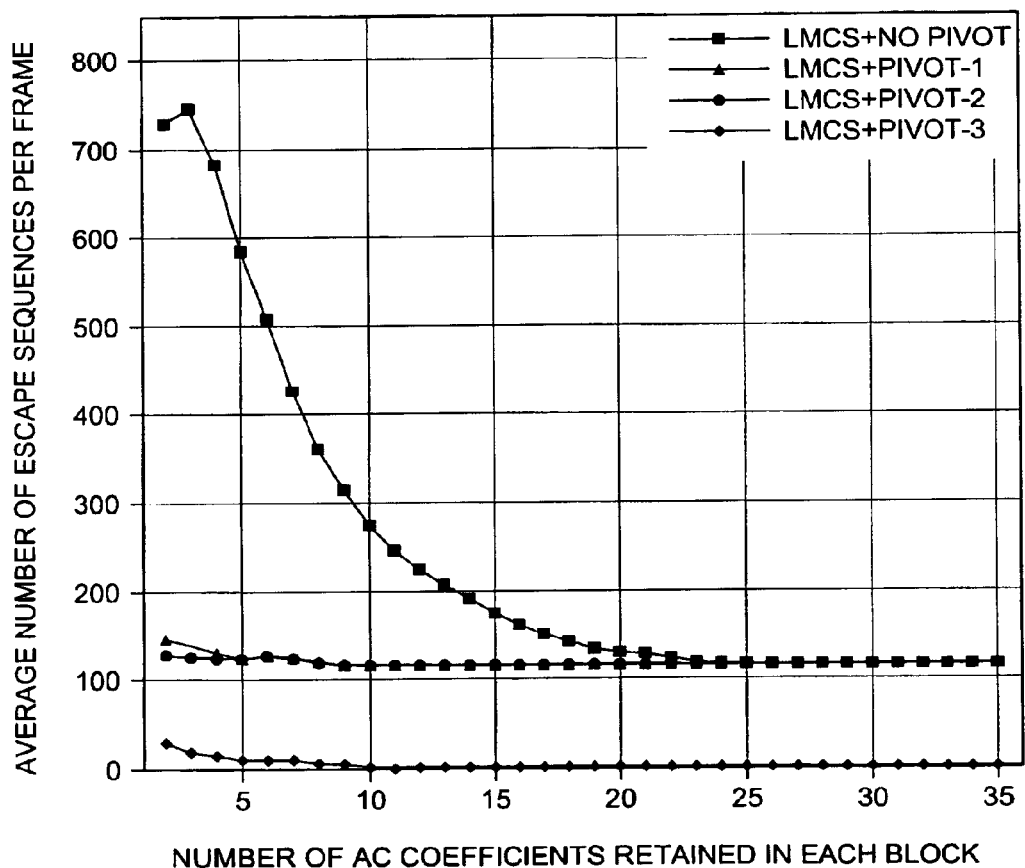
FIG. 35 shows a graph of the average number of escape sequences per frame and a function of the number of AC coefficients retained in each block for a quantization scale value (qsv) of twenty-four for largest magnitude coefficient selection (LMCS) for no pivot insertion and for pivot insertion by each of the Pivot-1, Pivot-2, and Pivot-3 techniques.

Consider first the relation of the escape sequence count with the number of preserved coefficients in each block. FIGS. 34 and 35 show the plots of the average number of escape sequences per frame as a function of the number of LMCS coefficients retained in each block for various quantization levels (qsv) at the input of the LMCS processing, and with or without the various pivoting mechanisms. The data for these plots was produced by averaging over representative frames from the three standard test sequences (namely, Susie, Flower Garden and Football). In these plots and for a fixed input quantization level, the general trend which is actually to a significant extent common to all four (including Pivot-3) illustrated different LMCS and pivoting combinations, is as follows. When the baseline LMCS algorithm is configured to preserve only a few largest magnitude coefficients, the number of escape sequences generated is quite high. This is not only because the preserved indices are (most of the time) the largest magnitude indices of all but also because of the fact that the few number of preserved indices achieve only a very sparse sampling of the 8×8 coefficient grid leading to significantly increased run-lengths. For indices with magnitudes greater than 5, even a run-length as small as 3 will result in an escape sequence. As more indices (associated with largest magnitude coefficients) are preserved, the number of escape sequences continues to increase albeit a decreasing slope (i.e., a decreasing rate of generation) with each unit increase in the number of preserved AC coefficients per block. After a relatively small number of preserved indices (in the range from 5 to 10), the number of escape sequences starts declining with further increase in the number of preserved indices.

There are two mechanisms contributing to the observed relation of the escape sequence count with the number of preserved coefficients in each block. The first is the decrease in the magnitudes of the smallest indices which made it to the list of preserved indices due to increased nonzero coefficient allowance per block. This magnitude decrease, decreases the likelihood of their generating escape sequences. But even more important and influential than this observation is the fact that the inclusion of a steadily increasing number of nonzero indices leads to a denser population of the 8×8 coefficient block, effectively breaking long runs of zeros between two large magnitude coefficients. This will lead to a shortening of the run-length components of the symbols to be encoded and hence a reduction in the number of escape sequences generated as well as an increased tendency towards using (run, level) symbols associated with shorter VLCs.

Even after the improvement achieved by the Pivot-2 procedure, there still remains quite a significant number of escape sequences. The effectiveness of and therefore the bit savings associated with the Pivot-2 procedure are limited since, more often than not, either there are no genuine candidate pivot indices between two qualifying largest magnitude coefficient indices or it is not feasible to use a genuine pivot index since it requires more encoding bits to include it owing to the locations and/or magnitudes of both the pivot and the qualifying largest magnitude coefficient. The nature of the coefficient selection implemented by the LMCS procedure and a very interesting human visual system masking behavior pertinent to DCT basis images open the way to another enhancement in the pivot index insertion framework.

The sensitivity of the human visual system to different DCT basis images is different. Here, the sensitivity is defined as the reciprocal of the smallest magnitude (i.e., the threshold amplitude) of the basis image which enables its detection by human observers. This sensitivity is also dependent on various other factors. Among these are the viewing conditions such as the ambient luminance, and the display parameters such as the display luminance (the mean background intensity) and the visual resolution of the display (specified in terms of the display resolution and the viewing distance). However, more important for bit reduction purposes are the so called image-dependent factors which model the mechanisms generated by the simultaneous presence of more than one basis image.

One very significant image-dependent factor influencing the detectability of DCT basis images is the effect of contrast masking, as described in Andrew B. Watson, Joshua A. Solomon, A. J. Ahumada Jr. and Alan Gale, "DCT Basis Function Visibility: Effects of Viewing Distance and Contrast Masking," in B. E. Rogowitz (Ed.), Human Vision, Visual Processing, and Digital Display IV (pp.99–108). Bellingham, Wash.: SPIE, 1994. This paper includes the following basic model of contrast masking:

$$m_T = t_T \max\left[1, \left|\frac{c_T}{t_T}\right|^{w_T}\right],$$

where:

the subscript T implies association with the spatial frequency T (u,v), u,v=0,1, . . . 7, defined on the basis of the indices of the corresponding DCT coefficient;

$c_T$ is the given DCT coefficient;

$t_T$ is the corresponding absolute threshold;

$w_T$ is an exponent that lies between 0 and 1; and $m_T$ is the masked threshold.

In the above equation, $m_T$ defines the maximum extent of deviation from the coefficient's original value $c_T$ which will not be detected by a typical human observer, when the correspondingly weighted basis image is displayed. It is easy to see from this model that, typically, sensitivity to quantization error in a particular DCT coefficient, decreases with the magnitude of that coefficient due to the increased masked threshold. Note that this first order model of contrast masking describes the sensitivity to a particular coefficient's quantization error as being independent of the magnitudes of all the other coefficients except for the DC coefficient. However, there is evidence to the contrary, which indicates that sensitivity to a particular coefficient's quantization error is affected by the magnitudes of other coefficients (i.e., inter-coefficient contrast masking) as described through the following model:

$$m_T = t_T \max\left[1, \left|f[T, M]\frac{c_M}{t_T}\right|^w\right],$$

$$f[T, M] = \exp[-\pi\|T - M\|^2 / \zeta_T^2],$$

$$\zeta_T = \zeta \max[1, \|T\|].$$

In the above model:

the subscript T implies association with the spatial frequency T=(u,v), u,v=0,1, . . . 7, defined based on the indices of the corresponding DCT coefficient;

the subscript M implies association with the spatial frequency M=(x,y), x,y=0,1, . . . 7, defined based on the indices of the corresponding DCT coefficient;

$c_T$ is the DCT coefficient associated with the given test DCT basis image;

$t_T$ is $c_T$'s corresponding absolute threshold;

$c_M$ is the DCT coefficient associated with the given masking DCT basis image;

w is an exponent that lies between 0 and 1;

f[T, M] is a positive, frequency-dependent scaling factor; and $m_T$ is the masked threshold for $c_T$ due to the presence of $c_M$.

Observe that f[T, M] assumes its maximum value of 1 when T=M. In this case, this latter improved model reduces to the first order model described above. f[T, M] reflects the sensitivity of $c_T$'s detection to the presence of a masking coefficient $C_M$ at the frequency M. The larger f[T, M] is, the stronger is the masking influence. (The precise extent of masking generated by $c_M$ is also dependent on the ratio $c_M/t_T$). The second equation in the description of the improved model defines f[T, M] as a radially symmetric Gaussian function parameterized through a single parameter $\zeta$ defined in the third equation of the same description. It is interesting to note that the bandwidth of f[T, M] increases in proportion to (the $L^2$ norm of the spatial) frequency except for the DC coefficient. This, in particular implies a reduced sensitivity to (equivalently an easier masking of) high-frequency coefficients. The three fundamental parameters of the refined model, namely w, $t_T$ and $\zeta$ are determined through a least squares estimation method on empirical data.

The relation of the contrast masking phenomenon to the first two generations of the pivot index methodology is easy to conclude. The qualified largest magnitude coefficients selected by the LMCS algorithm typically have the potential to generate a strong masking effect in their close vicinity in the frequency domain due to an increased $c_M/t_T$ ratio. Furthermore, the nature of both zigzag scans (i.e., achieving a slowly changing frequency content) lead to the insertion of pivot indices which are (most of the time) very close to their respective qualified LMCS coefficients in the frequency domain. This in return leads to a smaller value for the metric ‖T−M‖ in the exponent of f[T, M], increasing its value too. (In case of alternate zigzag scan, there are a few cases of potentially having a somewhat larger frequency difference between the frequency of the preserved index and the frequency of the pivot index compared to the case of the default zigzag scan. Yet, these increased differences when they are realized, only weaken the extent of inter-coefficient contrast masking but do not eliminate masking altogether.) Given the two effects of large magnitude qualified coefficients generating a strong masking in their frequency domain neighborhoods and the pivot indices almost always being placed very close to the qualified coefficients, by moving from the first version (Pivot-1) to the second version (Pivot-2) of the pivot index methods, we achieve a further savings in the number of encoding bits at the expense of a marginal PSNR reduction which is visually masked.

We will now carry this idea one step further and consider introducing an artificial pivot when genuine ones are missing or inefficient for their purpose. Such an action will be taken only when it is beneficial to do so. For the best savings in the required number of encoding bits and for the least additional distortion, the pivot index should be a plus one or a minus one. There are several interesting observations and conclusions regarding this class of the pivot index technique and one of its possible implementations.

First, a pivot index should be placed in the position immediately preceding the position of the largest magnitude index in the adapted zigzag scanning order. This position is either the only position to get any savings or the position for the largest savings among all alternative positions. Consequently, a (run, level) symbol (n, M) is transformed into the cascade combination of symbols (n−1, 1) and (0, M). There are a few minor exceptions to this rule, and these exceptions can be encoded in a special table or tested for prior to a table lookup, as described below. A corollary to this observation is that the implementation complexity is very low since there is no extensive decision and search processes involved as to where to place the pivot.

Second, the decision as to whether placing a pivot will help or not is as simple as a small table lookup. Given that we have to code the (run, level) symbol (n, M), we immediately know that the symbols (n−1, 1) and (0, M) must be coded instead if a pivot is to be employed. The analysis of savings associated with this type of symbol transformation can be performed once off-line for all possible (n, M) pairs and a decision table to be indexed by n and M, can be generated to make the decision in the form of a Yes (1) or No (0) answer. For both of MPEG-2's VLC tables (Table 0 and Table 1) if the run-length (n) is equal to 0 or greater than 32 or the level (M) is greater than 40 in magnitude, the above proposed pivot technique cannot help. Therefore, the required table size is 32×40 bits=160 Bytes.

Third, the degrading influence of such pivots on the reconstruction quality with respect to the PSNR metric is marginal since they are used in association with the LMCS approach. More importantly, as discussed above, the distortion introduced by the pivots is perceptually masked to a large extent due to inter-coefficient contrast masking. Moreover, as will be described below with reference to FIGS. 41 to 44, if a decoder is aware that the Pivot-3 technique is employed by an encoder (or a transcoder), then the decoder can, with a high accuracy, distinguish genuine indices with value (+/−) 1 from the inserted, noise-like pivot indices, and therefore the decoder can remove most of the inserted, noise-like pivot indices to avoid any significant degradation in PSNR.

Figure 36:
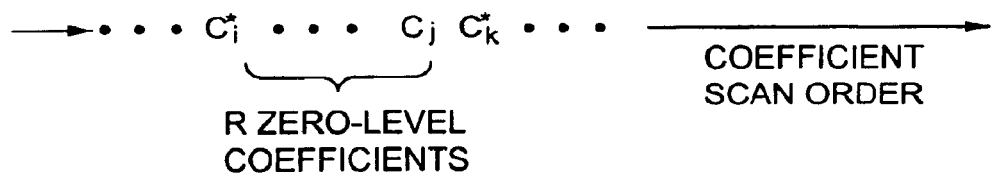
FIG. 36 shows a series of coefficients in a scan order, in order to illustrate the run length for a non-zero AC coefficient, and th e insertion of a pivot index to reduce the run length.

With reference to FIG. 36, there is shown a sequence of DCT coefficients . . . $C_i$ . . . $C_j C_k$ . . . in the coefficient scan order giving rise to a sequence of (run, level) symbols for encoding an 8×8 block of pixels. In particular, the run length for the (run, level) symbol to be used for encoding the coefficient $C_k$ is determined by the number R of consecutive AC coefficients having a zero level and immediately preceding the coefficient $C_k$ in the scan order. In this example, the coefficients $C_i$ and $C_k$ are superscripted with asterisks to indicate that they have non-zero levels. The Pivot-3 technique decides whether or not the (run, level) coding for each non-zero AC coefficient, such as the coefficient $C_k$, should be modified by changing the level of an immediately preceding coefficient $C_j$, in the scan order, from level 0 to a level of magnitude 1 (i.e., from 0 to a level of +1 or −1).

Figure 37:
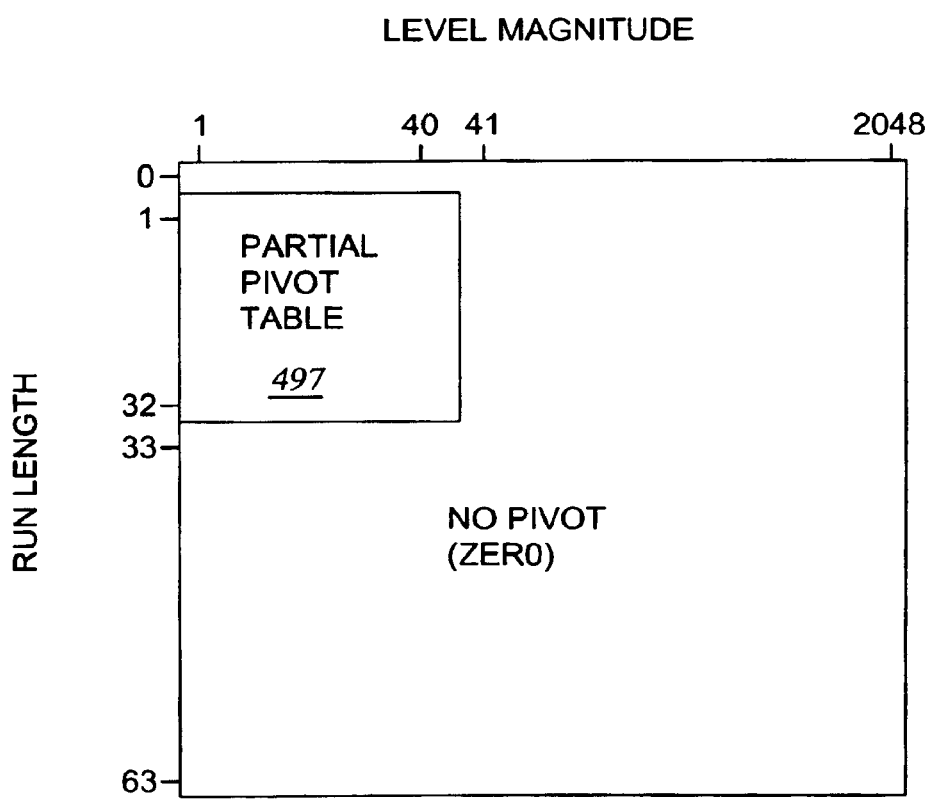
FIG. 37 shows a pivot table indicating whether or not a pivot should be inserted for a given run length and level magnitude.

In order to decide whether or not the (run, level) coding for each non-zero AC coefficient should be modified by changing the level of an immediately preceding coefficient in the scan order, a lookup operation can be performed on a two-dimensional pivot table having a respective entry for each possible run length and level magnitude. As shown in FIG. 37, for example, the pivot table may include 64 rows for each possible encoded run length from 0 to 63, and 2048 columns for each possible encoded level magnitude from 1 to 2048. Inspection of such a pivot table, however, shows that no pivot should (or can) be inserted for a run length of zero, a run length greater than 32, or a level magnitude greater than 40. Therefore, considerable table memory may be saved by only storing a partial pivot table (497) having 32 rows and 40 columns.

Figure 38:
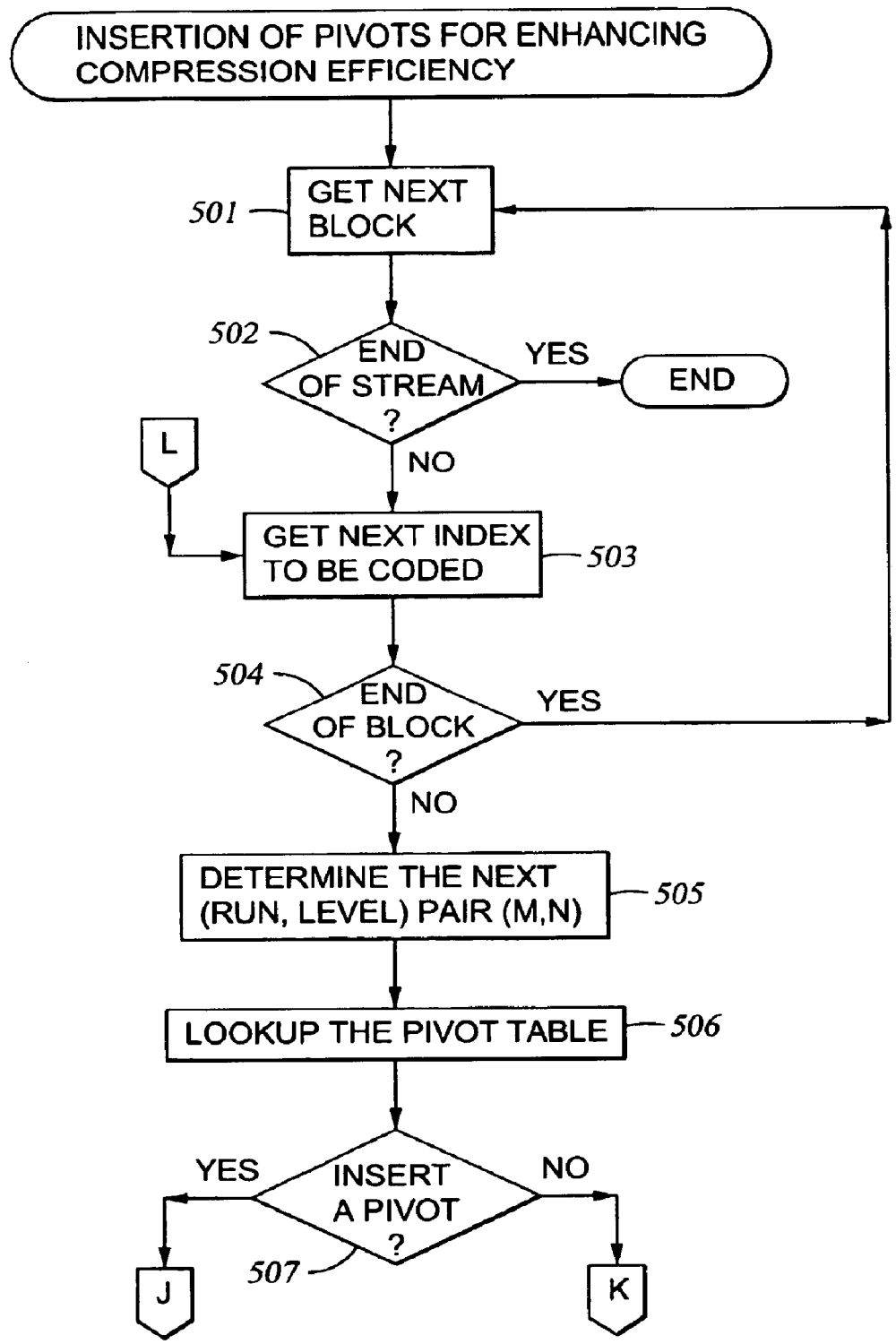
FIG. 38 shows a first sheet of a flowchart of a specific implementation of pivot insertion for avoiding escape sequences.

With reference to FIG. 38, there is shown a first sheet of a flowchart for the Pivot-3 procedure. In a first step 501, scanning of a stream of indices begins in a next block. If the end of the stream is reached, as tested in step 502, then the procedure is finished. Otherwise, execution continues to step 503, to get the next index to be coded. If the end of the block is reached, as tested in step 504, then execution loops back to step 501. Otherwise, execution continues to step 505 to determine the next (run, level) pair (M, N). In step 506, the run and level values are used to lookup a pivot table. If the pivot table indicates that a pivot should be inserted, then execution continues from step 507 to step 508 in FIG. 39. Otherwise, execution branches from step 507 to step 513 in FIG. 39.

Figure 39:
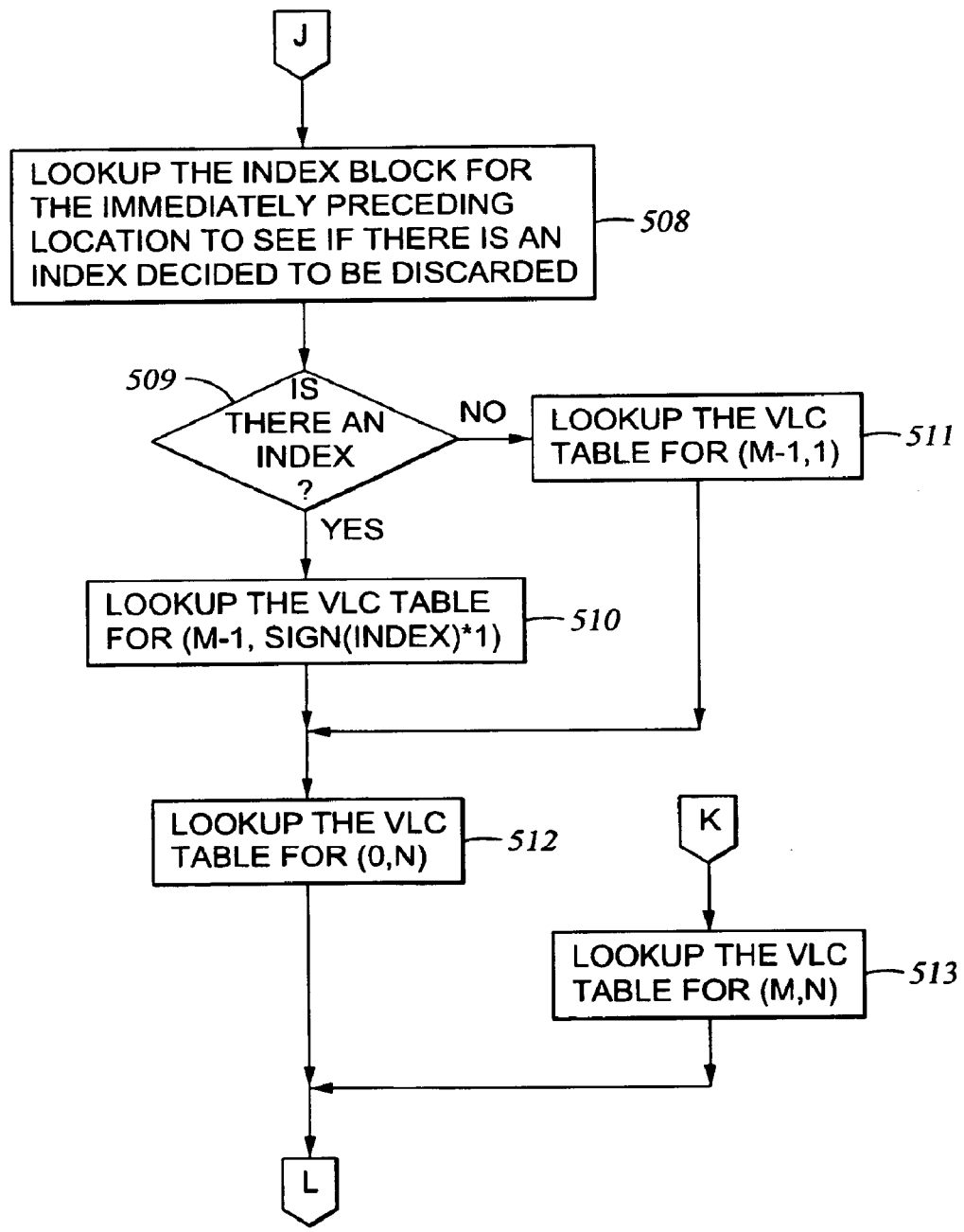
FIG. 39 is a second sheet of the flowchart begun in FIG. 38.

In step 508 of FIG. 39, a lookup is performed on the original index block for the immediately preceding location in the scan order to see if there was a genuine index to be discarded; in other words, an index for a non-zero, non-qualifying AC coefficient in the original-quality picture. If there is such an index, as tested in step 509, then execution continues to step 510 to lookup the VLC table for a run length of M−1 and a level equal to one in magnitude with a sign the same as the sign of the found index, in order to insert a pivot index having the corresponding VLC code. Then, in step 512, the VLC table is looked up for a run length of zero and a level of N, to re-code the variable-length code for the index obtained in step 503. In other words, instead of coding the variable-length code for the (run, level) of (M, N), a savings in bits is achieved by coding the variable-length code for (M−1, SIGN(INDEX)*1) followed by the variable-length code for (0, N). From step 512, execution loops back to step 503 in FIG. 38. If there is no genuine non-zero, non-qualified index as tested in step 509, then execution continues to step 511 to lookup the VLC table for a run length of (M−1) and a level equal to one in magnitude with always a positive sign, in order to insert a pivot index having the corresponding VLC code. After step 511, the execution continues to step 512. In other words, instead of coding the variable-length code for the (run, level) of (M, N), a savings in bits is achieved by coding the variable-length code for (M−1, 1) followed by the variable-length code for (0, N). It should be noted that for the artificial pivot index inserted in step 511 we arbitrarily but uniformly chose a positive sign, which to some extent supports the discrimination of artificial pivot indices from similar-looking genuine indices at the decoder. If a pivot is not to be inserted, then in step 513 of FIG. 39, the VLC table is looked-up for a run length of M and a level of N, in order to code the variable-length code for (M, N). Execution loops from step 513 back to step 503 in FIG. 38.

Figure 40:
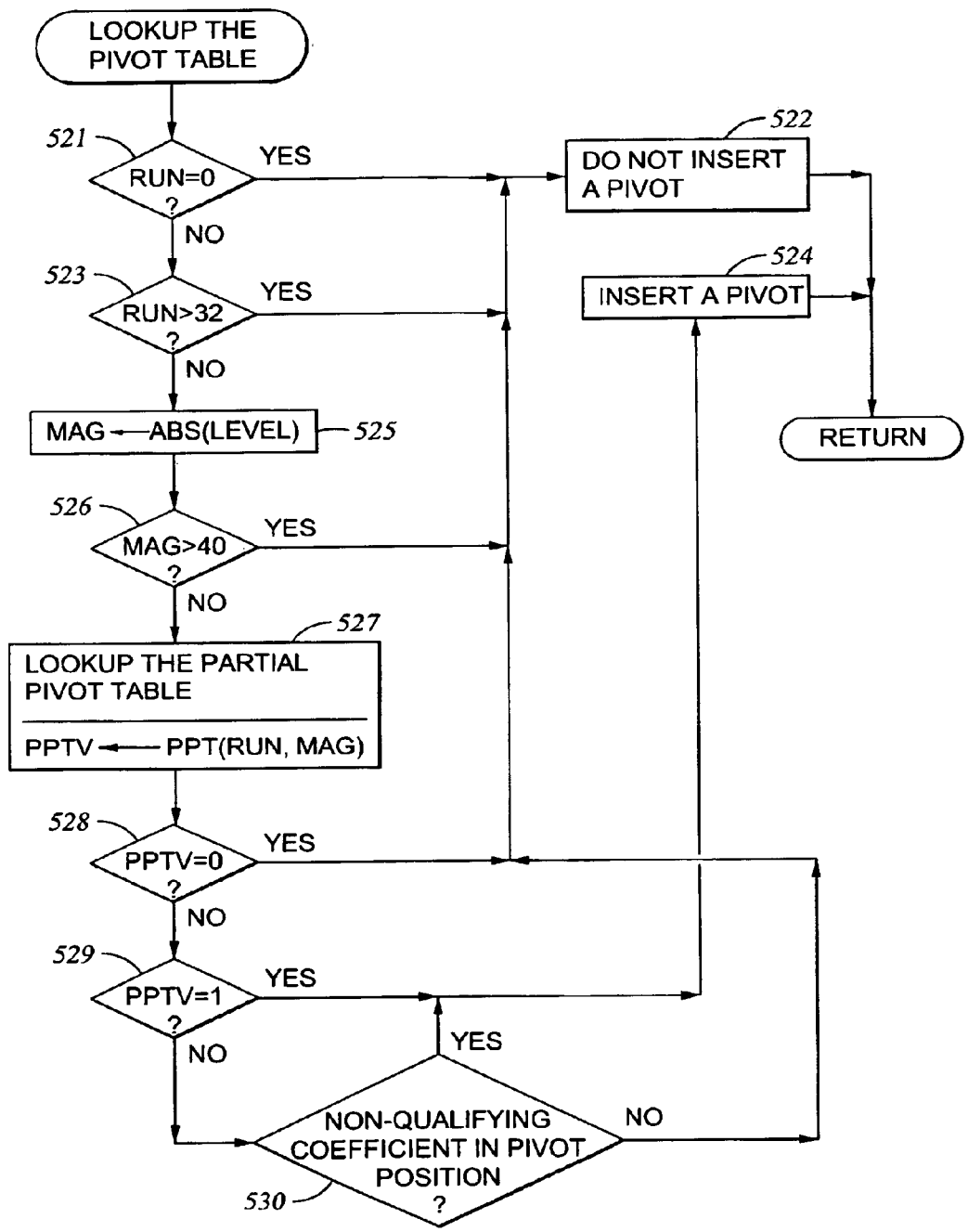
FIG. 40 is a flowchart of a procedure for a lookup in the pivot table of FIG. 37.

With reference to FIG. 40, there is shown a flowchart of a subroutine that simulates a lookup in the pivot table of FIG. 37 by performing some comparisons and, if necessary, performing a lookup of the partial pivot table (497 in FIG. 37). In a first step 521 in FIG. 40, if the run length is zero, then execution branches to step 522, to return an indication that a pivot is not to be inserted. If the run length is not zero, then execution continues from step 521 to step 523. In step 523, if the run length is greater than 32, execution branches to step 522, to return an indication that a pivot is not to be inserted. If the run length is not greater than 32, then execution continues from 523 to step 525. In step 525, the level magnitude is computed as the absolute value of the level. In step 526, if the magnitude is greater than 40, then execution branches to step 522 to return an indication than a pivot is not to be inserted. In step 526, if the magnitude is not greater than 40, execution continues to step 527. In step 527, a lookup is performed upon the partial pivot table.

Following is a listing of the partial pivot table, for VLC coding according to the MPEG-2 VLC coding Table One:
% Partial pivot table description.
% value 0=>Pivot is not to be used. Code as it is.
% value −1=> Use a pivot only if there is already a non-zero coefficient in the pivot position.
% value of 1=> Use a pivot.
% "zeros(n)" denotes a row vector of "n" zeros; "ones(n)" denotes a row vector of "n" ones.
   zeros(2) −1 −1 −1 ones(10) zeros(3) ones(22):
   zeros(1) −1 −1 ones(37);
   zeros(2) ones(38);
   zeros(2) ones(38);
   zeros(2) ones(38);
   zeros(2) ones(38);
   0 1 ones(29) zeros(9);
   0 1 ones(29) zeros(9);
   0 1 ones(29) zeros(9);
   0 1 ones(29) zeros(9);
   0 1 ones(29) zeros(9);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(13) zeros(25);
   0 1 ones(3) zeros(35);
   0 1 ones(3) zeros(35);
   0 1 ones(3) zeros(35);
   0 1 ones(3) zeros(35);
   0 1 ones(3) zeros(35);

The partial pivot table listed above has a few entries of value −1. For each of these entries, the insertion of a pivot results in exactly the same number of bits that would be needed if a pivot were not inserted. Therefore, in these cases a pivot should be inserted only if there is a genuine nonzero index (i.e., an index having a non-zero level in the original picture) at the pivot location. Pivot inclusion at the location of such an already existing nonzero index will help to improve the signal quality without using any more bits for (run, level) encoding. However, when such a pivot insertion is made, in accordance with the general pivot insertion rules, even if the level magnitude in the original picture is greater than one, the level magnitude of the inserted pivot should be set to one, and the sign of the level of the inserted pivot should be the same as the sign of the level in the original picture.

Storage of the −1 values in the memory allocated to the table would unduly increase the amount of memory needed for the table. Instead, these few entries can be coded in the table look-up process as follows:

| % lookup of the partial pivot table | |
|---|---|
| START | IF (RUN = 1) THEN GOTO 100 |
|  | IF (RUN = 2) THEN GOTO 200 |
| 50 | PPTV <= PPT(RUN, MAG) |
|  | RETURN |
| % table lookup returns a value of PPTV = 0 or 1 | |
| 100 | IF (MAG<3) THEN GOTO 50 |
|  | IF (MAG>5) THEN GOTO 50 |
| 150 | PPTV <= −1 |
|  | RETURN |
| % returns a value of PPTV = −1 | |
| 200 | IF (MAG<2) THEN GOTO 50 |
|  | IF (MAG>3) THEN GOTO 50 |
|  | GOTO 150 |

Returning now to FIG. 40, in step 528, if the partial pivot table value (PPTV), for the row=RUN and column=MAG, has a value of zero, then execution branches to step 522 to return an indication that no pivot should be inserted. Otherwise, execution continues from step 528 to step 529. In step 529, if the partial pivot table value (PPTV) is equal to 1, then execution branches to step 524 to return an indication that a pivot should be inserted. Otherwise, for the case of PPTV=−1, execution continues to step 530. In step 530, execution branches depending on whether or not there is a non-qualifying coefficient (i.e., an AC coefficient having a non-zero level in the original picture) in the pivot position. If so, then execution branches to step 524 to return an indication that a pivot should be inserted. If not, then execution branches to step 522 to return an indication that a pivot should not be inserted.

Figure 41:
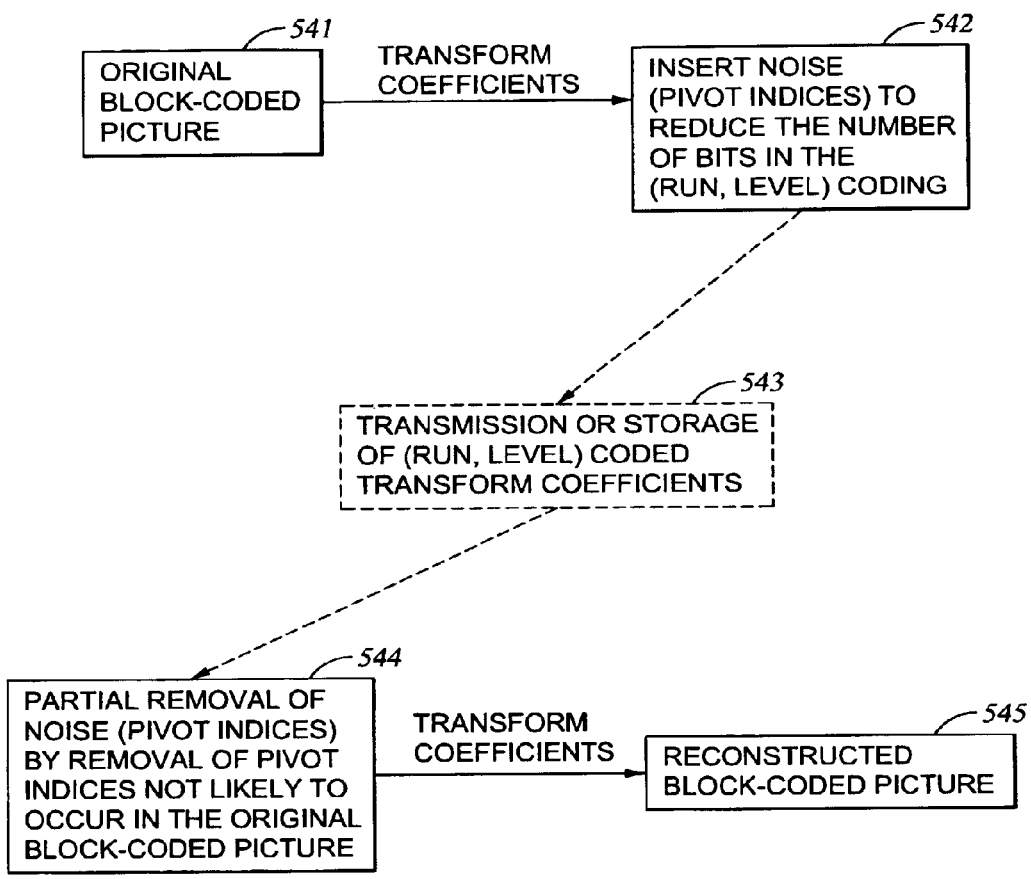
FIG. 41 is a flow diagram showing an encoding and decoding sequence including the insertion of noise in the form of pivot indices during encoding to reduce the number of bits in (run, level) encoding, and partial removal of the noise during decoding.

FIG. 41 shows the Pivot-3 method of inserting pivot indices during the encoding or transcoding process and partial removal of the pivot indices during the decoding process. Transform coefficients are obtained from an original block-coded picture 541. The encoding or transcoding process includes the Pivot-3 method 542 of inserting noise, in the form of pivot indices, to reduce the number of bits for (run, level) coding of the transform coefficients. The reduction in the number of bits facilitates the transmission or storage 543 of the (run, level) coded transform coefficients. The decoding process 544 includes the partial removal of the noise (i.e., the pivot indices) by removal of possible pivot indices not likely to occur in the original block-coded picture. The resulting transform coefficients are then used in a decoding process 545 of producing a reconstructed block-coded picture.

Figure 42:
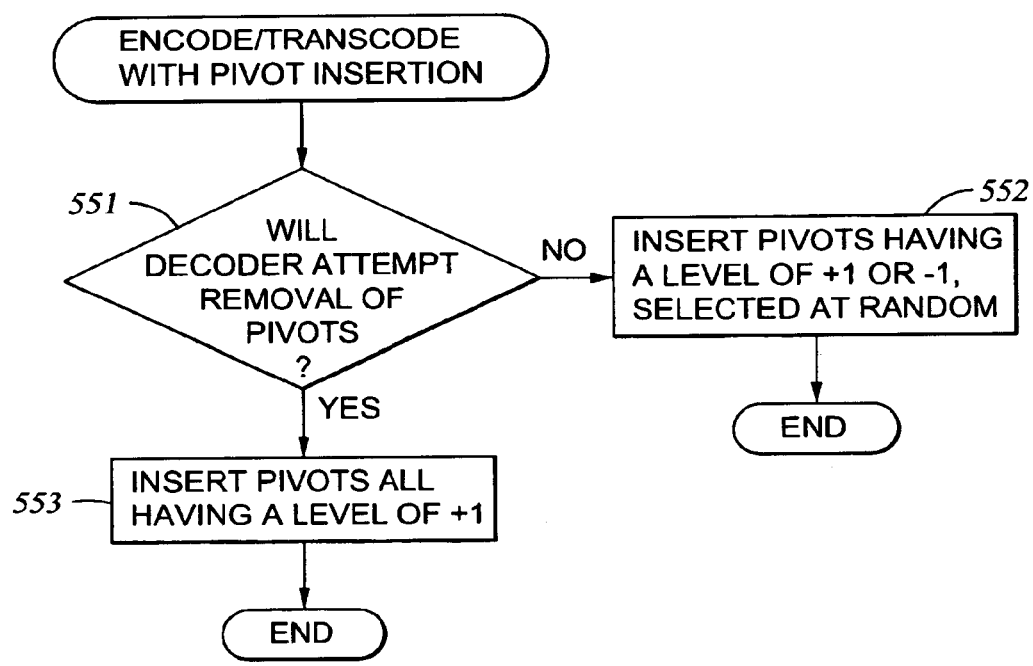
FIG. 42 is a flowchart showing how the process of pivot insertion during encoding or transcoding may be different depending on whether or not the decoder will attempt removal of the pivots.

In order to facilitate the removal of possible pivot indices not likely to occur in an original block-coded picture, the Pivot-3 encoding method can be adjusted depending on whether or not the decoder will attempt removal of pivots. For example, as shown in FIG. 42, if the decoder will not attempt removal of pivots, as tested in step 551, then the process of encoding or transcoding will insert artificial pivots having a level of +1 or −1 selected in a substantially random fashion, as shown in step 552. (For example, step 511 of FIG. 39 would be modified to lookup the VLC table for either (M–1, 1) or (M–1, –1) selected by a pseudo-random number generator function.) However, if the decoder will attempt removal of pivots, then the level (more precisely the sign) of the artificial pivot indices should be selected in a convenient way such that the decoder will know whether or not a +1 or –1 is selected for the level of any pivot index inserted into the (run, level) coding. The most convenient way to perform such a selection of the pivot index level is to insert pivot indices all having the same level of either +1 or –1, such as a level of +1 as shown in step 553. (This is also what is shown in step 511 of FIG. 39.) Therefore, during the decoding process, all indices with value –1 (on average forming 50% of the genuine indices with magnitude 1) are certainly known to be genuine indices that should not be removed.

For distinguishing the genuine indices from the pivots within the set of indices with value +1, one can apply several rules. A (+1) level index immediately followed by a (+/–) 1 level index or an end-of-block (EOB) symbol in the scan order is a genuine index. A (+1) level index which is not immediately followed by another nonzero index in the scan order is a genuine index. If a (+1) level index and the nonzero index immediately following it together form an (n, +1) and (0, M) symbol pair, (i.e., a potential pivot location encountered), still many cases exist in which depending on the values of the tuple (n, M), we can identify with certainty whether that (+1) level index is a genuine index or a pivot. For example, if M=32 and n>6, we know with certainty that the (+1) level index is not a pivot index. That is, (7, 32), (8, 32), . . . (31, 32) are the set of tuples for which the (+1) level index is a genuine index. It is because for these tuples the total number of bits to code both (n, +1) and (0, 32) is not less than 24 bits required to code (n+1, M).

Figure 43:
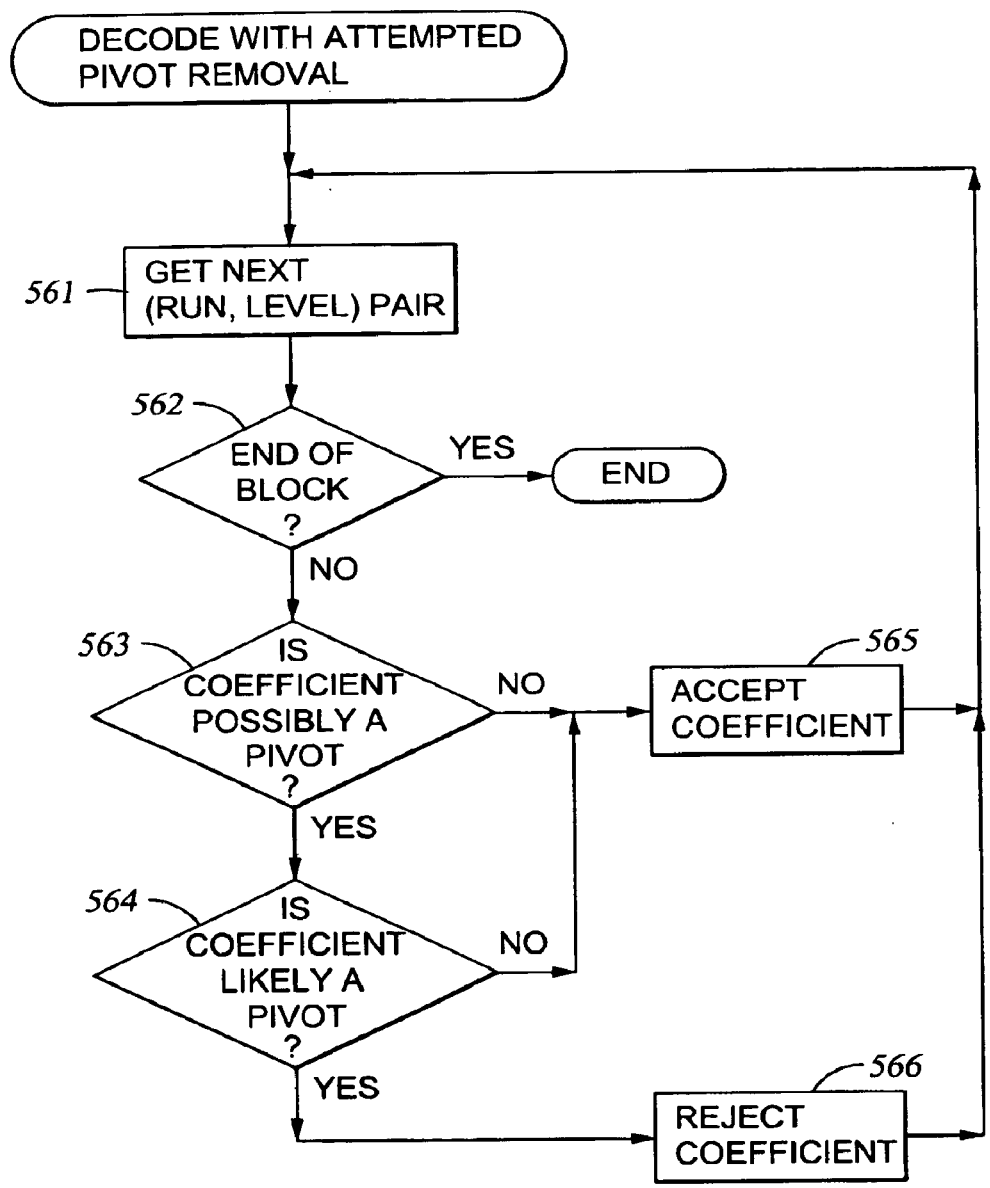
FIG. 43 is a flowchart showing the removal of pivots during decoding.

FIG. 43 shows in greater detail the procedure of attempted pivot removal during decoding. In a first step 561, the decoder gets the next (run, level) pair. In step 562, if the end of the current encoded block is reached, then the procedure is finished. Otherwise, execution continues to step 563. In step 563, if the coefficient encoded by the (run, level) pair is not possibly a pivot, then execution branches to step 565 to accept the coefficient. Otherwise, if the coefficient is possibly a pivot inserted by the Pivot-3 technique, then execution continues to step 564. In step 564, if the coefficient is not likely to be a pivot inserted by the Pivot-3 technique, then execution branches to step 565 to accept the coefficient. Otherwise, if the coefficient is likely to be a pivot inserted by the Pivot-3 technique, then execution continues to step 566 to reject the coefficient. After step 565 or 566, execution loops back to step 561 to process the next (run, level) pair.

Figure 44:
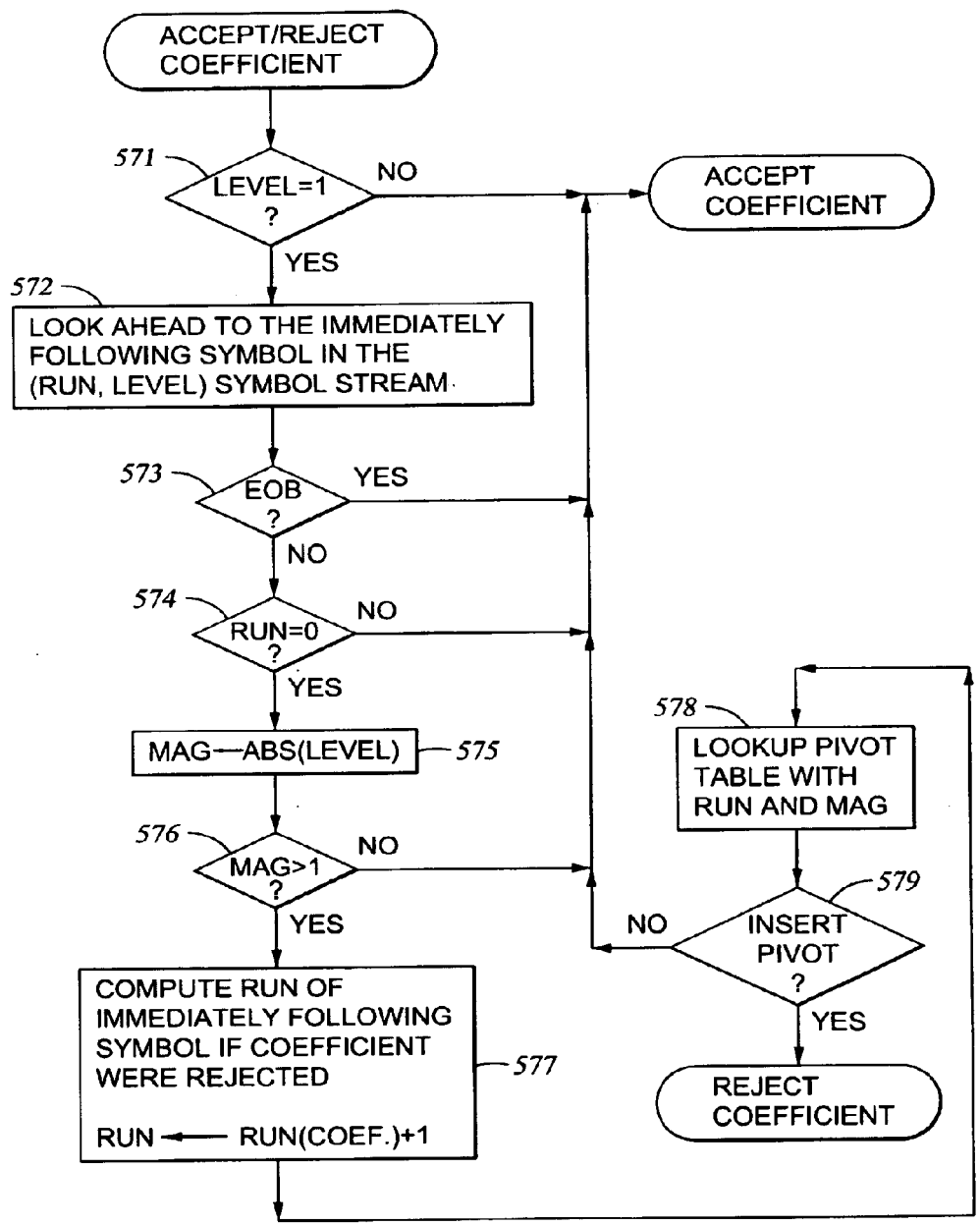
FIG. 44 is a flowchart showing how the decoder determines whether or not a coefficient is possibly a pivot and whether or not a coefficient that is possibly a pivot is likely to be a pivot.

FIG. 44 shows further details of the process of determining whether or not an index is possibly a pivot (corresponding to step 563 in FIG. 43) and whether or not an index is likely to be a pivot (corresponding to step 564 in step FIG. 43). In a first step 571 of FIG. 44, if the level is not equal to 1, execution branches to accept the coefficient. Otherwise, execution continues to step 572. In step 572, the decoding process looks ahead to the immediately following symbol in the (run, level) symbol stream. If this immediately following symbol is an end-of-block (EOB) symbol as tested in step 573, then execution branches to accept the coefficient. Otherwise, execution continues to step 574. In step 574, if the run length of the immediately following symbol is not zero, then execution branches to accept the coefficient. Otherwise, execution continues to step 575. In step 575, the magnitude of the level of the immediately following symbol is computed. Then in step 576, if the magnitude of the immediately following symbol is not greater than one, execution branches to accept the coefficient. Otherwise, execution continues from step 576 to step 577. In step 577, the decoder computes the run length that the immediately following symbol would have had if the coefficient (i.e., the possible pivot) were rejected. This is done by incrementing the run length by one. Then in step 578, the decoder looks up the pivot table with the run length (from step 577) and the magnitude (from step 575) in order to determine what the encoder would have done if the coefficient had a zero level in the original picture. In step 579, if the encoder would not have inserted the coefficient as a pivot, then execution branches to accept the coefficient. Otherwise, if the encoder would have inserted the coefficient as a pivot, then the coefficient is rejected as it is likely to have been inserted by the encoder.

It should be noted that steps 577, 578 and 579 could be omitted, in order to reject the coefficient if step 576 finds that the magnitude of the immediately following symbol has a level magnitude greater than one. Since the possible adverse effects of the pivots on the perceived picture quality is so small, it may not be worthwhile to perform steps 577 to 579. However, if the table memory is allocated anyway for encoding purposes, for example in a transceiver application or a picture storage and retrieval application, then the cost of performing steps 577, 578, and 579 would be minimal.

It should also be noted that the pivot table used in step 578 could be slightly different from the pivot table used for encoding, in order that the pivot table for decoding and rejecting possible pivots could take into account the probability that, when step 578 is reached, a (RUN, MAG) pair would occur in the original picture, and the pivot table in step 578 would indicate the insertion of a pivot point, yet a pivot would not have been inserted by the encoder or transcoder because the original picture would include an immediately preceding coefficient of level=1. Such slight differences in the tables could occur for (RUN, MAG) pairs having both a short run length and a small magnitude, and they could be found by encoding a series of test pictures and computing a histogram indicating, for each possible (RUN, MAG) pair, the percentage of the time that the procedure of FIG. 44 rejects a coefficient found in the original picture (run, level) coding when steps 577 to 579 are reached. If this percentage is greater than 50%, then the pivot table entry for the (RUN, MAG) pair should be changed so that this percentage would become less than 50%.

Figure 45:
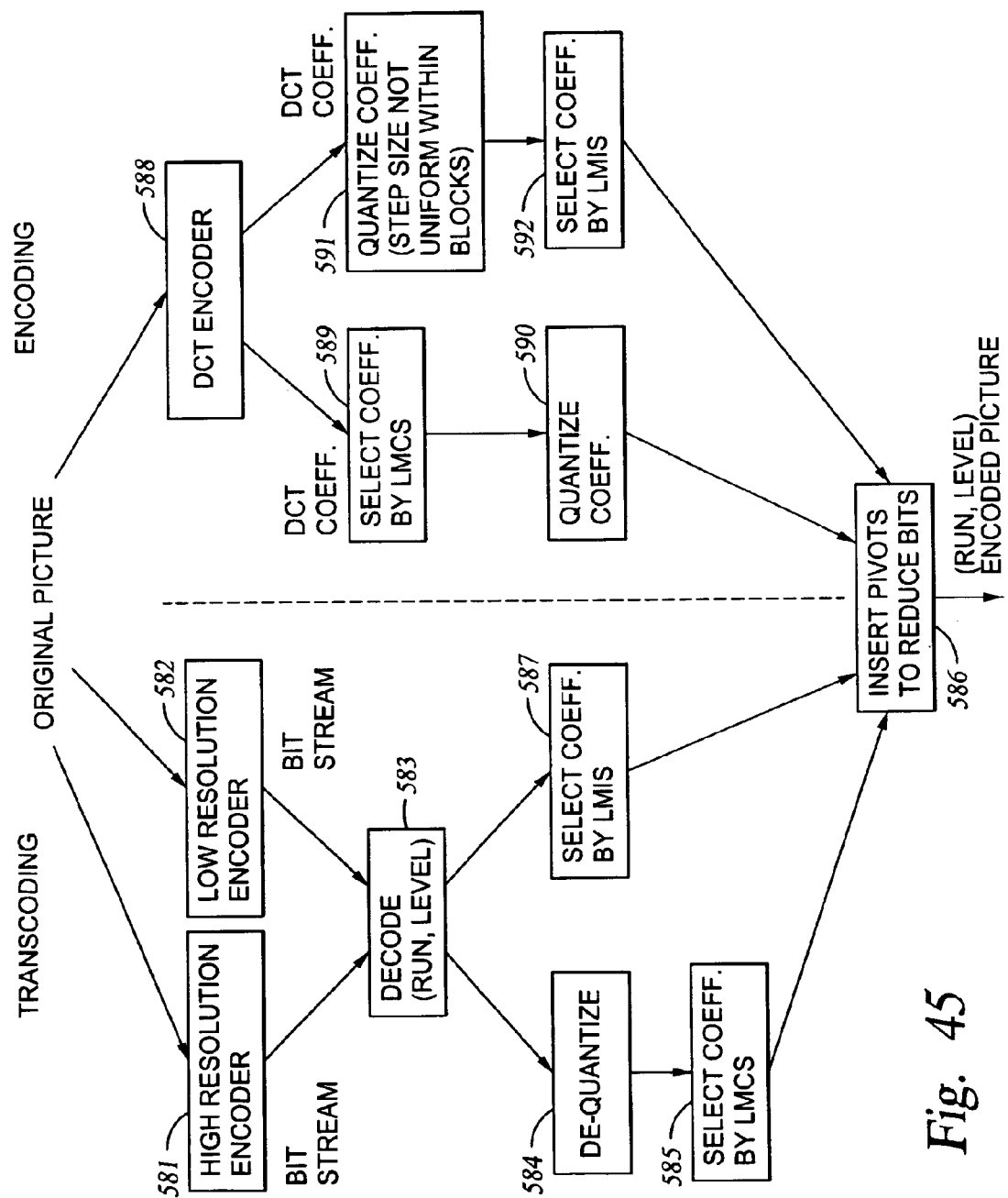
FIG. 45 is a flow diagram showing the use of pivot insertion with transcoding or encoding with the process of largest magnitude indices selection (LMIS) or largest magnitude coefficient selection (LMCS).

Although the pivot insertion procedures provide the most significant improvements when used in conjunction with the LMCS scaling procedure, the pivot insertion procedures may also provide substantial reductions in the bits required for encoding when used together with the LMIS scaling procedure or other scaling or encoding procedures. FIG. 45, for example, shows a flow diagram for using both the LCMS procedure and the LMIS procedure in combination with the pivot insertion techniques for both transcoding and encoding. For transcoding, a (run, level) encoded bit stream for a picture is produced by a high resolution encoder 581 or a low resolution encoder 582. A decoder 583 decodes the (run, level) encoded bit stream.

For using the LMCS procedure, a de-quantizer 584 de-quantizes the levels to produce corresponding coefficient values. Coefficient selection 585 is performed according to the LMCS procedure, and pivot insertion 586 to reduce the number of bits for encoding is performed on the selected coefficients, to produce a (run, level) encoded picture.

Coefficient selection 587 by the LMIS procedure is performed on the decoded (run, level) information, and the pivot insertion 586 is performed on the selected coefficients to produce a (run, level) encoded picture.

When using the LMCS or LMIS procedures with pivot insertion during encoding, a DCT encoder 588 produces DCT coefficient values for 8×8 pixel blocks in the picture. Coefficient selection 589 by LMCS is followed by coefficient quantization to produce corresponding level values, which are used during the pivot insertion 586 to produce the (run, level) encoded picture. For the LMIS procedure, the DCT coefficient values from the DCT encoder 588 are processed by a quantizer 591 to produce a series of corresponding level values, and coefficient selection 592 by LMIS produces a subset of these level values for the pivot insertion 586 to produce the (run, level) encoded picture. The 8×8 bank of quantizers 591 may have quantization step sizes that are not uniform within the 8×8 block of DCT coefficients, for example, so that the higher frequency coefficients in each block are quantized with a larger step size than the lower frequency coefficients in the block.

Although the LMCS, LMIS, and pivot insertion methods have been described with respect to reducing the number of bits for encoding pictures which are MPEG-2 video frames, it should be understood that the methods have general applicability to reducing the number of bits for (run, level) encoding regardless of the information represented by coefficients that are encoded. For example, the methods are directly applicable to scaling and encoding of individual pictures encoded by JPEG, which also run-length encodes DCT coefficients for 8×8 pixel blocks. The methods are also applicable to the use of other transform encoding techniques such as Fourier transform or wavelet transform techniques, and the encoding and compression of one-dimensional signals, such as audio signals.

What is claimed is:

1. A method of processing information represented by an original series of (run, level) pairs, said method comprising:
   a) inspecting the (run, level) pairs in the original series of (run, level) pairs to determine whether or not modification of at least one (run, level) pair in the original series of (run, level) pairs would produce a desirable decrease in a number of bits required for variable-length encoding of said information despite introduction of noise into the variable-length encoding of said information; and
   b) upon determining that modification of said at least one (run, level) pair in the original series of (run, level) pairs would produce a desirable decrease in the number of bits required for variable-length encoding of said information despite introduction of noise into the variable-length encoding of said information, modifying said at least one (run, level) pair to produce a modified series of (run, level) pairs from the original series of (run, level) pairs; and
   c) variable-length encoding the modified series of (run, level) pairs.

2. The method as claimed in claim 1, which is performed by sequentially inspecting each (run, level) pair to determine whether or not modification of said each (run, level) pair would produce a desirable decrease in the number of bits required for variable-length encoding of said information despite introduction of noise into the variable-length encoding of said information; and if modification of said each (run, level) pair would produce a desirable decrease in the number of bits required for variable-length encoding of said information despite introduction of noise into the variable-length encoding of said information, then modifying said each (run, level) pair; and then variable-length encoding said each (run, level) pair.

3. The method as claimed in claim 1, wherein the inspecting the (run, level) pairs in the original series of (run, level) pairs includes lookup of a table specifying whether or not certain (run, level) pairs should be modified.

4. The method as claimed in claim 1, wherein the inspecting the (run, level) pairs in the original series of (run, level) pairs includes testing for certain ranges of run lengths and level values to determine whether or not certain (run, level) pairs should be modified.

5. The method as claimed in claim 1, wherein said at least one (run, level) pair has a run length of M that is greater than zero and a level value of N, and the production of the modified series of (run, level) pairs from the original series of (run, level) pairs includes substituting, for said at least one (run, level) pair, a first (run, level) pair immediately followed by a second (run, level) pair, the first (run, level) pair having a run length of M−1 and a level having a minimum non-zero magnitude, the second (run, level) pair having a run length of zero and a level value of N.

6. The method as claimed in claim 5, which includes decoding the variable-length encoding of the modified series of (run, level) pairs to produce a decoded series of (run, level) pairs, and inspecting the (run, level) pairs in the decoded series of (run, level) pairs to find the first (run, level) pair having a minimum non-zero magnitude immediately followed by the second (run, level) pair having a run length of zero, and determining that the first (run, level) pair is likely to be noise introduced during the production of the modified series of (run, level) pairs from the original series of (run, level) pairs and therefore rejecting the first (run, level) pair.

7. The method as claimed in claim 6, which includes a table lookup for determining that the first (run, level) pair is likely to be noise introduced during the production of the modified series of (run, level) pairs from the original series of (run, level) pairs.

8. The method as claimed in claim 1, which includes decoding the variable-length encoding of the modified series of (run, level) pairs to produce a decoded series of (run, level) pairs, and inspecting the (run, level) pairs in the decoded series of (run, level) pairs to find (run, level) pairs likely to be noise introduced during the production of the modified series of (run, level) pairs from the original series of (run, level) pairs and therefore rejecting the (run, level) pairs likely to be noise introduced during the production of the modified series of (run, level) pairs from the original series of (run, level) pairs.

9. A method of variable-length encoding a block of pixels, the method comprising:
   a) computing a two-dimensional discrete cosine transform (DCT) of the block of pixels to produce a series of DCT coefficient values;
   b) quantizing the DCT coefficient values to produce quantized coefficient values;
   c) producing an original series of (run, level) pairs each having a level value indicating a respective non-zero quantized coefficient value;
   d) inspecting the (run, level) pairs in the original series of (run, level) pairs to determine whether or not modification of at least one (run, level) pair in the original series of (run, level) pairs would produce a desirable decrease in a number of bits required for variable-length encoding of said block of pixels despite introduction of noise into the variable-length encoding of said block of pixels; and
   e) upon determining that modification of said at least one (run, level) pair in the original series of (run, level)

pairs would produce a desirable decrease in the number of bits required for variable-length encoding of said block of pixels despite introduction of noise into the variable-length encoding of said block of pixels, modifying said at least one (run, level) pair to produce a modified series of (run, level) pairs from the original series of (run, level) pairs; and f) variable-length encoding the modified series of (run, level) pairs.

10. The method as claimed in claim 9, which is performed by sequentially inspecting each (run, level) pair to determine whether or not modification of said each (run, level) pair would produce a desirable decrease in the number of bits required for variable-length encoding of said block of pixels despite introduction of noise into the variable-length encoding of said block of pixels; and if modification of said each (run, level) pair would produce a desirable decrease in the number of bits required for variable-length encoding of said block of pixels despite introduction of noise into the variable-length encoding of said block of pixels, then modifying said each (run, level) pair; and then variable-length encoding said each (run, level) pair.

11. The method as claimed in claim 9, wherein the inspecting of the (run, level) pairs in the original series of (run, level) pairs includes lookup of a table specifying whether or not certain (run, level) pairs should be modified.

12. The method as claimed in claim 9, wherein the inspecting of the (run, level) pairs in the original series of (run, level) pairs includes testing for certain ranges of run lengths and level values to determine whether or not certain (run, level) pairs should be modified.

13. The method as claimed in claim 9, wherein said at least one (run, level) pair has a run length of M that is greater than zero and a level value of N, and the production of the modified series of (run, level) pairs from the original series of (run, level) pairs includes substituting, for said at least one (run, level) pair, a first (run, level) pair immediately followed by a second (run, level) pair, the first (run, level) pair having a run length of M−1 and a level having a minimum non-zero magnitude, and the second (run, level) pair having a run length of zero and a level value of N.

14. The method as claimed in claim 9, wherein the production of the original series of (run, level) pairs from the quantized DCT coefficient values includes identifying some DCT coefficients having non-zero values that are less significant than values of other DCT coefficients, the original series of (run, level) pairs does not include (run, level) pairs encoding level values for said some DCT coefficients, said first (run, level) pair specifies a level value for one of said some DCT coefficients, said one of said some DCT coefficients has a sign, and the level value of said first (run, level) pair is selected to have the same sign as the sign of said one of said some DCT coefficients.

15. The method as claimed in claim 9, wherein the production of the original series of (run, level) pairs from the quantized DCT coefficient values includes identifying some DCT coefficients having non-zero values that are less significant than values of other DCT coefficients, the original series of (run, level) pairs does not include (run, level) pairs encoding level values for said some DCT coefficients, and the method includes modifying at least one (run, level) pair in order to reduce noise without increasing the number of bits for the variable-length encoding by including in the modified series a (run, level) pair encoding a minimum magnitude level for at least one of said some DCT coefficients, said at least one of said some DCT coefficients has a sign, and the (run, level) pair encoding a minimum magnitude level for said at least one of said some DCT coefficients has a sign equal to the sign of the said at least one of said some DCT coefficients.

16. A method of producing MPEG encoded video from an original series of MPEG-compliant (run, level) pairs, said method comprising:

a) inspecting the (run, level) pairs in the original series of (run, level) pairs to determine whether or not modification of at least one (run, level) pair in the original series of (run, level) pairs would produce a desirable decrease in a number of bits in the MPEG encoded video despite introduction of noise into the MPEG encoded video; and b) upon determining that modification of said at least one (run, level) pair in the original series of (run, level) pairs would produce a desirable decrease in the number of bits in the MPEG encoded video despite introduction of noise into the MPEG encoded video, replacing said at least one (run, level) pair with a sequence of a first (run, level) pair and a second (run, level) pair to produce a modified series of (run, level) pairs from the original series of (run, level) pairs, said at least one (run, level) pair having a non-zero run length of M and a non-zero level value of N, the first (run, level) pair having a run length of M−1 and a level magnitude of one, and the second (run, level) pair having a run length of zero and a level value of N; and c) variable-length encoding the modified series of (run, level) pairs to produce the MPEG encoded video.

17. The method as claimed in claim 16 which includes sequentially inspecting each (run, level) pair in the original series of MPEG-compliant (run, level) pairs to determine whether or not modification of said each (run, level) pair would produce a desirable decrease in the number of bits in the MPEG encoded video despite introduction of noise into the MPEG encoded video; and if modification of said each (run, level) pair would produce a desirable decrease in the number of bits required in the MPEG encoded video despite introduction of noise into the MPEG encoded video, then modifying said each (run, level) pair; and then variable-length encoding said each (run, level) pair.

18. The method as claimed in claim 16, wherein the inspecting of the (run, level) pairs in the original series of MPEG-compliant (run, level) pairs includes lookup of a table specifying whether or not certain (run, level) pairs should be modified.

19. The method as claimed in claim 16, wherein the inspecting of the (run, level) pairs in the original series of (run, level) pairs includes testing for certain ranges of run lengths and level values to determine whether or not certain (run, level) pairs should be modified.

20. A digital computer for producing MPEG encoded video from an original series of MPEG-compliant (run, level) pairs, said digital computer comprising at least one processor programmed for:

a) inspecting the (run, level) pairs in the original series of (run, level) pairs to determine whether or not modification of at least one (run, level) pair in the original series of (run, level) pairs would produce a desirable decrease in a number of bits in the MPEG encoded video despite introduction of noise into the MPEG encoded video; and b) upon determining that modification of said at least one (run, level) pair in the original series of (run, level) pairs would produce a desirable decrease in the number of bits in the MPEG encoded video despite introduction of noise into the MPEG encoded video, replacing said at least one (run, level) pair with a sequence of a first (run, level) pair and a second (run, level) pair to produce a modified series of (run, level) pairs from the original series of (run, level) pairs, said at least one (run, level) pair having a non-zero run length of M and a non-zero level value of N, the first (run, level) pair having a run length of M−1 and a level magnitude of one, and the second (run, level) pair having a run length of zero and a level value of N; and c) variable-length encoding the modified series of (run, level) pairs to produce the MPEG encoded video.

21. The digital computer as claimed in claim 20, wherein said at least one processor is programmed for sequentially inspecting each (run, level) pair in he original series of MPEG-compliant (run, level) pairs to determine whether or not modification of said each (run, level) pair would produce a desirable decrease in the number of bits required in the MPEG encoded video despite introduction of noise into the MPEG encoded video, and if modification of said each (run, level) pair would produce a desirable decrease in the number of bits required for variable-length encoding of the MPEG encoded video despite introduction of noise into the MPEG encoded video, then modifying said each (run, level) pair; and then variable-length encoding said each (run, level) pair.

22. The digital computer as claimed in claim 20, wherein said at least one processor is programmed for lookup of a table specifying whether or not certain (run, level) pairs should be modified.

23. The digital computer as claimed in claim 20, wherein said at least one processor is programmed for testing for certain ranges of run lengths and level values to determine whether or not certain (run, level) pairs should be modified.

* * * * *